(12) United States Patent
Mori et al.

(10) Patent No.: US 12,209,614 B2
(45) Date of Patent: Jan. 28, 2025

(54) BEARING ELEMENT MANUFACTURING METHOD, BEARING MANUFACTURING METHOD, MACHINE MANUFACTURING METHOD, VEHICLE MANUFACTURING METHOD, BEARING ELEMENT, BEARING, MACHINE, AND VEHICLE

(71) Applicant: NSK Ltd., Tokyo (JP)

(72) Inventors: Kouhei Mori, Fujisawa (JP); Mizuki Watanabe, Fujisawa (JP); Isao Shintou, Fujisawa (JP); Hiroshi Koyama, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/912,940

(22) PCT Filed: Jul. 6, 2021

(86) PCT No.: PCT/JP2021/025523
§ 371 (c)(1),
(2) Date: Sep. 20, 2022

(87) PCT Pub. No.: WO2022/009903
PCT Pub. Date: Jan. 13, 2022

(65) Prior Publication Data
US 2023/0160431 A1    May 25, 2023

(30) Foreign Application Priority Data
Jul. 7, 2020   (JP) .................... 2020-117331

(51) Int. Cl.
*F16C 33/64*   (2006.01)
*B21J 5/06*    (2006.01)
(Continued)

(52) U.S. Cl.
CPC ........... *F16C 33/64* (2013.01); *B21J 5/06* (2013.01); *B21K 1/04* (2013.01); *F16C 19/06* (2013.01)

(58) Field of Classification Search
CPC ................. F16C 33/64; B21K 1/04
See application file for complete search history.

(56) References Cited

U.S. PATENT DOCUMENTS

| | | |
|---|---|---|
| 3,968,674 A | 7/1976 | Ishida |
| 2012/0210765 A1* | 8/2012 | Nakamizo ............ F16C 33/64 72/352 |
| 2018/0257131 A1* | 9/2018 | Mori .................. F16C 33/64 |

FOREIGN PATENT DOCUMENTS

| | | |
|---|---|---|
| CH | 594454 A5 | 1/1978 |
| DE | 2535155 A1 | 2/1976 |

(Continued)

OTHER PUBLICATIONS

Machine translation of JP-05277614-A (Year: 1993).*

(Continued)

*Primary Examiner* — Kyle A Cook
(74) *Attorney, Agent, or Firm* — Sughrue Mion, PLLC

(57) ABSTRACT

A first piece (13) includes a first ring portion (13b) and a second ring portion (13c) which are arranged side by side in an axial direction and an inner diameter and an outer diameter of the first ring portion (13b) are respectively larger than an inner diameter and an outer diameter of the second ring portion (13c). A second piece (16) is obtained by pressing the first piece (13) while the first piece (13) is disposed between a first set and a second set.

9 Claims, 28 Drawing Sheets

(51) Int. Cl.
  *B21K 1/04*   (2006.01)
  *F16C 19/06*  (2006.01)

(56) References Cited

FOREIGN PATENT DOCUMENTS

| | | |
|---|---|---|
| EP | 3450046 A1 | 3/2019 |
| GB | 1469359 A | 4/1977 |
| JP | 56-113827 A | 9/1981 |
| JP | 5-277614 A | 10/1993 |
| JP | 7-9064 A | 1/1995 |
| JP | 8-52530 A | 2/1996 |
| JP | 11-244982 A | 9/1999 |
| JP | 11-244983 A | 9/1999 |
| JP | 11-285770 A | 10/1999 |
| JP | 2000-167641 A | 6/2000 |
| JP | 2002-79347 A | 3/2002 |
| JP | 2005-205457 A | 8/2005 |
| JP | 2005-211929 A | 8/2005 |
| JP | 2005-271034 A | 10/2005 |
| JP | 2005-288505 A | 10/2005 |
| JP | 2006-177466 A | 7/2006 |
| JP | 2006-220221 A | 8/2006 |
| JP | 2007-69245 A | 3/2007 |
| JP | 2009-269082 A | 11/2009 |
| JP | 2009-279611 A | 12/2009 |
| JP | 2009-297768 A | 12/2009 |
| JP | 2010-188355 A | 9/2010 |
| JP | 2011-25312 A | 2/2011 |
| JP | 4978552 B2 | 7/2012 |
| JP | 5083032 B2 | 11/2012 |
| JP | 2018-12109 A | 1/2018 |
| JP | 2019-51526 A | 4/2019 |
| KR | 10-2013-0053814 A | 5/2013 |
| WO | 2016/098886 A1 | 6/2016 |

OTHER PUBLICATIONS

International Search Report dated Sep. 7, 2021 issued by the International Searching Authority in Application No. PCT/JP2021/025523.
Office Action issued Jan. 11, 2022 in Japanese Application No. 2021-568754.
Office Action issued Aug. 19, 2022 in Japanese Application No. 2022-700708.
Extended European Search Report issued Nov. 7, 2022 in European Application No. 21837234.0.

* cited by examiner

//BEARING ELEMENT MANUFACTURING METHOD, BEARING MANUFACTURING METHOD, MACHINE MANUFACTURING METHOD, VEHICLE MANUFACTURING METHOD, BEARING ELEMENT, BEARING, MACHINE, AND VEHICLE

CROSS REFERENCE TO RELATED APPLICATIONS

This application is a National Stage of International Application No. PCT/JP2021/025523 filed Jul. 6, 2021, claiming priority based on Japanese Patent Application No. 2020-117331 filed Jul. 7, 2020.

Priority is claimed on Japanese Patent Application No. 2020-117331, filed Jul. 7, 2020, the content of which is incorporated herein by reference.

TECHNICAL FIELD

The present invention relates to a bearing element manufacturing method and a bearing element.

BACKGROUND ART

Rotating members of various rotating mechanical devices are rotatably supported by a radial rolling bearing 1 shown in FIG. 1, for example, in a portion that does not rotate even when a housing or the like is used. A radial rolling bearing 1 shown in the drawings is a single row deep groove type ball bearing and includes an outer race 2 having an outer race track 2a formed on an inner peripheral surface, an inner race 3 having an inner race track 3a formed on an outer peripheral surface, and a plurality of rolling elements 4 arranged between the outer race track 2a and the inner race track 3a in a rollable manner.

In order to manufacture raceway rings such as the outer race 2 or the inner race 3 constituting the radial rolling bearing 1 at low cost, there is proposed a method of manufacturing a pair of cylindrical members having different diameter dimensions (outer diameter dimensions and inner diameter dimensions) from a single columnar material by press working. FIGS. 32 to 34 show a cylindrical member manufacturing method described in Japanese Patent Application, Publication No. 2009-269082.

In the method described in Japanese Patent Application, Publication No. 2009-269082, first, a columnar billet (material) 5 shown in part (A) of FIG. 32 is subjected to cold upsetting and front extruding processes by a first press working device 6 shown in parts (A) to (C) of FIG. 33 to obtain a first intermediate material 7 shown in part (B) of FIG. 32.

The first press working device 6 includes a punch 6a, a counter punch 6b, a floating die 6c, and an elastic member 6d. The punch 6a has an outer diameter dimension larger than the outer diameter dimension of the billet 5. The counter punch 6b has an outer diameter dimension smaller than the outer diameter dimension of the billet 5. The floating die 6c includes a stepped cylindrical inner peripheral surface and receives an upward elastic force by the elastic member 6d.

When processing the billet 5 in the first intermediate material 7, first, as shown in part (A) of FIG. 33, the billet 5 is inserted into the floating die 6c and is placed on the upper surface of the counter punch 6b. Next, as shown in parts (A), (B) and (C) of FIG. 33, the punch 6a is moved downward so that the billet 5 is axially crushed between the lower surface of the punch 6a and the upper surface of the counter punch 6b. Accordingly, the first intermediate material 7 which includes a disc-shaped portion 7a in one axial half portion (the upper half portion of FIG. 32(A)) and a small diameter cylindrical portion 7b in the other axial half portion (the lower half portion of FIG. 32(B)) is obtained.

Next, the first intermediate material 7 is subjected to a cold rear extruding process using a second press working device 8 shown in parts (A) and (B) of FIG. 34 to obtain a second intermediate material 9 shown in FIG. 32(C). The second intermediate material 9 includes a disc-shaped side plate portion 9a, a large diameter cylindrical portion 9b protruding from the radially outer portion of one axial surface (the upper surface of FIG. 32(C)) of the side plate portion 9a toward one axial side, and a small diameter cylindrical portion 9c protruding from the radially intermediate portion of the other axial surface (the lower surface of FIG. 32(C)) of the side plate portion 9a toward the other axial side.

The second press working device 8 includes a die 8a, a punch 8b, and a mandrel 8c. The die 8a includes a stepped cylindrical inner peripheral surface in which one axial half large diameter portion 8a1 and the other axial half small diameter portion 8a2 are continuous to each other by a stepped surface 8a3. The punch 8b has an outer diameter dimension equal to the inner diameter dimension of the large diameter cylindrical portion 9b of the second intermediate material 9 to be obtained. The mandrel 8c has an outer diameter dimension equal to the inner diameter dimension of the small diameter cylindrical portion 7b of the first intermediate material 7 (the small diameter cylindrical portion 9c of the second intermediate material 9) and is provided to be elevatable with respect to the die 8a.

When processing the first intermediate material 7 into the second intermediate material 9, first, as shown in FIG. 34(A), the small diameter cylindrical portion 7b of the first intermediate material 7 is inserted between the small diameter portion 8a2 of the die 8a and the outer peripheral surface of the mandrel 8c. Next, as shown in parts (A) and (B) of FIG. 34, the punch 8b is moved downward so that the lower surface of the punch 8b strongly presses the center portion of the upper surface of the disc-shaped portion 7a of the first intermediate material 7. Accordingly, the disc-shaped portion 7a is plastically deformed along a cavity 8d existing between the large diameter portion 8a1 and the stepped surface 8a3 of the die 8a and the outer peripheral surface of the punch 8b so that the second intermediate material 9 is obtained.

After the second intermediate material 9 is taken out from the die 8a, the large diameter cylindrical portion 9b and the small diameter cylindrical portion 9c are separated from each other and the bottom portion 9d (a portion located on the radial inside in relation to the inner peripheral surface of the small diameter cylindrical portion 9c of the side plate portion 9a) is removed from the small diameter cylindrical portion 9c. Accordingly, a pair of cylindrical members having different diameter dimensions is obtained. Each of the pair of cylindrical members obtained in this way is subjected to a necessary post-treatment such as a cold rolling (CRF) process, a cutting process, a grinding process, and a heat treatment to obtain the outer race 2 and the inner race 3.

CITATION LIST

Patent Literature

[Patent Literature 1]
Japanese Patent Application, Publication No. 2009-269082

SUMMARY OF INVENTION

Technical Problem

In order to manufacture the bearing element such as the outer race 2 or the inner race 3 at low cost, it is preferable to keep the number of steps as small as possible and to keep the amount of cutting and grinding in the post-treatment to be small.

An object of the present invention is to realize a method of manufacturing a bearing element at low cost.

Solution to Problem

A bearing element manufacturing method according to an aspect of the present invention includes a first step of preparing a first piece having a predetermined shape such that the predetermined shape includes a first ring portion and a second ring portion arranged side by side in an axial direction and an inner diameter and an outer diameter of the first ring portion are respectively larger than an inner diameter and an outer diameter of the second ring portion; a second step of obtaining a second piece by processing the first piece such that the second piece includes a third ring portion corresponding to the first ring portion and a fourth ring portion corresponding to the second ring portion; and a third step of obtaining a first ring element and a second ring element separated from each other such that the first ring element corresponds to the third ring portion and the second ring element corresponds to the fourth ring portion. The second step includes preparing a first set including a first member and a second member disposed inside or outside the first member, preparing a second set including a third member and a fourth member disposed inside or outside the third member, and relatively moving the second member in a first axial direction with respect to the first member to deform the first piece and relatively moving the fourth member in a second axial direction with respect to the third member to deform the first piece while the first piece is disposed between the first set and the second set in the axial direction, the first set contacts a first axial surface of the first piece, and the second set contacts a second axial surface of the first piece.

A bearing manufacturing method according to an aspect of the present invention includes a step of manufacturing a bearing element by the manufacturing method.

A machine manufacturing method according to an aspect of the present invention includes a step of manufacturing a bearing element by the manufacturing method.

A vehicle manufacturing method according to an aspect of the present invention includes a step of manufacturing a bearing element by the manufacturing method.

A bearing element according to an aspect of the present invention has a trace produced by the bearing element manufacturing method.

A bearing element according to another aspect of the present invention includes a body which has a ring shape and the body includes a first chamfered portion formed between an outer peripheral surface and a first axial surface and a second chamfered portion formed between the outer peripheral surface and a second axial surface. A metal flow of the body includes a first pattern which is continuous along the first chamfered portion in the vicinity of a surface of the first chamfered portion, a second pattern which is continuous along the second chamfered portion in the vicinity of a surface of the second chamfered portion, and a third pattern which is continuous along the outer peripheral surface in the vicinity of the outer peripheral surface. The third pattern is asymmetric with respect to a line passing through an axial center of the body and along a radial direction.

A bearing according to an aspect of the present invention includes the hearing element.

A machine according to an aspect of the present invention includes the bearing.

A vehicle according to an aspect of the present invention includes the bearing.

Advantageous Effects of Invention

According to the aspects of the present invention, the bearing element can be manufactured at low cost.

Figure 2:
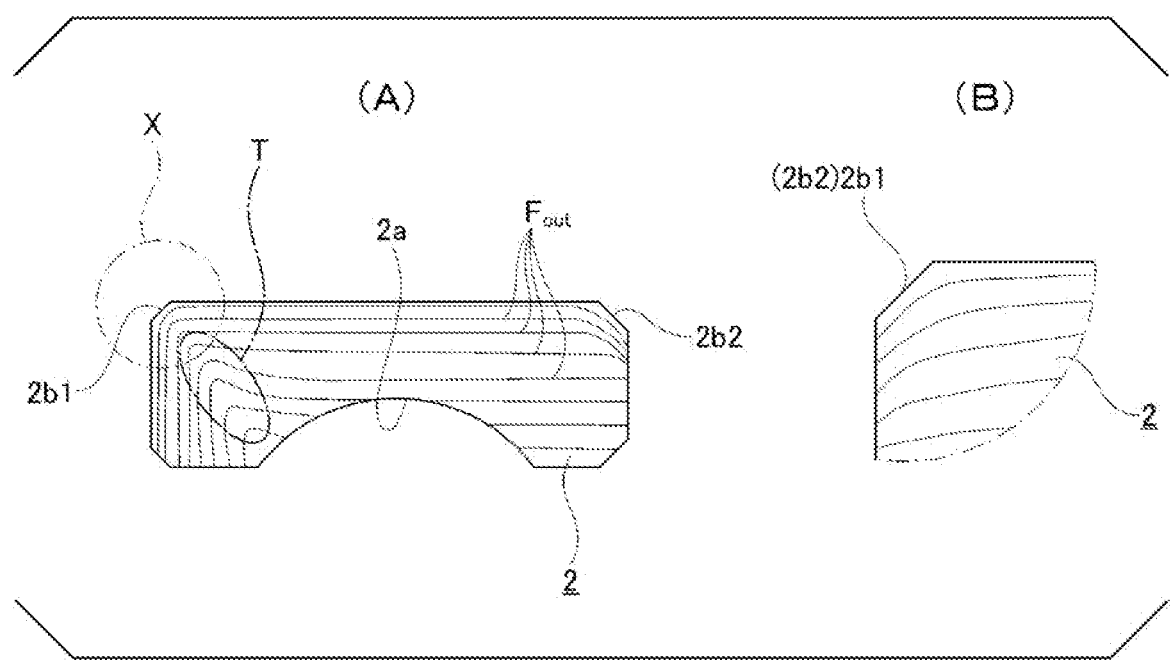

Part (A) of FIG. 2 is a cross-sectional view showing a state of a fiber flow in an outer race and part (B) of FIG. 2 is an enlarged view of an X part of part (A) of FIG. 2.

Figure 1:
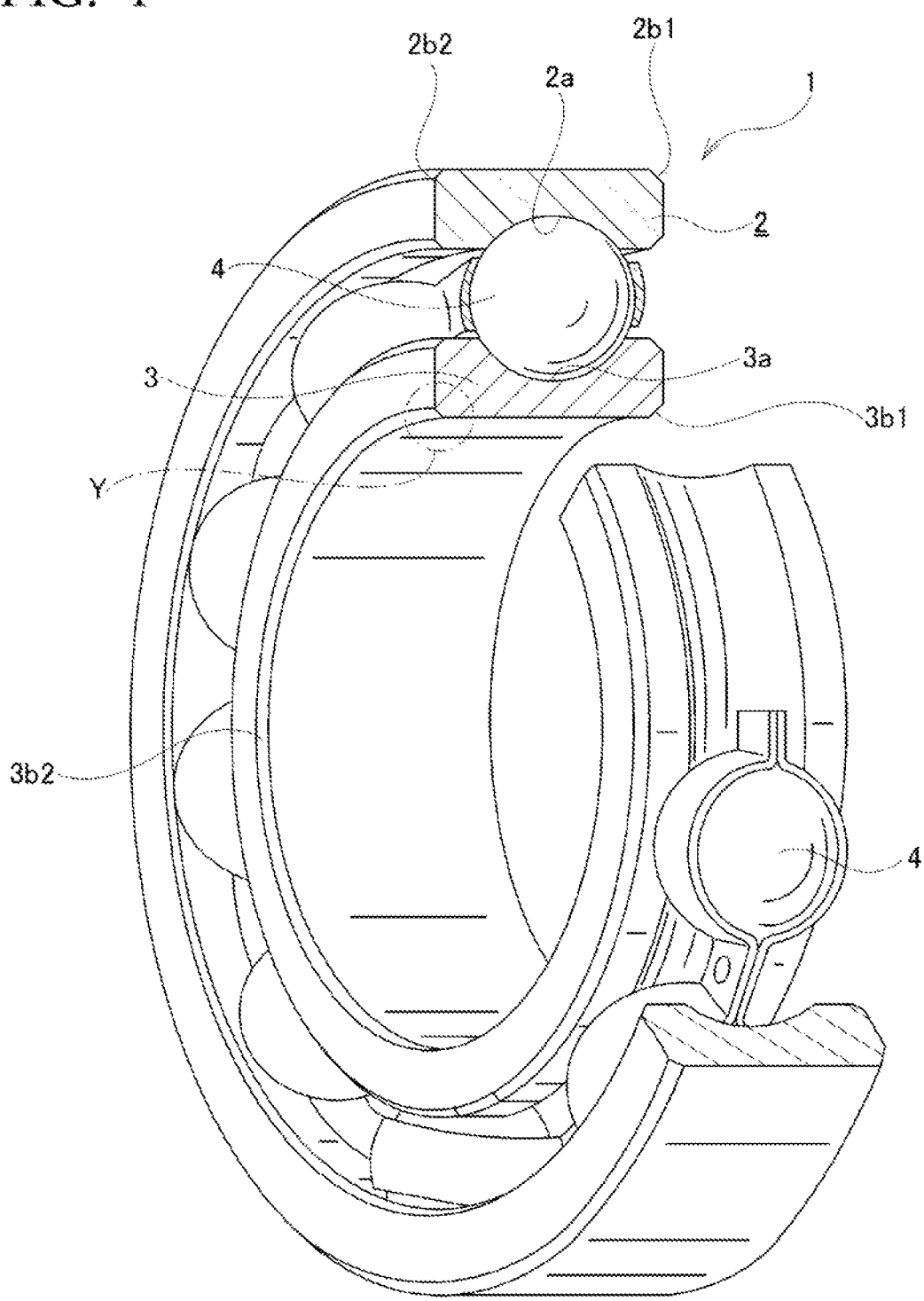
FIG. 1 is a partially cutaway perspective view showing an example of a radial rolling bearing.
Figure 3:
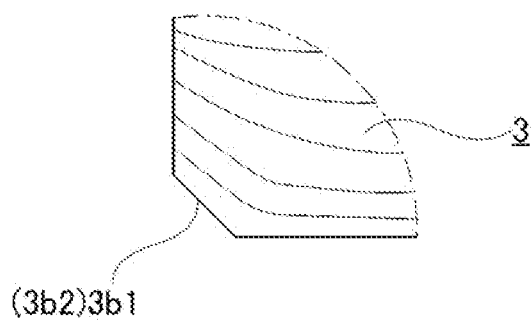

FIG. 3 is an enlarged view of a Y part of FIG. 1 showing a state of a fiber flow in an inner race.

Figure 4:
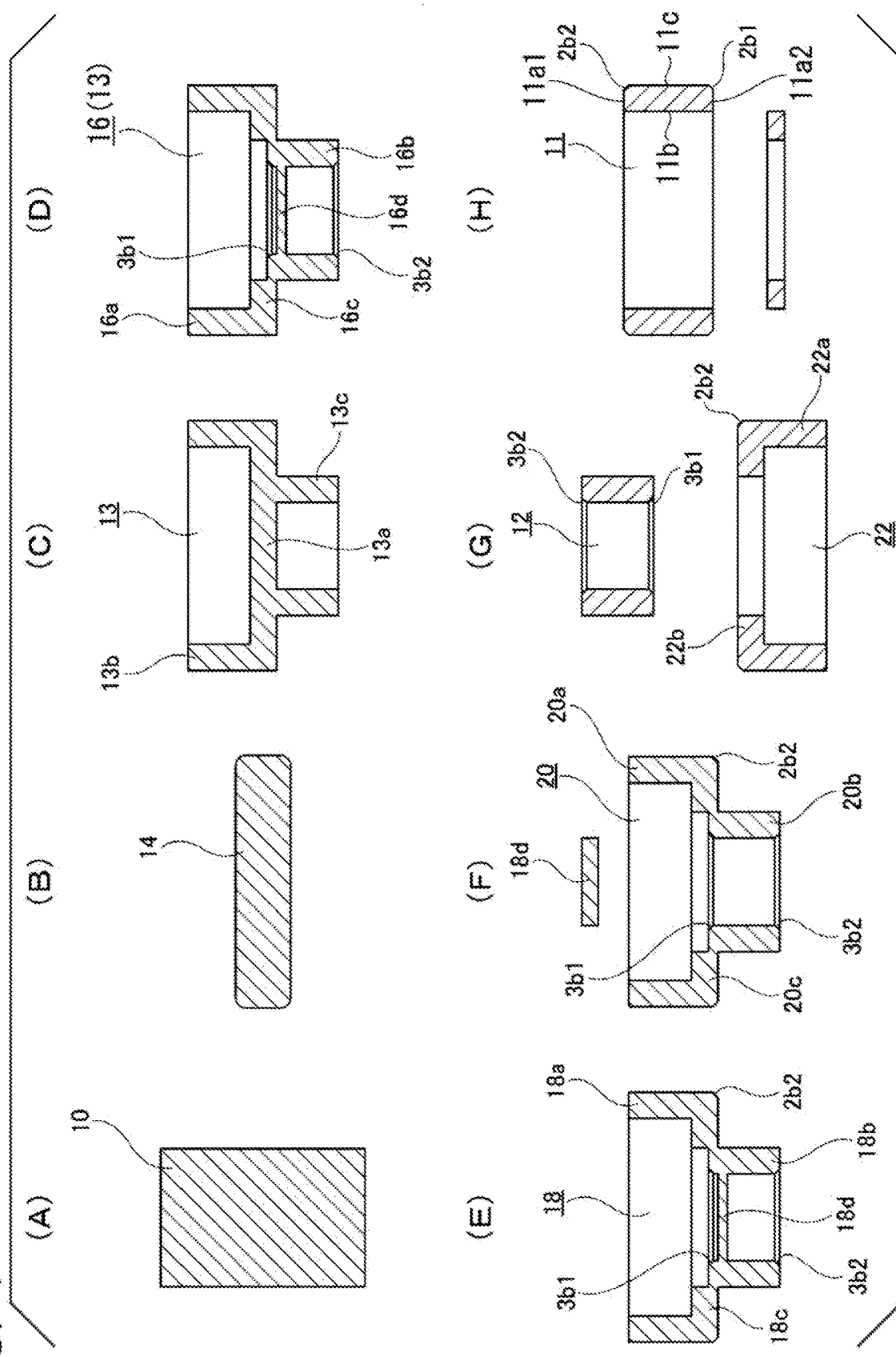

Part (A) to (H) of FIG. 4 are cross-sectional views sequentially showing steps of processing a single columnar material into a large diameter cylindrical member and a small diameter cylindrical member by a manufacturing method according to a first example.

Figure 5:
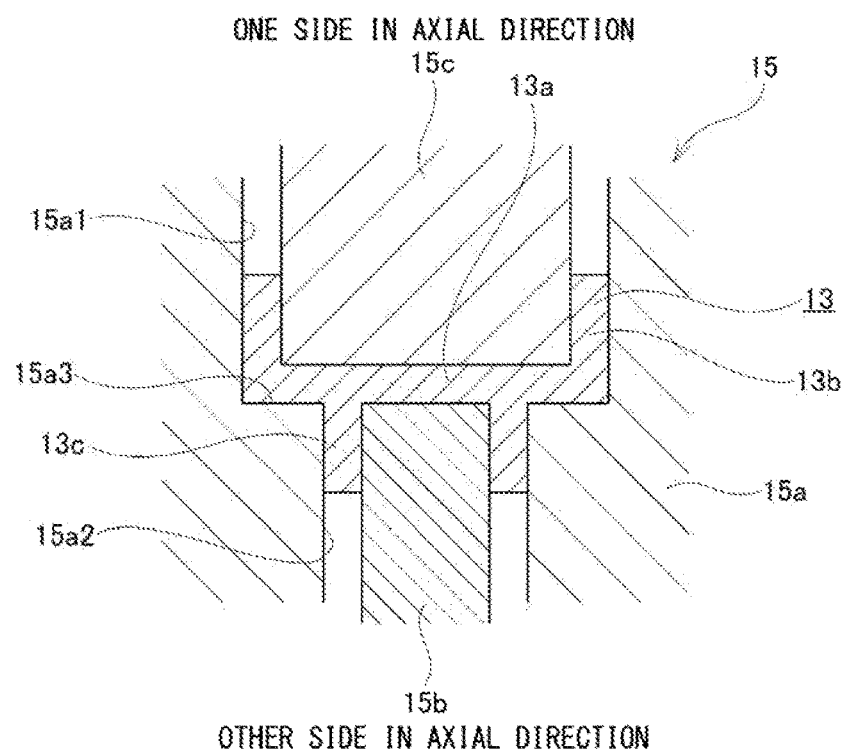

FIG. 5 is a cross-sectional view showing a third step of the first example.

Figure 6:
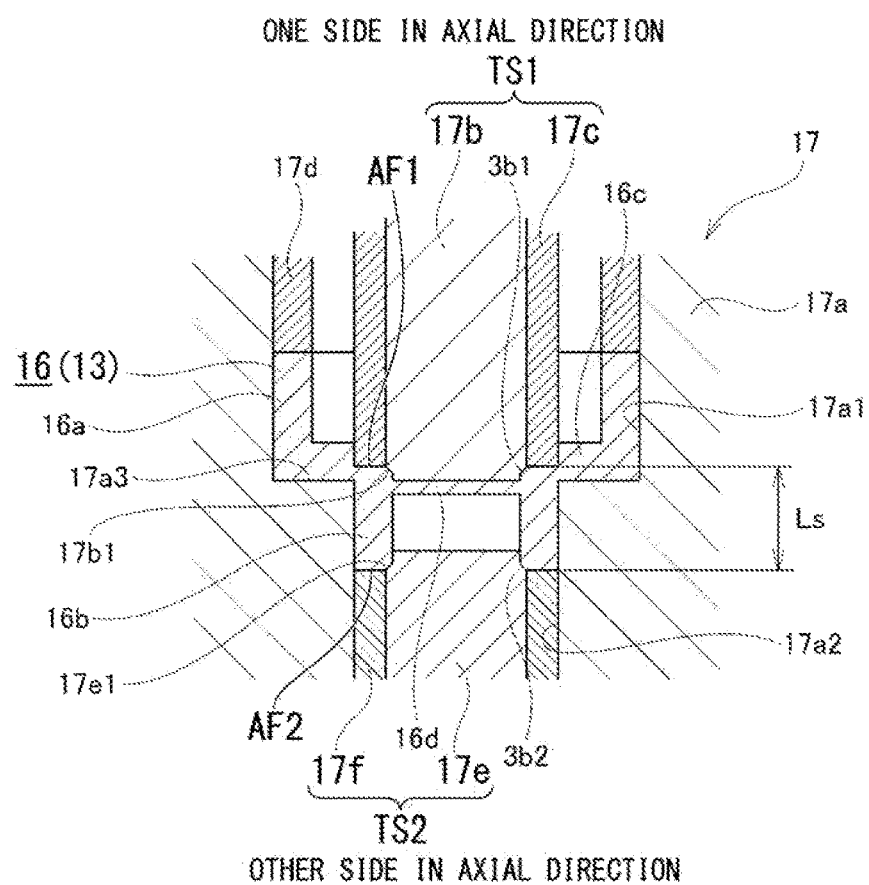

FIG. 6 is a cross-sectional view showing a fourth step of the first example.

Figure 7:
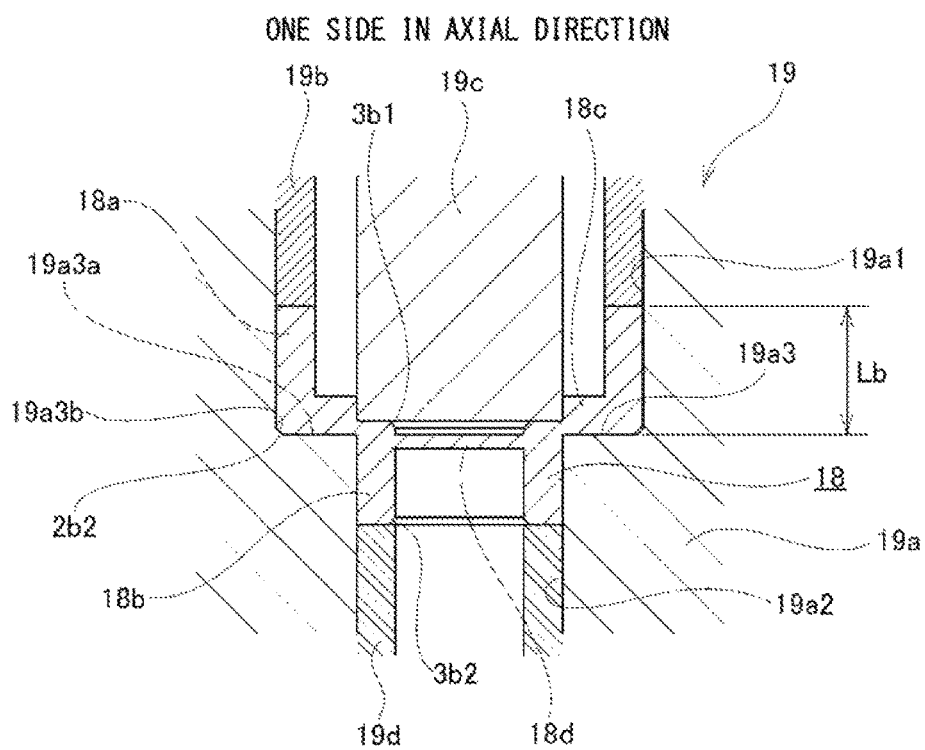

FIG. 7 is a cross-sectional view showing a fifth step of the first example.

Figure 8:
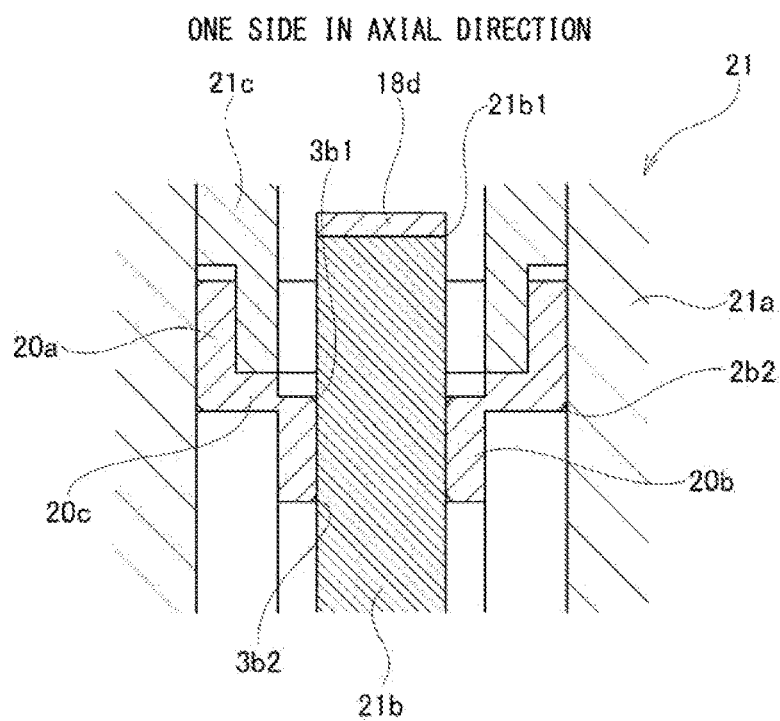

FIG. 8 is a cross-sectional view showing a sixth step of the first example.

Figure 9:
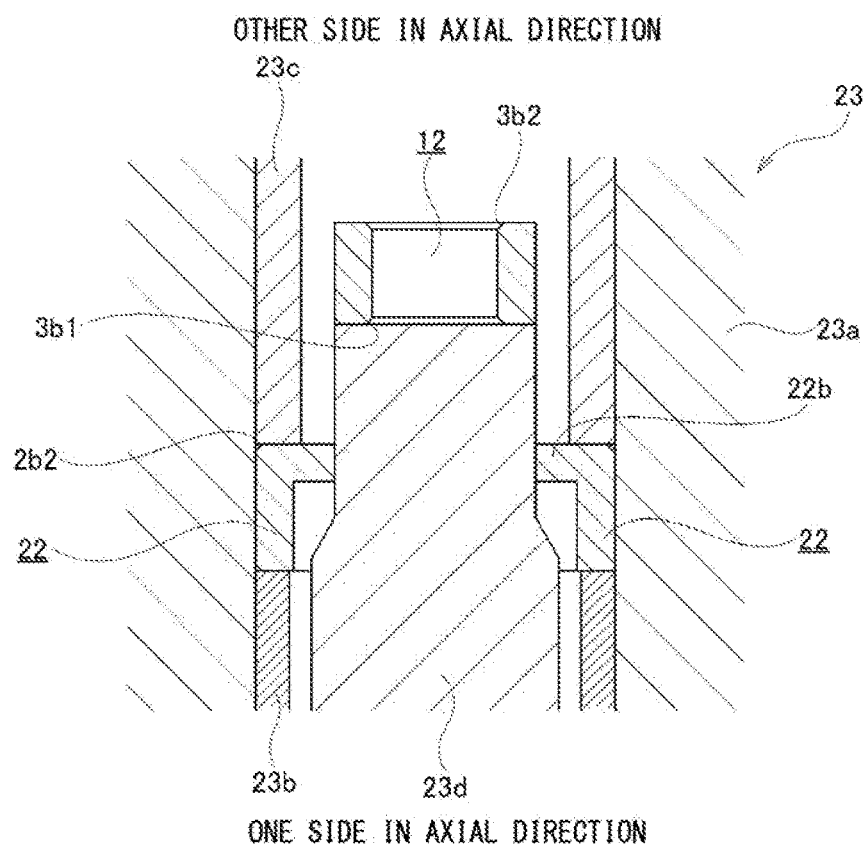

FIG. 9 is across-sectional view showing a seventh step of the first example.

Figure 10:
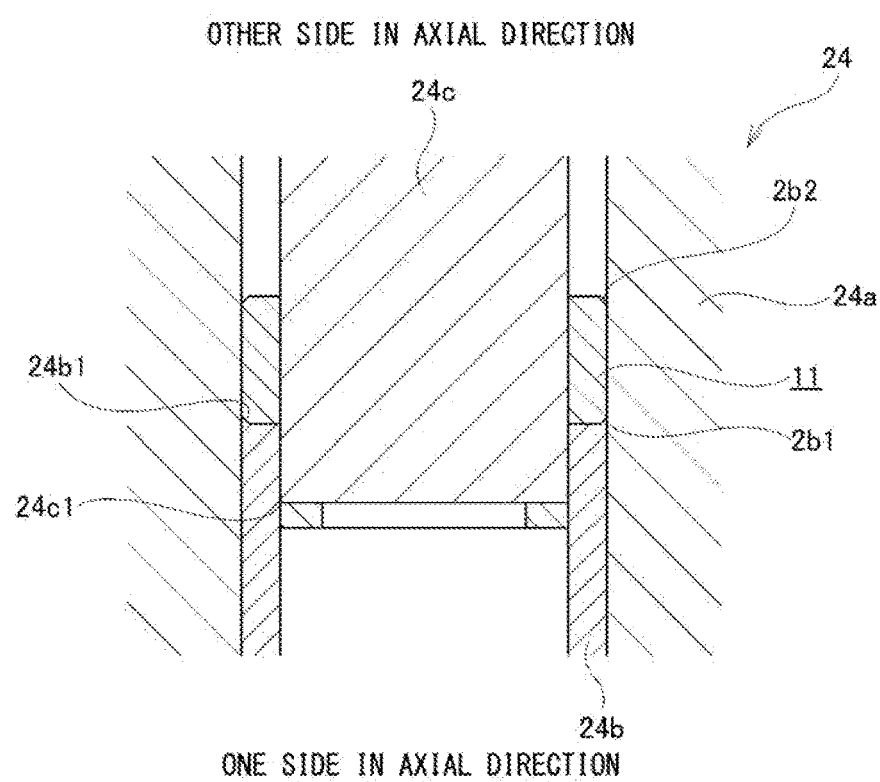

FIG. 10 is a cross-sectional view showing an eighth step of the first example.

Figure 11:
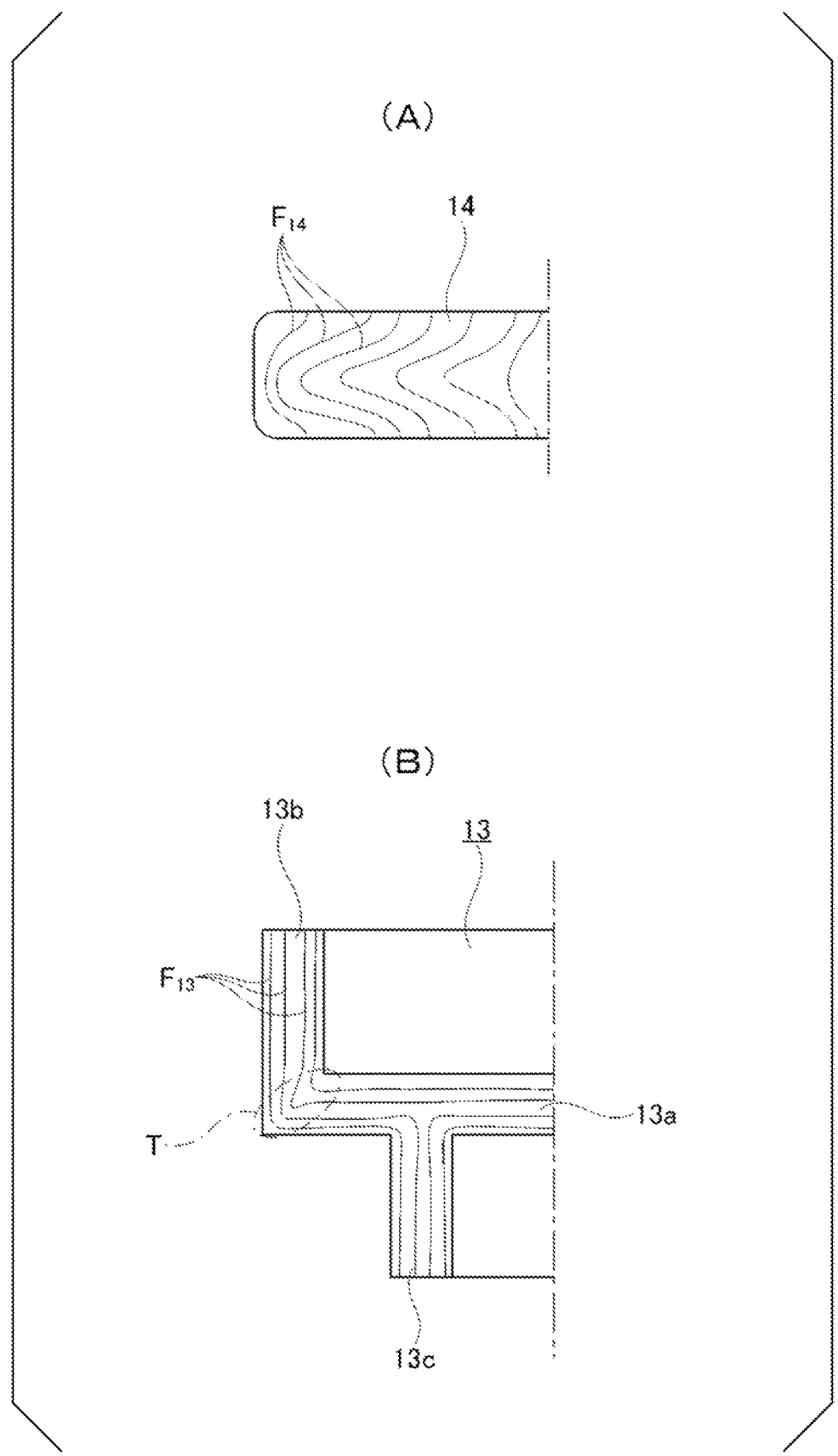

Part (A) of FIG. 11 is a cross-sectional view showing a state of a fiber flow in a preliminary material and part (B) of FIG. 11 is a cross-sectional view showing a state of the fiber flow in the preliminary intermediate material.

Figure 12:
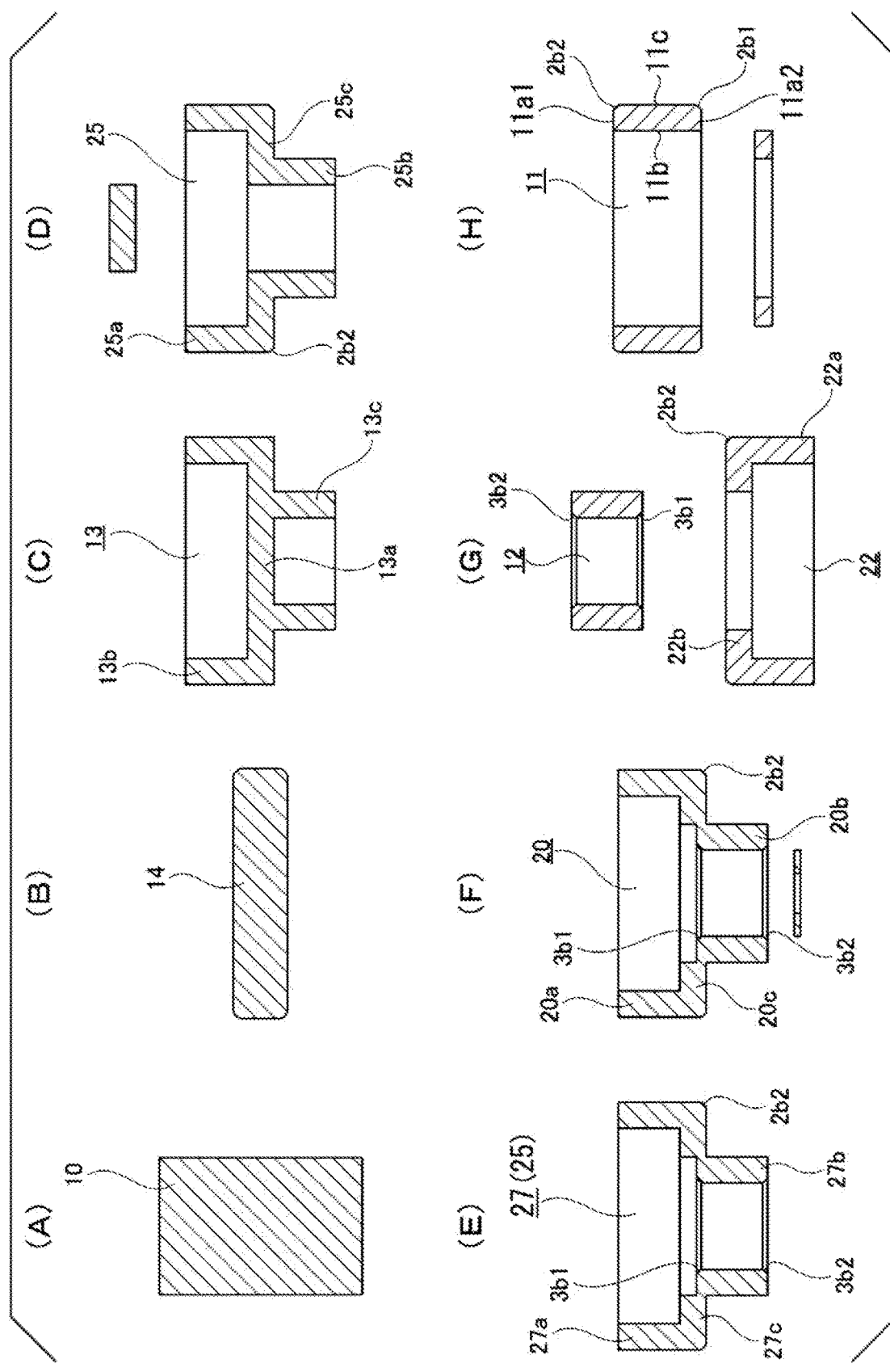

Parts (A) to (H) of FIG. 12 are cross-sectional views sequentially showing steps of processing a single columnar material into a large diameter cylindrical member and a small diameter cylindrical member by a manufacturing method according to a second example.

Figure 13:
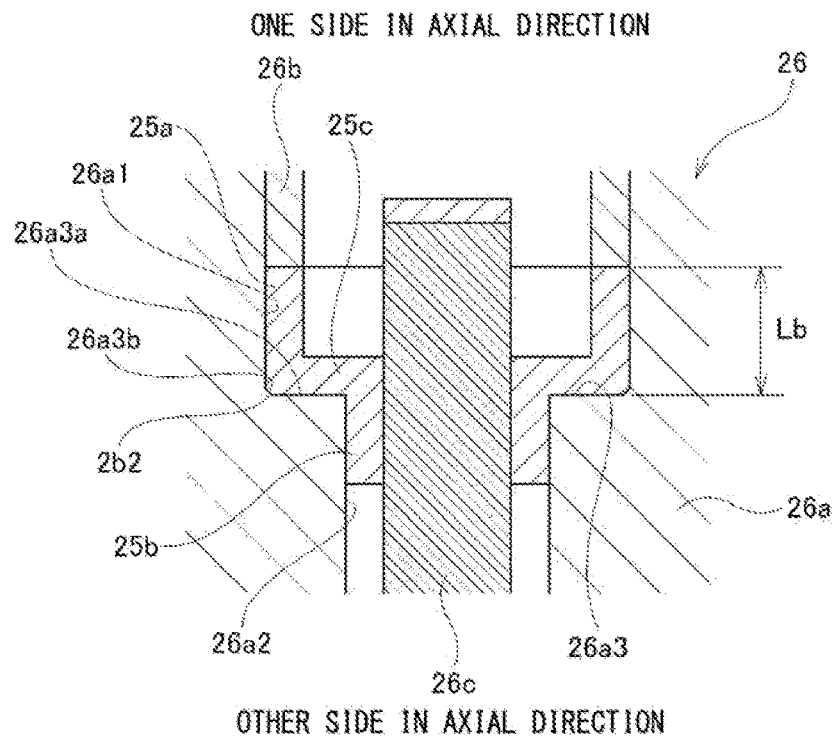

FIG. 13 is a cross-sectional view showing a fourth step of the second example.

Figure 14:
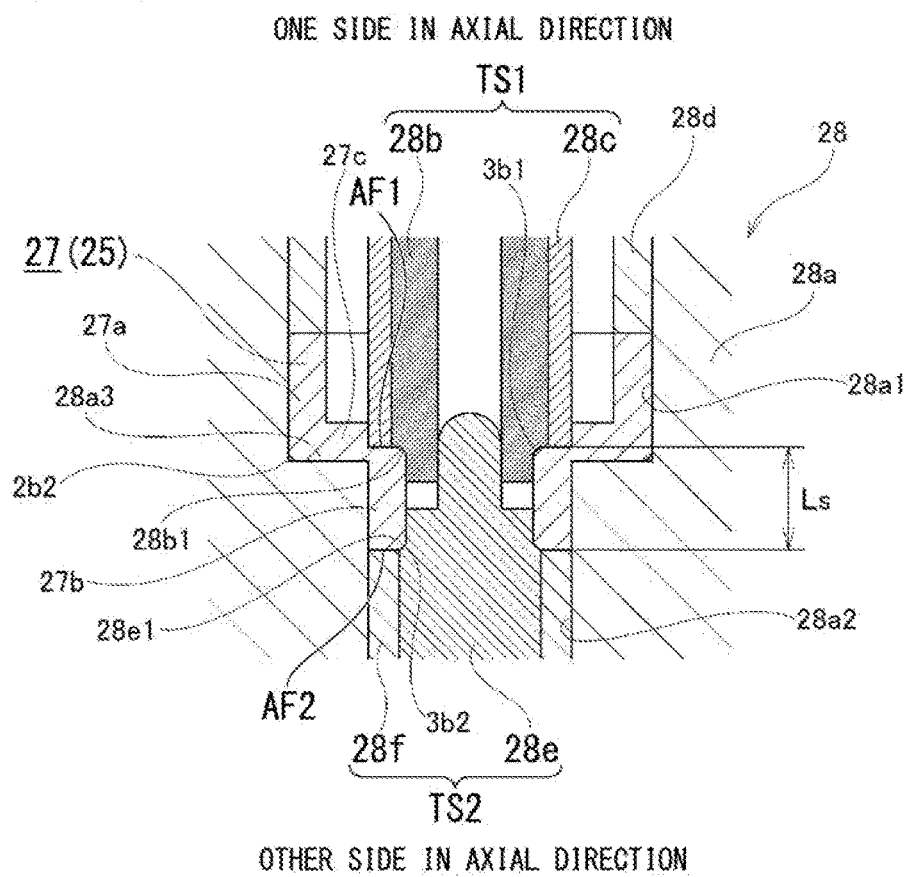

FIG. 14 is a cross-sectional view showing a fifth step of the second example.

Figure 15:
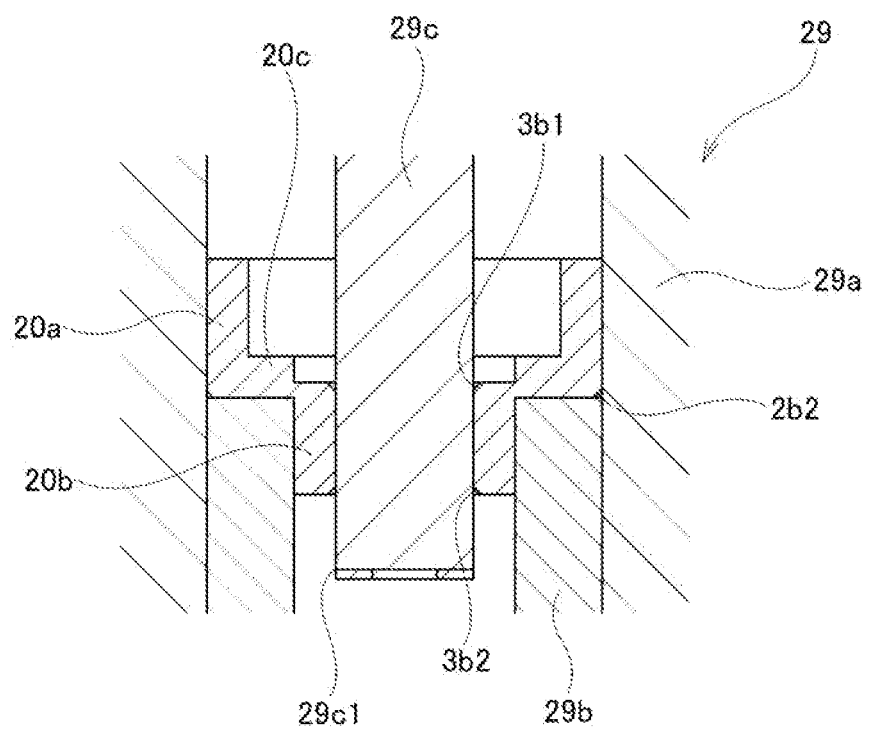

FIG. 15 is a cross-sectional view showing a sixth step of the second example.

Figure 16:
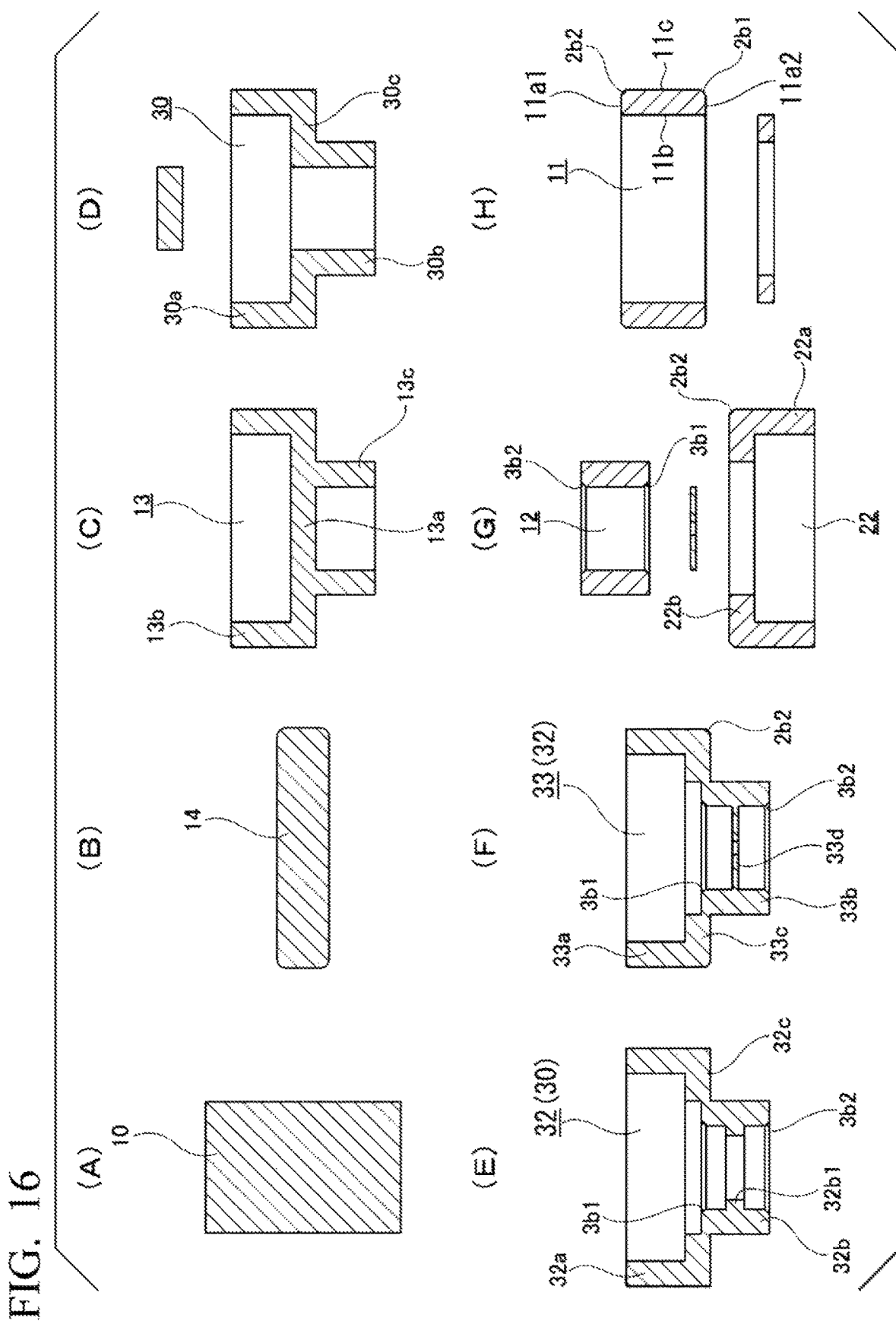

Parts (A) to (H) of FIG. 16 are cross-sectional views sequentially showing steps of processing a single columnar material into a large diameter cylindrical member and a small diameter cylindrical member by a manufacturing method according to a third example.

Figure 17:
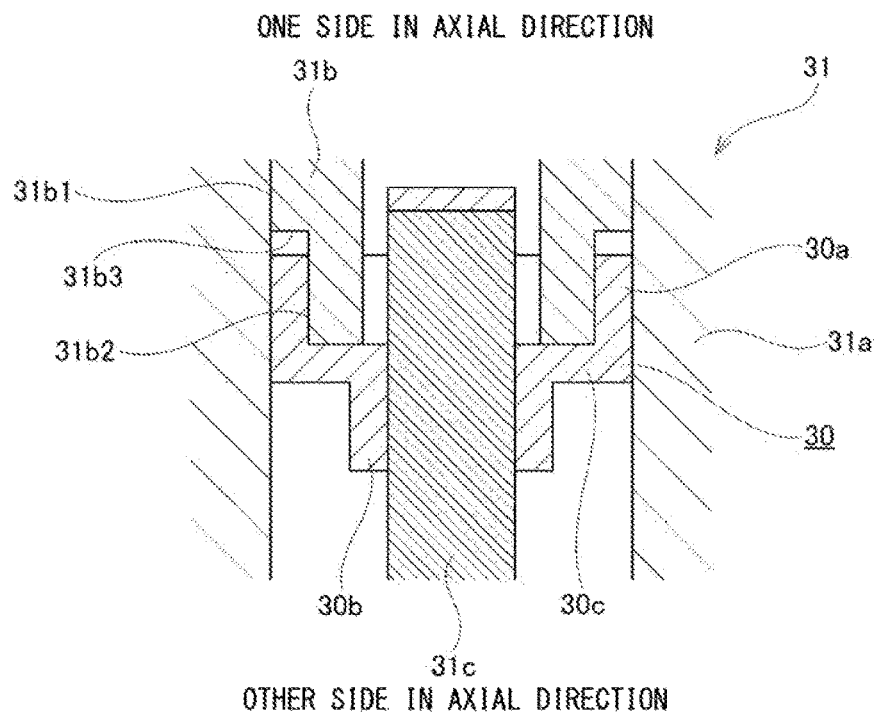

FIG. 17 is a cross-sectional view showing a fourth step of the third example.

Figure 18:
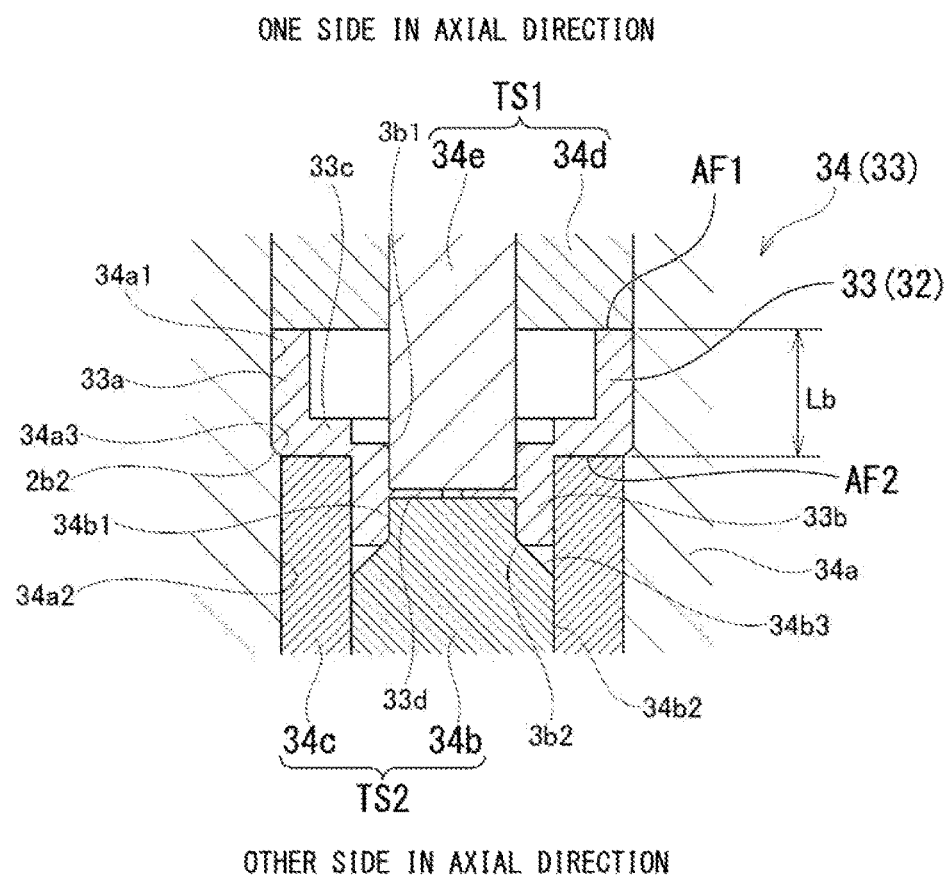

FIG. 18 is a cross-sectional view showing a sixth step of the third example.

Figure 19:
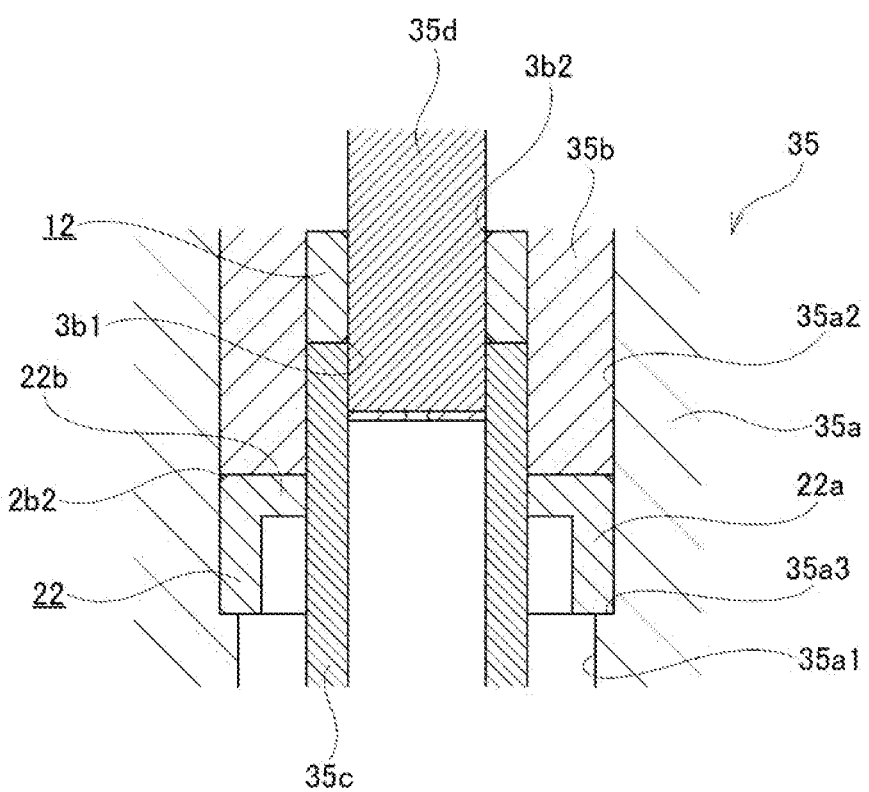

FIG. 19 is a cross-sectional view showing a seventh step of the third example.

Figure 20:
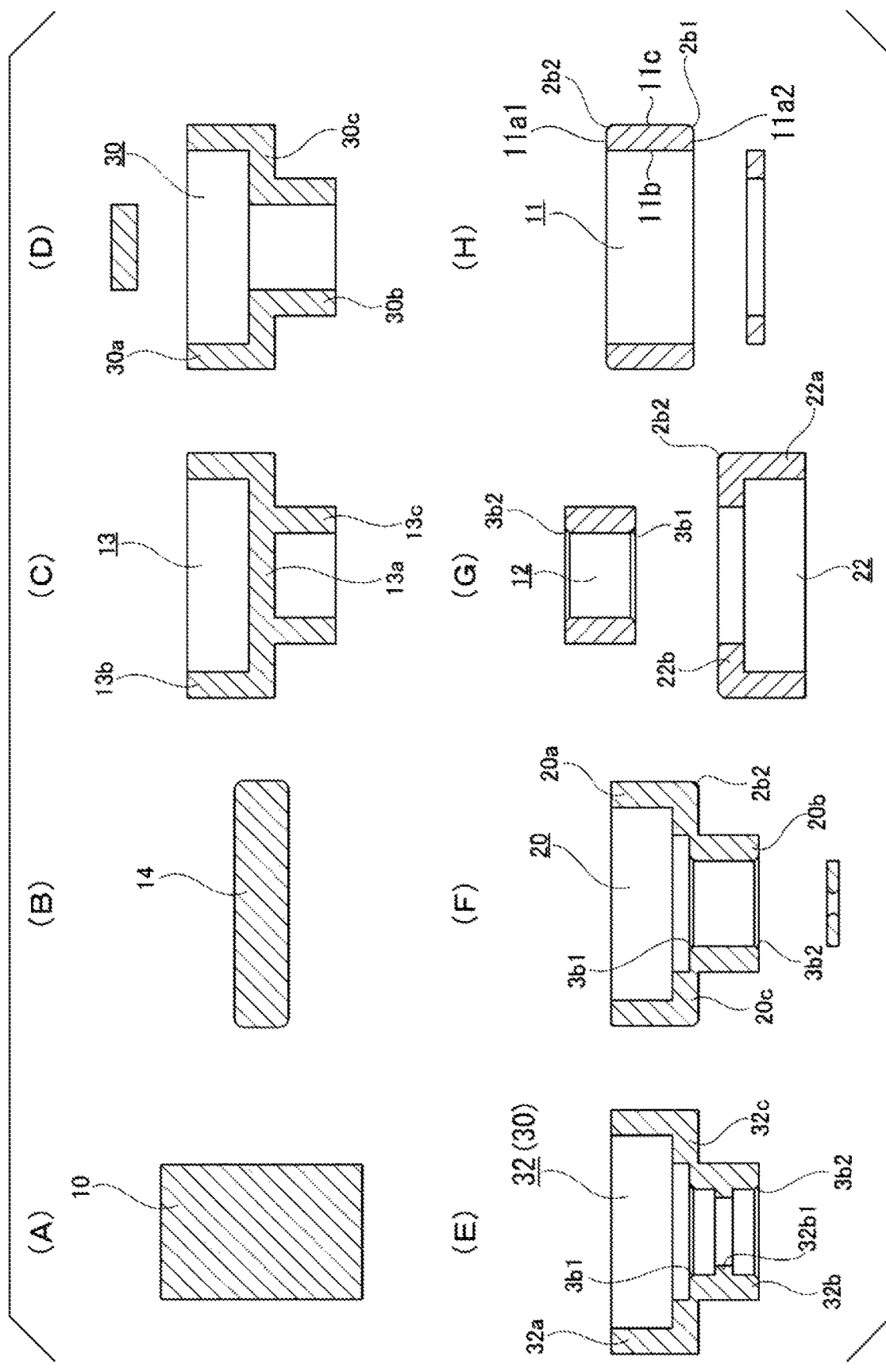

Parts (A) to (H) of FIG. 20 are cross-sectional views sequentially showing steps of processing a single columnar material into a large diameter cylindrical member and a small diameter cylindrical member by a manufacturing method according to a fourth example.

Figure 21:
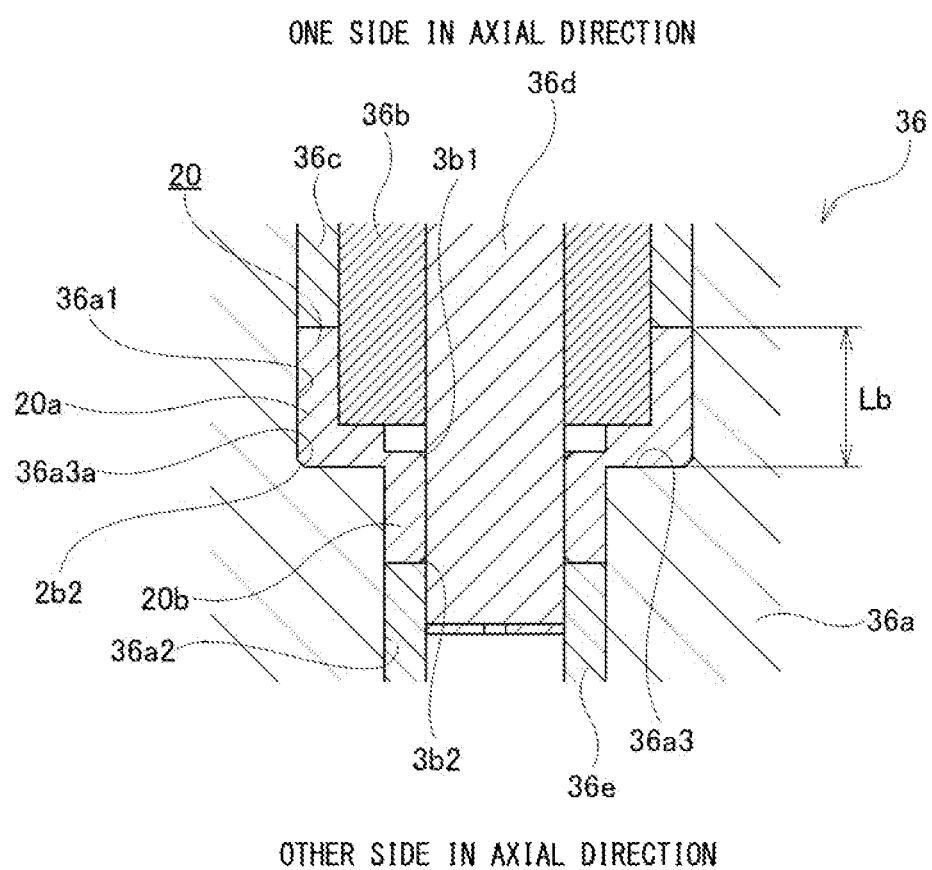

FIG. 21 is a cross-sectional view showing a sixth step of the fourth example.

Figure 22:
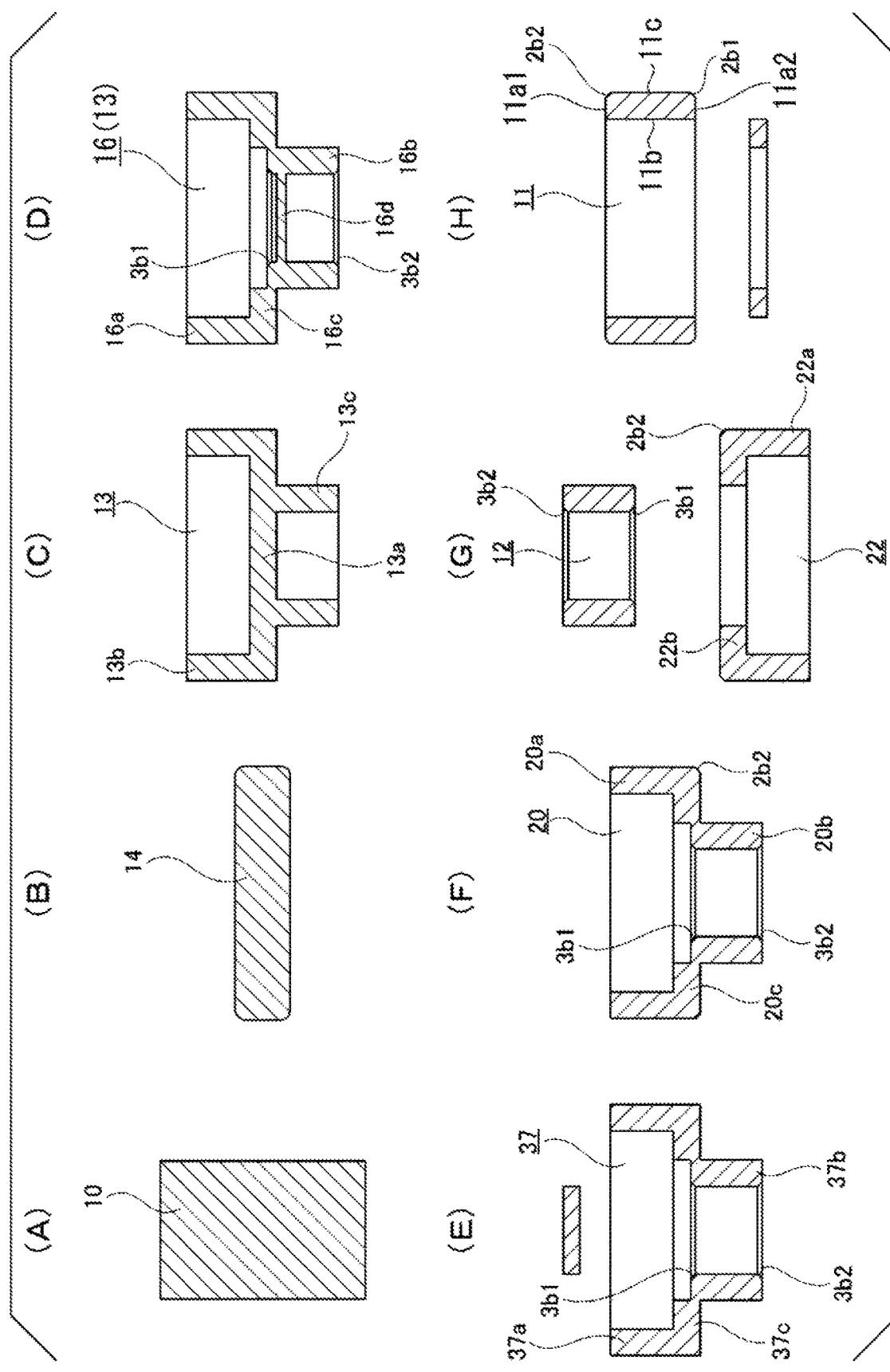

Parts (A) to (H) of FIG. 22 are cross-sectional views sequentially showing steps of processing a single columnar material into a large diameter cylindrical member and a small diameter cylindrical member by a manufacturing method according to a fifth example.

Figure 23:
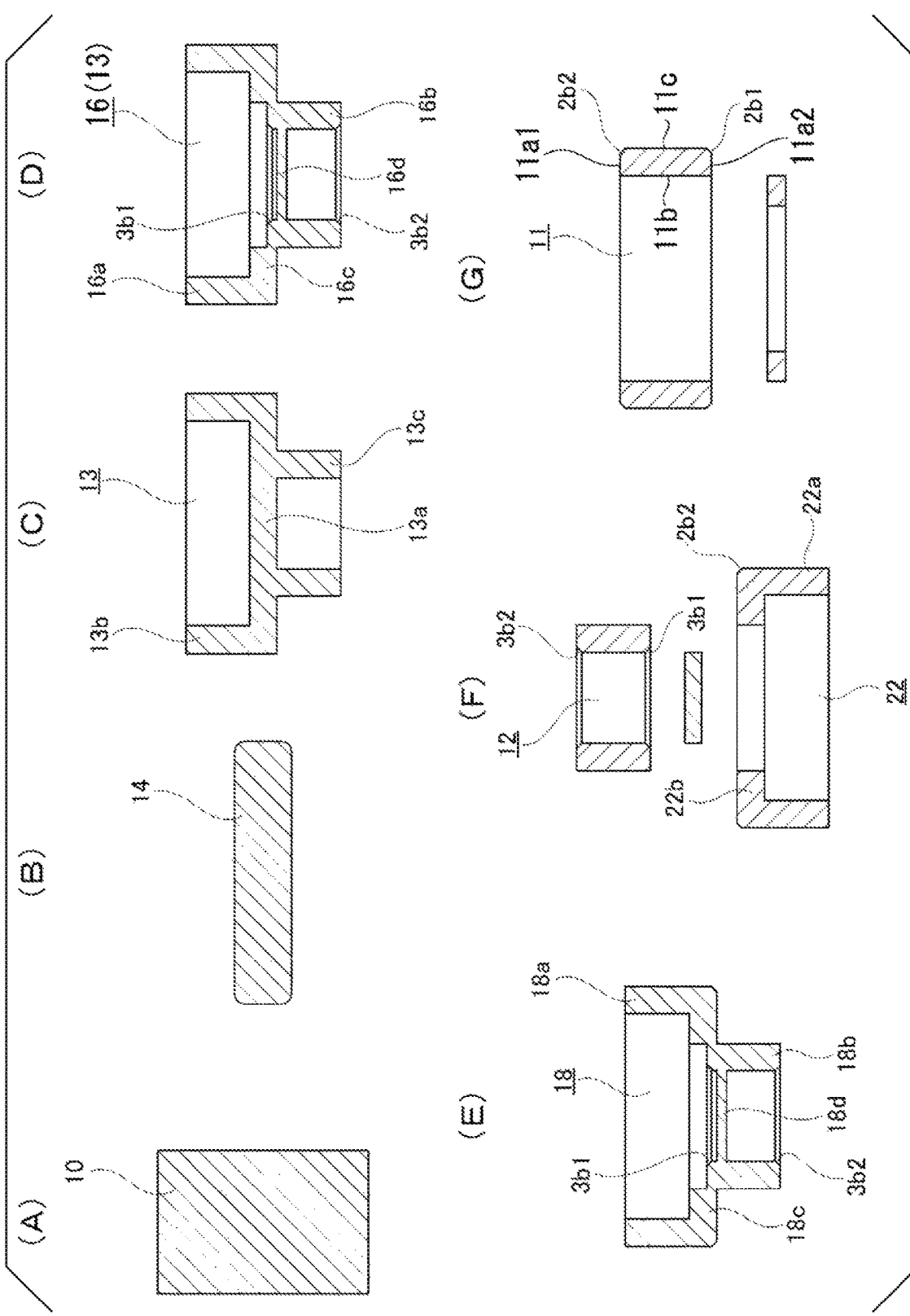

Parts (A) to (G) of FIG. 23 are cross-sectional views sequentially showing steps of processing a single columnar material into a large diameter cylindrical member and a small diameter cylindrical member by a manufacturing method according to a sixth example.

Figure 24:
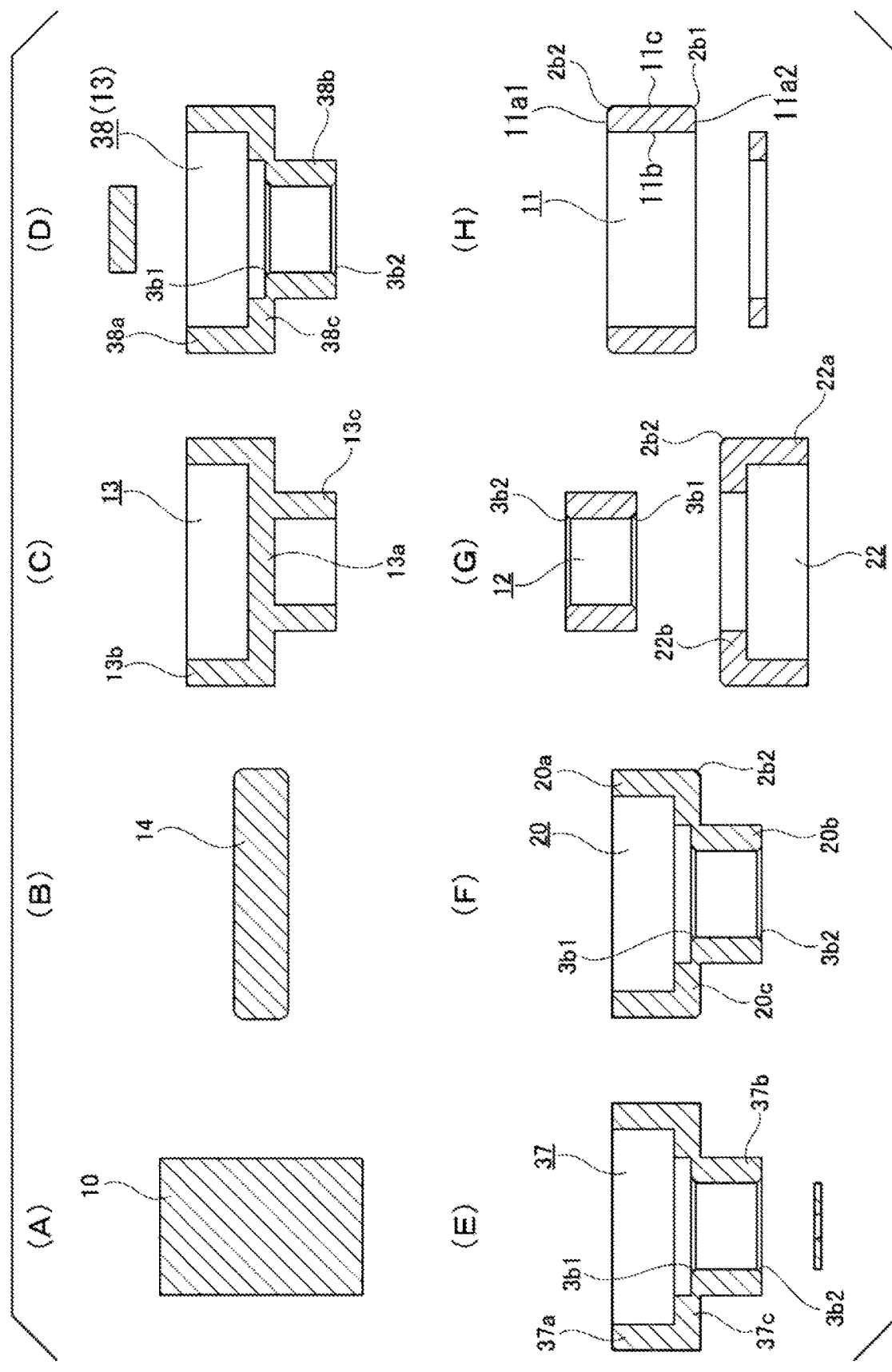

Parts (A) to (H) of FIG. 24 are cross-sectional views sequentially showing steps of processing a single columnar material into a large diameter cylindrical member and a small diameter cylindrical member by a manufacturing method according to a seventh example.

Figure 25:
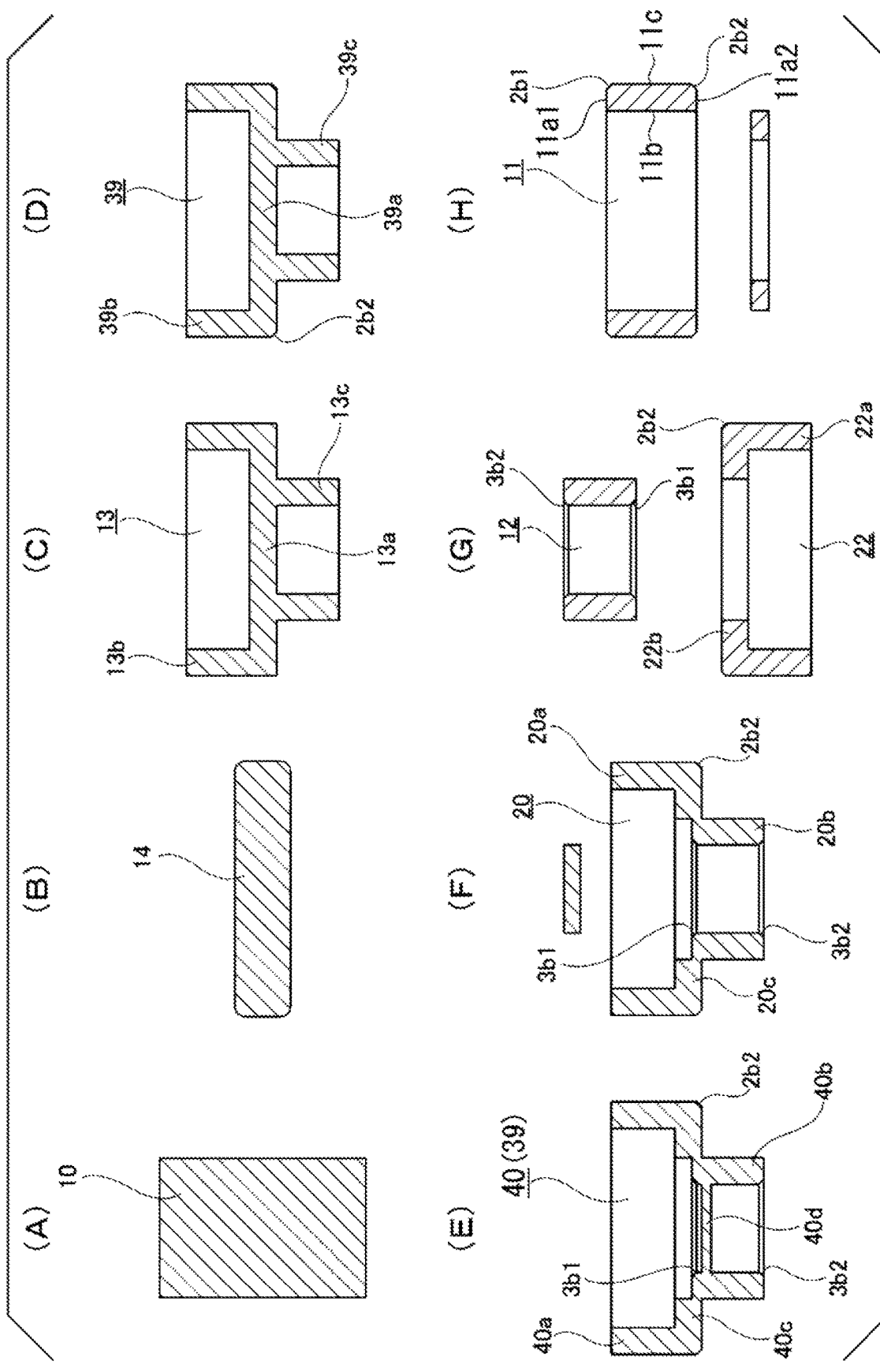

Parts (A) to (H) of FIG. 25 are cross-sectional views sequentially showing steps of processing a single columnar material into a large diameter cylindrical member and a small diameter cylindrical member by a manufacturing method according to an eighth example.

Figure 26:
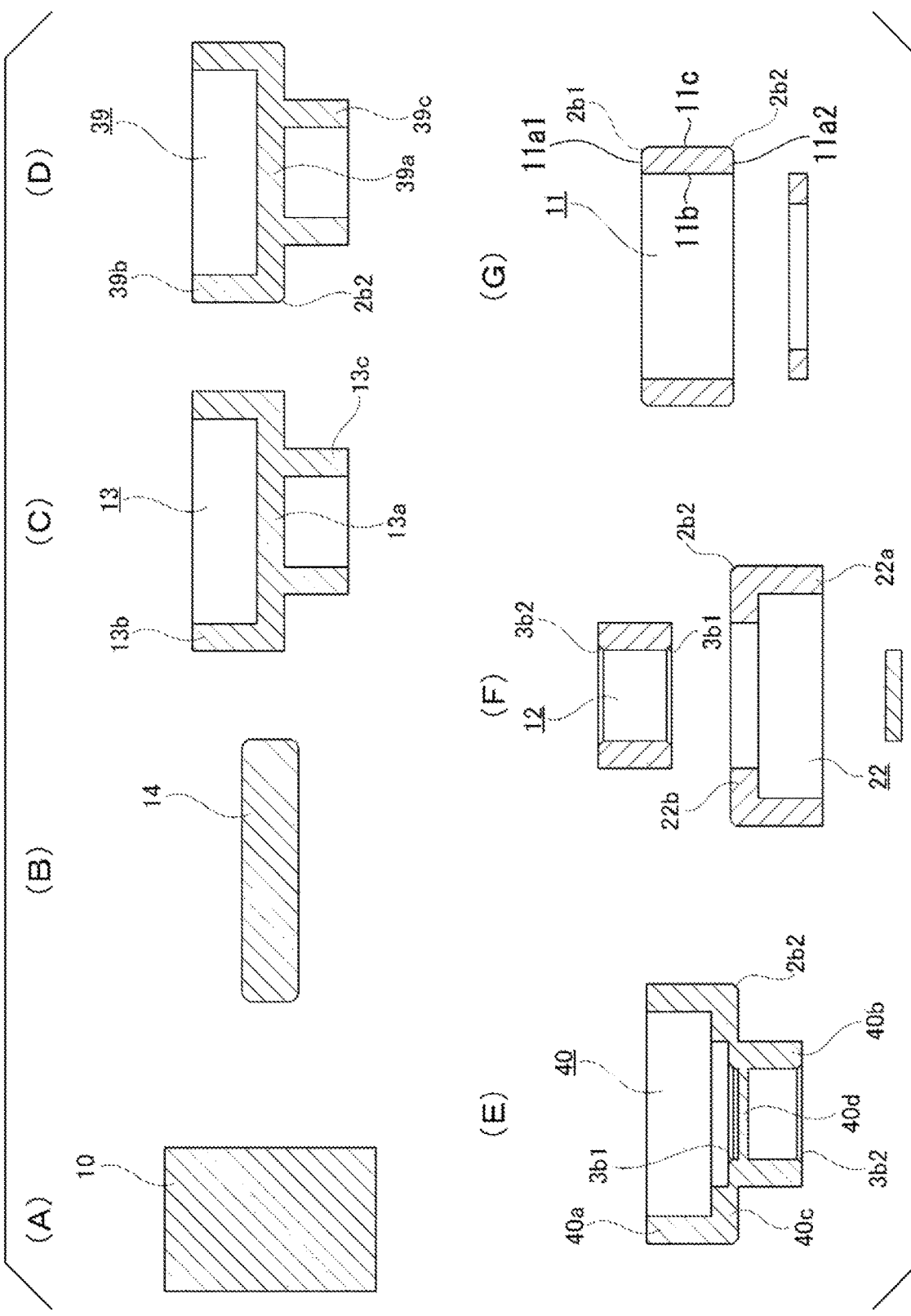

Parts (A) to (G) of FIG. 26 are cross-sectional views sequentially showing steps of processing a single columnar material into a large diameter cylindrical member and a small diameter cylindrical member by a manufacturing method according to a ninth example.

Figure 27:
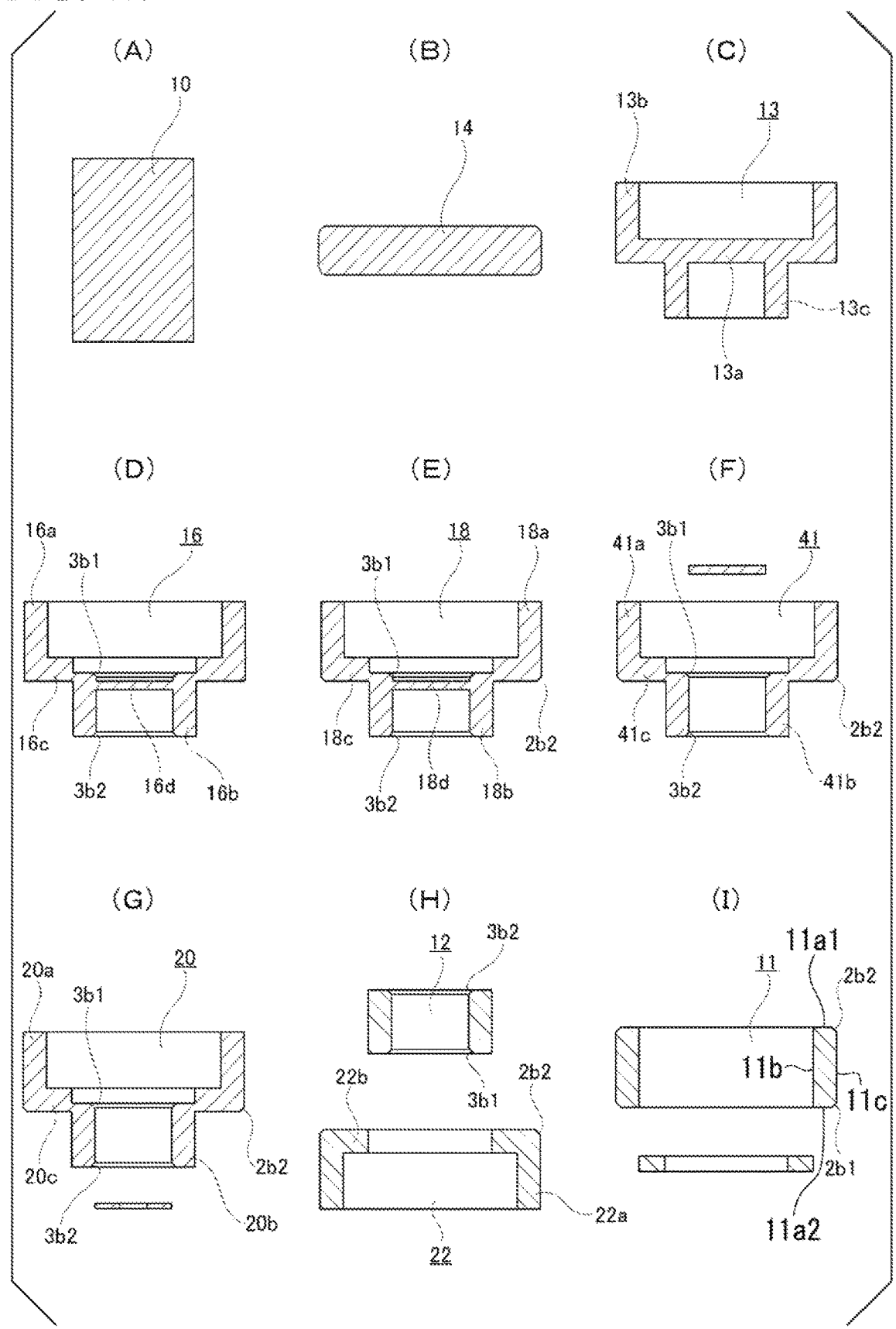

Parts (A) to (I) of FIG. 27 are cross-sectional views sequentially showing steps of processing a single columnar material into a large diameter cylindrical member and a small diameter cylindrical member by a manufacturing method according to a tenth example.

Figure 28:
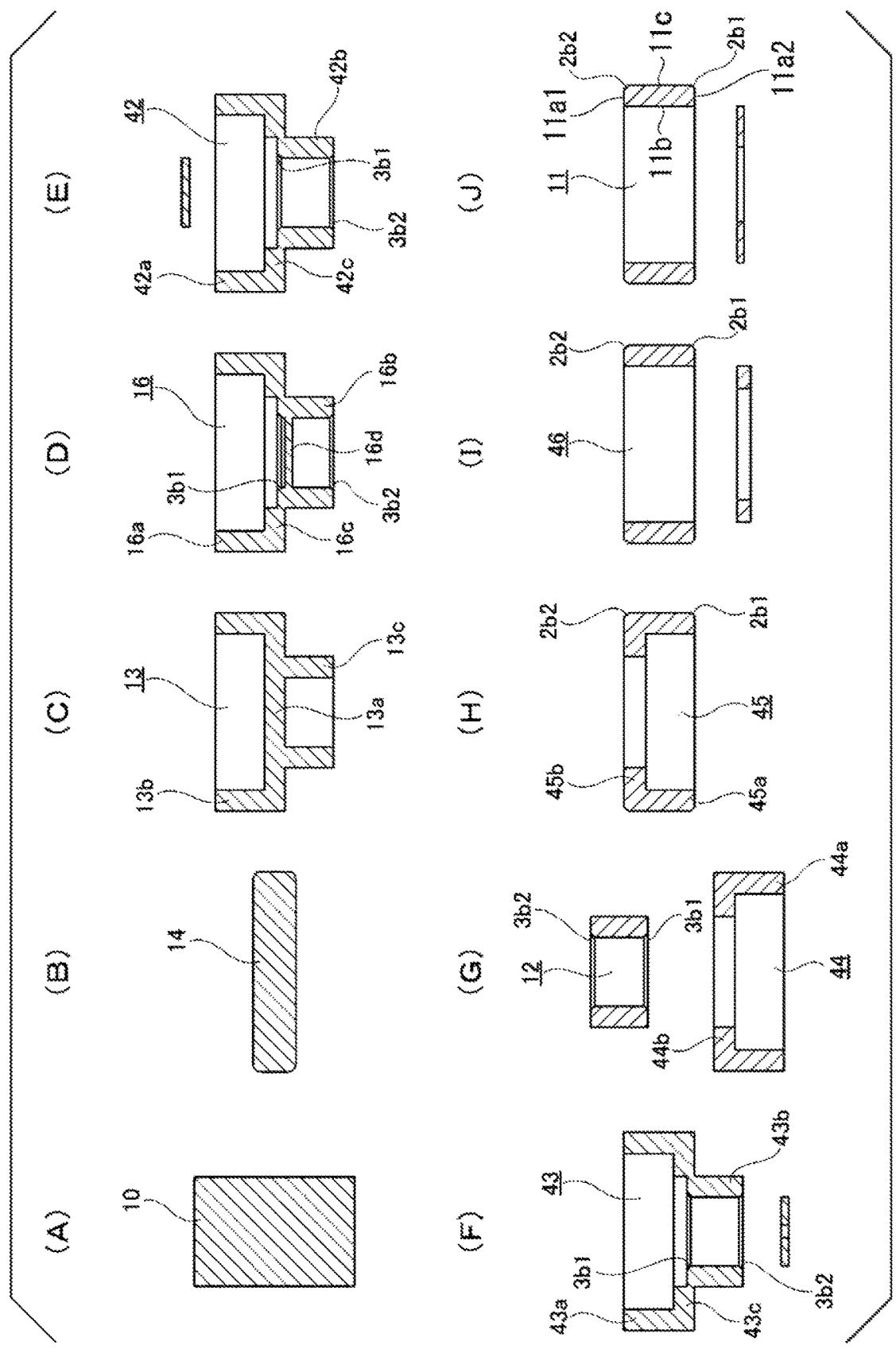

Parts (A) to (J) of FIG. 28 are cross-sectional views sequentially showing steps of processing a single columnar material into a large diameter cylindrical member and a small diameter cylindrical member by a manufacturing method according to an eleventh example.

Figure 29:
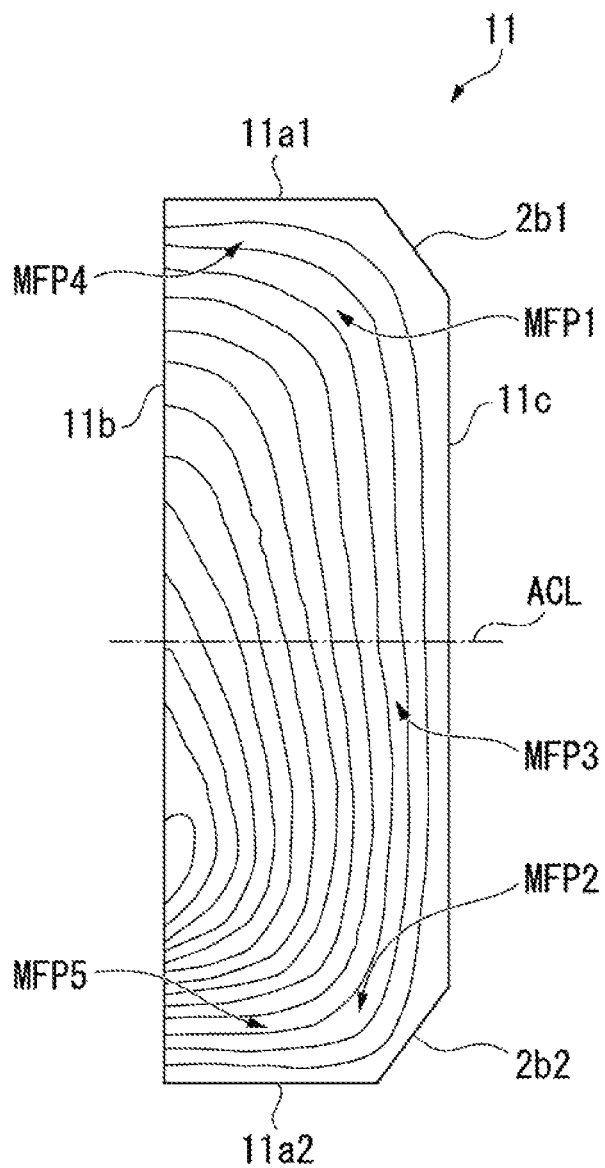

FIG. 29 is a schematic view showing an example of a metal flow in an axial cross-section of a bearing element (first ring element).

Figure 30:
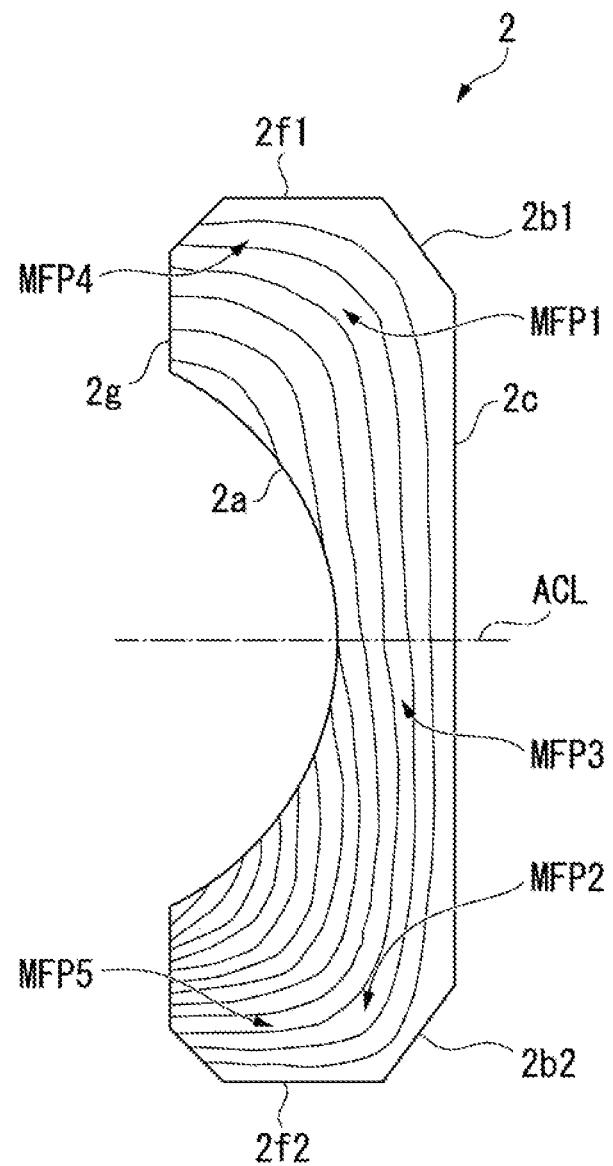

FIG. 30 is a schematic view showing an example of a metal flow in an axial cross-section of a bearing element (outer race).

Figure 31:
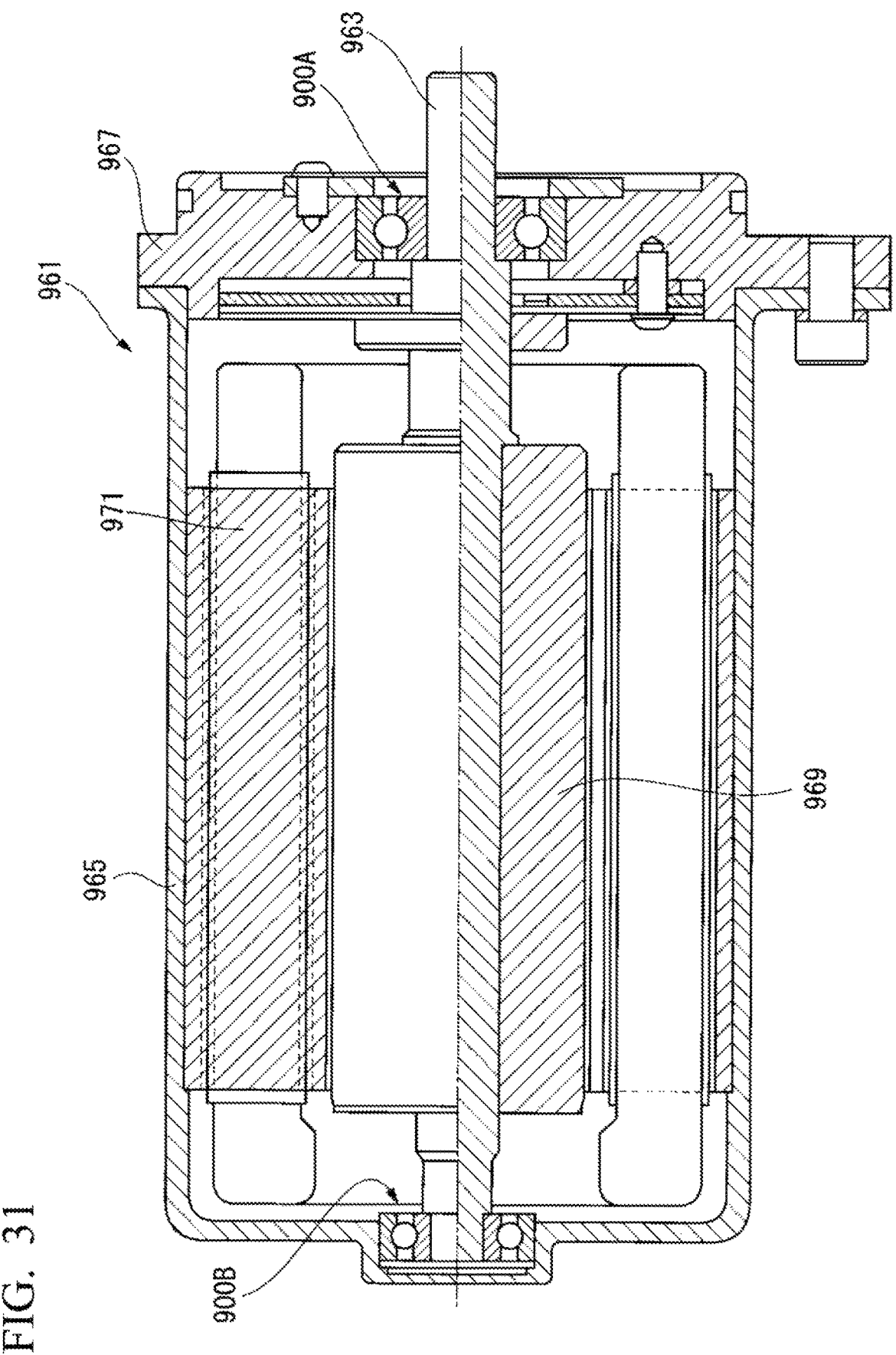

FIG. 31 is a schematic configuration diagram of a motor that adopts a bearing.

Figure 32:
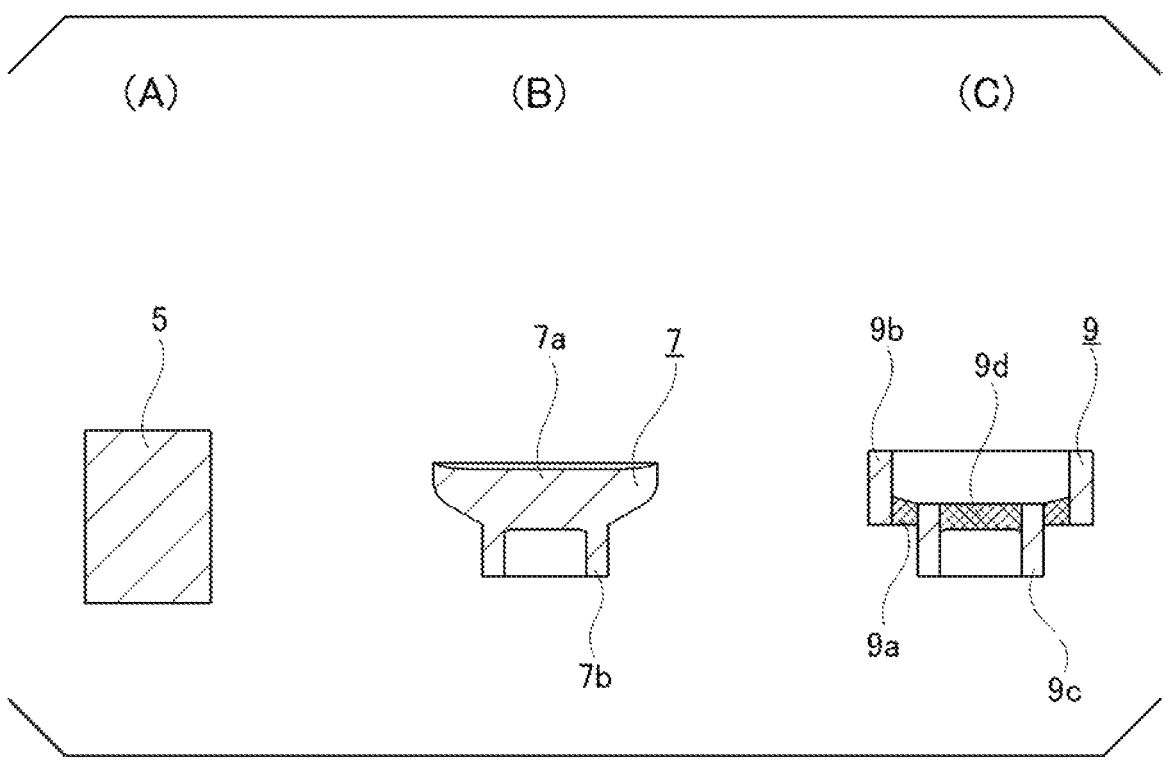

Part (A) of FIG. 32 is a cross-sectional view showing a billet, part (B) of FIG. 32 is a cross-sectional view showing a first intermediate material, and part (C) of FIG. 32 is a cross-sectional view showing a second intermediate material.

Figure 33:
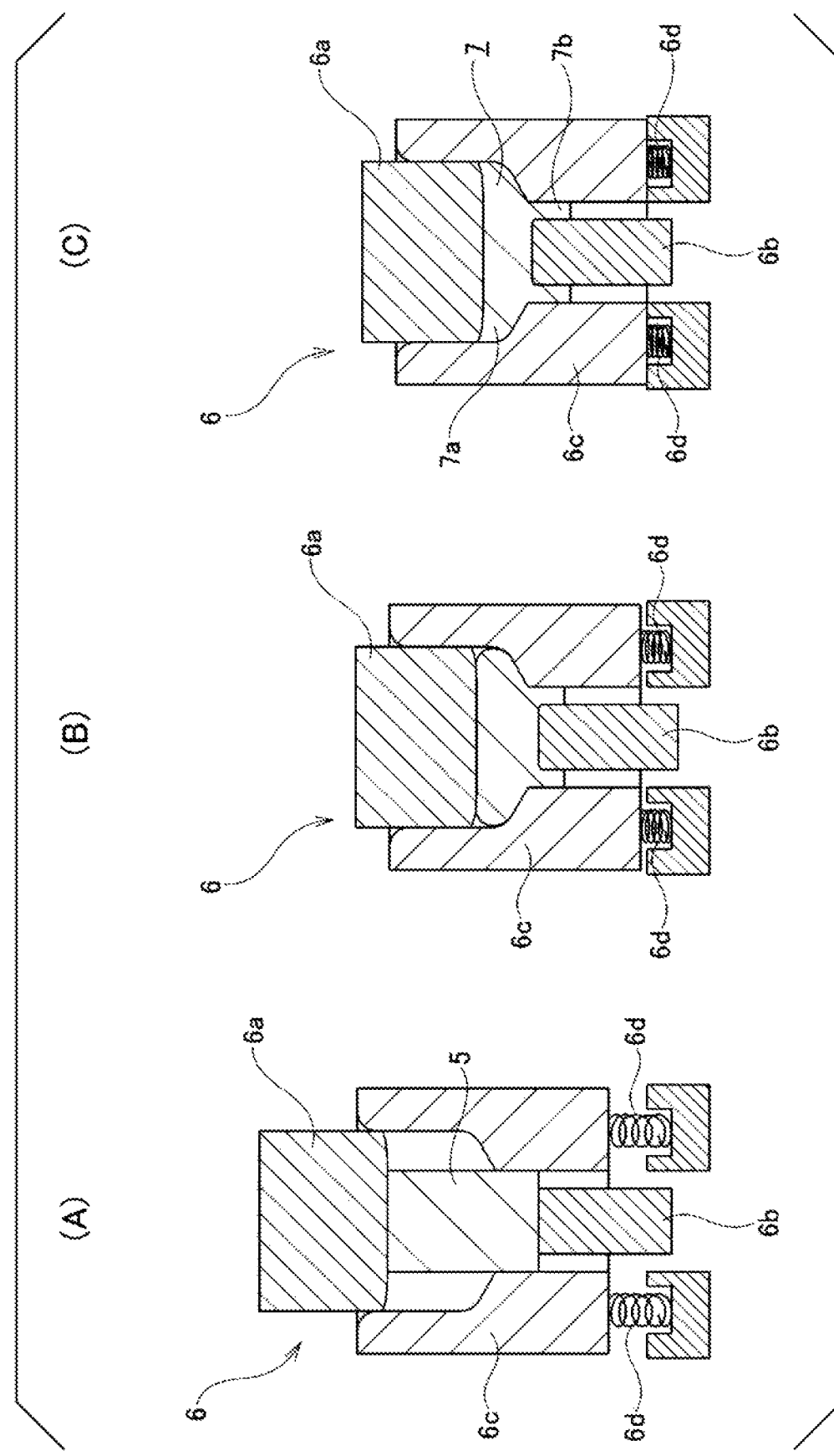

Parts (A) to (C) of FIG. 33 are cross-sectional views sequentially showing steps of processing the billet into the first intermediate material.

Figure 34:
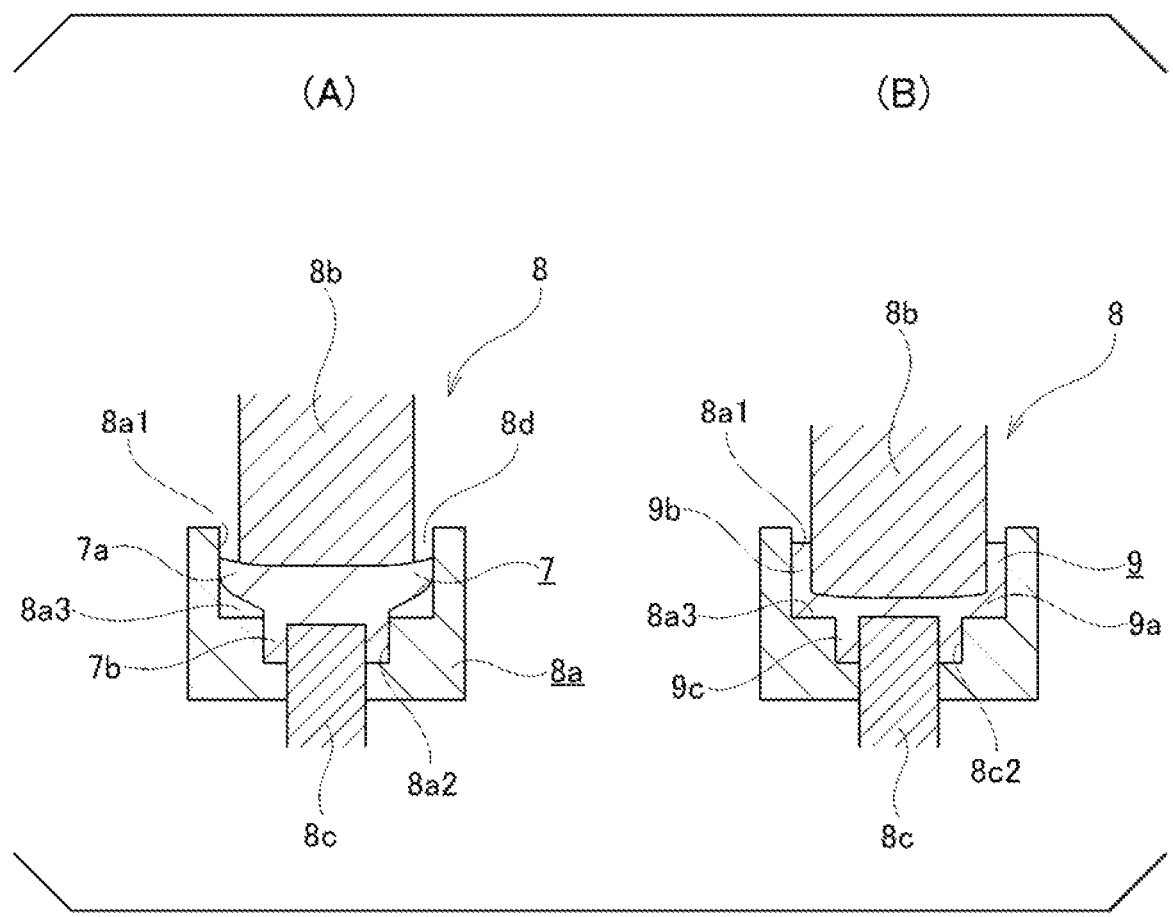

Parts (A) and (13) of FIG. 34 are cross-sectional views sequentially showing steps of processing the first intermediate material into the second intermediate material.

DESCRIPTION OF EMBODIMENTS

Hereinafter, an embodiment of the present invention will be described with reference to FIGS. 1 to 31. The reference numerals in parentheses correspond to the reference numerals shown in the description of the examples described later.

In an embodiment, a bearing element manufacturing method includes a first step of preparing a first piece (13, 25, 30, 32, 39) having a predetermined shape, a second step of obtaining a second piece (16, 27, 32, 33, 38, 40) by processing the first piece (13, 25, 30, 32, 39), and a third step of obtaining a first ring element (11) and a second ring clement (12) which are separated from each other. The predetermined shape includes a first ring portion (13b, 25a, 30a, 32a, 39h) serving as a large diameter portion and a second ring portion (13c, 25b, 30b, 32b, 39c) serving as a small diameter portion and these ring portions are arranged side by side in the axial direction. In the predetermined shape, the inner diameter and the outer diameter of the first ring portion (13b, 25a, 30a, 32a, 39b) are larger than the inner diameter and the outer diameter of the second ring portion (13c, 25b, 30b, 32b, 39c). In the second step, the second piece (16, 27, 32, 33, 38, 40) includes a third ring portion (16a, 27a, 32a, 33a, 38a, 40a) corresponding to the first ring portion (13b, 25a, 30a, 32a, 39b) in the first step and a fourth ring portion (16b, 27b, 32b, 33b, 38b, 40b) corresponding to the second ring portion (13c, 25b, 30b, 32b, 39c) in the first step. In the third step, the first ring element (11) serving as a large diameter ring element corresponds to the third ring portion (16a, 27a, 32a, 33a, 38a, 40a) in the second step. In the third step, the second ring element (12) serving as a small diameter ring element corresponds to the fourth ring portion (16b, 27b, 32b, 33b, 38b, 40b) in the second step. The second step includes preparing a first set (TS1) as a processing tool set, preparing a second set (TS2) as a processing tool set, and deforming the first piece (13, 25, 30, 32, 39) by using the first set (TS1) and the second set (TS2). The first set (TS1) includes a first member (17c, 28c, 34d) and a second member (17b, 28b, 34e) disposed inside or outside the first member (17c, 28c, 34d). The second set (TS2) includes a third member (17f, 28f, 34c) and a fourth member (17e, 28e, 34b) disposed inside or outside the third member (17f, 28f, 34c). At least temporarily in the second step, (a) the first piece (13, 25, 30, 32, 39) is disposed between the first set (TS1) and the second set (TS2) in the axial direction, (b) the first set (TS1) contacts a first axial surface (AF1) of the first piece (13, 25, 30, 32, 39), and (c) the second set (TS2) contacts a second axial surface (AF2) of the first piece (13, 25, 30, 32, 39). Due to the contact, the first piece (13, 25, 30, 32, 39) is held between the first set (TS1) and the second set (TS2) in the axial direction so that the axial movement is regulated. The first piece (13, 25, 30, 32, 39) is deformed by relatively moving the second member (17b, 28b, 34e) in the first axial direction with respect to the first member (17c, 28c, 34d) while maintaining the above (a), (b), and (c). Further, the first piece (13, 25, 30, 32, 39) is deformed by relatively moving the fourth member (17e, 28e, 34b) in the second axial direction with respect to the third member (17f, 28f, 34c) while maintaining the above (a), (b), and (c). The first axial direction and the second axial direction are parallel to each other. The second axial direction is opposite to the first axial direction. The first axial surface (AF1) and the second axial surface (AF2) face the opposite directions. The first axial surface (AF1) is disposed toward the first axial direction and the second axial surface (AF2) is disposed toward the second axial direction. The direction of the second axial surface (AF2) is opposite to the direction of the first axial surface (AF1).

In the manufacturing method including the first step, the second step, and the third step, the number of steps is smaller than that of the related art and two bearing elements (first ring element (11), second ring element (12)) independent from each other and having different diameters can be obtained from one material. In the second step, the axial dimension of the first ring portion (13b, 25a, 30a, 32a, 39b) serving as the large diameter portion and the axial dimension of the second ring portion (13c, 25b, 30b, 32b, 39c) serving as the small diameter portion are regulated by the first tool (TS1) and the second tool (TS2). This regulation is advantageous in reducing the amount of cutting and/or grinding in the post-treatment. Further, it is possible to realize multiple plastic workings (pressing) in the same step (so-called one chuck) without separating a workpiece (first piece) from a processing device by using the first set (TS1) and the second set (TS2) at the same time.

In an example, the movement of the second member (17b, 28b, 34e) and the movement of the fourth member (17e, 28e, 34b) are performed sequentially or performed at least temporarily simultaneously while the first piece (13, 25, 30, 32, 39) is disposed between the first set (TS1) and the second set (TS2) in the axial direction, that is, the above (a), (b), and (c) are maintained.

For example, in the first set (TS1), the second member (17b, 28b, 34e) is disposed inside the first member (17c, 28c, 34d) and the fourth member (17e, 28e, 34b) is disposed inside the third member (17f, 28f, 34c). For example, the outer diameter of the second member (17b, 28b, 34e) is substantially equal to the outer diameter of the fourth member (17e, 28e, 34b). For example, the second member (17b, 28b, 34e) and the fourth member (17e, 28e, 34b) which are disposed on both axial sides of the first piece (13, 25, 30, 32, 39) move toward the axial inside. For example, the second member (17b, 28b, 34e) and the fourth member (17e, 28e, 34b) move along the axial direction to be closer to each other. In accordance with the axial movement of the second member (17b, 28b, 34e) and the fourth member (17e, 28e, 34b), the first piece (13, 25, 30, 32, 39) is processed so that at least a part of the inner peripheral surface of the fourth ring portion (16b, 27b, 32b, 33b, 38b, 40b) is defined.

In an example, the outer peripheral surface or the inner peripheral surface of the second member (17b, 28b, 34e) slides with respect to the inner peripheral surface or the outer peripheral surface of the first member (17c, 28c, 34d). For example, the inner peripheral surface or the outer peripheral surface of the first member (17c, 28c, 34d) faces the outer peripheral surface or the inner peripheral surface of the second member (17b, 28b, 34e).

In an example, at least one of the first member (17c, 28c, 34d) and the second member (17b, 28b, 34e) includes an inclined surface (17b1, 17e1, 28b1, 28e1, 34b3) which is inclined with respect to the axial direction and comes into press-contact with the first piece (13, 25, 30, 32, 39). For example, the inclined surface (17b1, 17e1, 28b1, 28e1, 34b3) is disposed to come into contact with the corner of the first piece (13, 25, 30, 32, 39). For example, when at least one of the second member (17b, 28b, 34e) and the fourth member (17e, 28e, 34b) moves, the corner of the first piece (13, 25, 30, 32, 39) is subjected to plastic working (pressing process) to be a chamfered portion by the inclined surface (17b1, 17e1, 28b1, 28e1, 34b3).

In an example, in the second step, the axial dimension of the first ring portion (13b, 25a, 30a, 32a, 39b) and the axial dimension of the second ring portion (13c, 25b, 30b, 32b, 39c) are regulated by the first tool (TS1) and the second tool (TS2) and the chamfered portion is formed by press forming. This regulation is advantageous in reducing the amount of cutting and/or grinding in the post-treatment step while suppressing the press load or the number of steps.

In an example, the deformation of the first piece (13, 25, 30, 32, 39) includes (a) forming a hole (axial hole) in the first piece (13, 25, 30, 32, 39), (b) shaving the inner peripheral surface or the outer peripheral surface of the first piece (13, 25, 30, 32, 39) in the axial direction, (c) processing the inner peripheral surface or the outer peripheral surface of the first piece (13, 25, 30, 32, 39) to gather an extra thickness in at least one position in the axial direction, and (d) forming a chamfered portion in the first piece (13, 25, 30, 32, 39). Two or more of the above-described processes are performed while the first piece (13, 25, 30, 32, 39) is sandwiched between the first set (TS1) and the second set (TS2) in the second step (one chuck). That is, multiple processes are performed in the same step without separating the workpiece (first piece) from the processing device.

In an embodiment, a bearing manufacturing method includes a step of manufacturing a bearing element according to the manufacturing method and this is advantageous in reducing the cost of the bearing.

In an embodiment, a machine manufacturing method includes a step of manufacturing a bearing element according to the manufacturing method and this is advantageous in reducing the cost of the machine having the bearing.

In an embodiment, a vehicle manufacturing method includes a step of manufacturing a bearing element according to the manufacturing method and this is advantageous in reducing the cost of the vehicle having the bearing.

In an embodiment, a bearing element has traces produced according to the bearing element manufacturing method. In an example, the trace is a metal flow (metal fiber flow, fibrous metal structure) observed in the cross-section of the bearing element. FIGS. 29 and 30 show an example of the metal flow in the axial cross-section of the bearing element.

In an embodiment, as shown in FIGS. 29 and 30, the bearing element includes a body (2, 11) having a ring shape. The body (2, 11) includes a first chamfered portion (2b1) which is formed between an outer peripheral surface (2c, 11c) and a first axial surface (2f1, 11a1) and a second chamfered portion (2b2) which is formed between an outer peripheral surface (2c, 11c) and a second axial surface (2f2, 11a2). The metal flow of the body (2, 11) includes a first pattern (MFP1) which is continuous along the first chamfered portion (2b1) in the vicinity of the surface of the first chamfered portion (2b1), a second pattern (MFP2) which is continuous along the second chamfered portion (2b2) in the vicinity of the surface of the second chamfered portion (2b2), and a third pattern (MFP3) which is continuous along the outer peripheral surface (2c, 11c) in the vicinity of the outer peripheral surface (2c, 11c). The third pattern (MFP3) is asymmetric (non-axisymmetric) with respect to a line (virtual line, ACL) passing through the axial center of the body (2, 11) and along the radial direction. For example, in the third pattern (MFP3), the distance between the plurality of line elements is relatively wide in the region between the first axial surface (11a1) and the line (ACL) and is relatively narrow in the region between the first axial surface (11a1)

and the line (ACL). Such a bearing element is advantageous in reducing the manufacturing cost.

In an example, the distance between the plurality of line elements in the third pattern (MFP3) changes to be gradually narrowed from the first axial surface (11a1) toward the second axial surface (11a2). For example, the first axial surface (11a1) is an axial end surface. The second axial surface (11a2) is an axial end surface. The second axial surface (11a1) is an opposite surface of a first axial surface (11a2).

In an example, the distance between the plurality of line elements in the first pattern (MFP1) is wider than the distance between the plurality of line elements in the second pattern (MFP2). An average value (first average value) of the distance between the plurality of lines in the first pattern (MFP1) is larger than an average value (second average value) of the distance of the plurality of lines in the second pattern (MFP2). For example, the first average value/the second average value can be 1.1, 1.2, 1.3, 1.4, 1.5, 1.6, 1.7, 1.8, 1.9, 2.0, 2.5, or 3.0 times or more.

In an example, the metal flow further includes a fourth pattern (MFP4) which is continuous along the first axial surface (11a1) in the vicinity of the first axial surface (11a1) and a fifth pattern (MFP5) which is continuous along the second axial surface (11a2) in the vicinity of the second axial surface (11a2).

In an example, the distance between the plurality of line elements in the fourth pattern (MFP4) is wider than the distance between the plurality of line elements in the fifth pattern (MFP5). An average value (fourth average value) of the distance between the plurality of lines in the fourth pattern (MFP4) is larger than an average value (fifth average value) of the distance between the plurality of lines in the fifth pattern (MFP5). For example, the fourth average value/the fifth average value can be 1.1, 1.2, 1.3, 1.4, 1.5. 1.6, 1.7, 1.8, 1.9, 2.0, 2.5, or 3.0 times or more.

In an example, the line elements are continuous in at least three patterns of the first pattern (MFP1), the second pattern (MFP2), the third pattern (MFP3), the fourth pattern (MFP4), and the fifth pattern (MFP5). The line element having a continuous metal flow is advantageous in increasing the strength of the body (2, 11).

In an example, each of the fourth pattern (MFP4) and the fifth pattern (MFP4) includes a plurality of line elements intersecting the inner peripheral surface (2a, 2g, 11b) of the body (2, 11).

In an embodiment, a bearing includes the bearing element and this is advantageous in reducing the cost of the bearing.

In an embodiment, a machine includes the bearing and this is advantageous in reducing the cost of the bearing.

In an embodiment, a vehicle includes the bearing and this is advantageous in reducing the cost of the bearing.

The above-described bearing element or bearing can be applied to, for example, bearings 900A and 900B supporting a rotation shaft 963 of a motor 961 shown in FIG. 31.

In FIG. 31, the motor 961 is a brushless motor and includes a cylindrical center housing 965 and a substantially disc-shaped front housing 967 which closes one opening end portion of the center housing 965. The rotatable rotation shaft 963 is supported along the axis inside the center housing 965 through the bearings 900A and 900B disposed on the bottom portions of the front housing 967 and the center housing 965. A motor driving rotor 969 is provided around the rotation shaft 963 and a stator 971 is fixed to the inner peripheral surface of the center housing 965.

The motor 961 is generally mounted on a machine or a vehicle and rotationally drives the rotation shaft 963 supported by the bearings 900A and 900B.

The bearing element or bearing can he applied to machines and various manufacturing devices having a rotation portion, for example, a rotation support portion of a screw device such as a ball screw device and a linear motion device such as an actuator (a combination of a linear motion guide bearing and a ball screw, an XY table, or the like). Further, the bearing element or bearing can be applied to a steering device such as a wiper, a power window, an electric door, an electric seat, a steering column (for example, an electric tilt telesco steering column), a universal joint, an intermediate gear, a rack and pinion, an electric power steering device, and a worm reducer. Furthermore, the bearing element or bearing can be applied to various vehicles such as automobiles, motorcycles, and railways. The bearing having this configuration can be suitably applied to a portion that rotates relative to each other, which can lead to improvement in product quality and cost reduction.

As the bearing provided with the bearing element, various types such as a rolling bearing and a sliding bearing can be suitably applied. For example, the bearing element. can be applied to outer and inner races of a radial rolling bearing, outer and inner races of a radial cylindrical roller bearing using a cylindrical roller (including needle), and outer and inner races of a radial tapered roller bearing using a tapered roller.

First Example

A first example of the present invention will be described with reference to FIGS. 1 to 11. This example is an example in which the present invention is applied to a method of manufacturing an outer race 2 and an inner race 3 constituting a radial rolling bearing 1. The radial rolling bearing 1 includes, as shown in FIG. 1, the outer race 2 having an outer race track 2a formed on an inner peripheral surface, the inner race 3 having an inner race track 3a formed on an outer peripheral surface, and a plurality of rolling elements 4 arranged between the outer race track 2a and the inner race track 3a in a rollable manner.

Additionally, the radial rolling bearing 1 of this example is composed of a single row deep groove type ball bearing using a ball as the rolling element 4.

The outer race 2 includes radially outer chamfered portions 2b1 and 2b2 which are formed at the connection portions between the outer peripheral surface and both axial end surfaces to be inclined in a direction in which the outer diameter dimension decreases as it goes toward the axial outside. In this example, the radially outer chamfered portions 2b1 and 2b2 are formed as conical surfaces each having a linear generatrix shape. However, the radially outer chamfered portion may be formed as a convex curved surface having an arcuate generatrix shape.

Additionally, in the radial rolling bearing 1, the axial outside means the outside (both sides) of the radial rolling bearing 1 in the width direction and the axial inside means the center side of the radial rolling bearing 1 in the width direction.

The entire outer peripheral surface of the outer race 2 including the radially outer chamfered portions 2b1 and 2b2 is formed as a forged surface that has not been finished by a grinding process or the like.

The inner race 3 includes radially inner chamfered portions 3b1 and 3b2 which are formed at the connection portions between the inner peripheral surface and both axial end surfaces to be inclined in a direction in which the inner diameter dimension increases as it goes toward the axial outside. In this example, the radially inner chamfered portions 3b1 and 3b2 are formed as conical surfaces each having a linear generatrix shape. However, the radially inner chamfered portion can be formed as a convex curved surface having an arcuate generatrix shape.

At least a portion provided with the radially inner chamfered portions 3b1 and 3b2 in the inner peripheral surface of the inner race 3 is formed as a forged surface that has not been finished by a grinding process or the like.

The outer race 2 and the inner race 3 of this example are manufactured by performing cold plastic working on a single columnar material (billet) 10 to obtain a large diameter cylindrical member (first ring element, bearing element) 11 and a small diameter cylindrical member (second ring element, bearing element) 12 having different diameter dimensions and performing a necessary post-treatment (finishing) such as a cold rolling (CRF) process, a cutting process, a grinding process, and a heat treatment on the large diameter cylindrical member 11 and the small diameter cylindrical member 12. A method of manufacturing the large diameter cylindrical member 11 and the small diameter cylindrical member 12 will be described with reference to FIGS. 4 to 10.

In this example, the columnar material (billet) 10 shown in FIG. 4(A) is sequentially subjected to an upsetting process and a front-rear extruding process to obtain a preliminary intermediate material (first piece) 13 shown in FIG. 4(C) and the preliminary intermediate material 13 is subjected to plastic working to obtain the large diameter cylindrical member 11 and the small diameter cylindrical member 12. In this example, the total number of steps of manufacturing the large diameter cylindrical member 11 and the small diameter cylindrical member 12 from the single columnar material 10 is eight steps by including a step of cutting a long wire to a predetermined length to obtain the columnar material 10, a step of performing an upsetting process on the columnar material 10 to obtain a preliminary material 14 shown in FIG. 4(B), and a step of extruding the preliminary material 14 in the front and rear direction to obtain the preliminary intermediate material 13.

Hereinafter, each step will be described in order.

Additionally, in the example shown in the drawings, the axial direction of the workpiece (the columnar material 10, the large diameter cylindrical member 11, and the small diameter cylindrical member 12) is disposed in the vertical direction (the up and down direction), but the axial direction of the workpiece can be disposed in an arbitrary direction. That is, for example, the axial direction of the workpiece can be disposed in the horizontal direction or a direction inclined with respect to the vertical direction and the horizontal direction.

Further, unless otherwise specified, the axial direction means the axial direction of the workpiece, one axial side means the side of the large diameter cylindrical portion 13b of the preliminary intermediate material 13, and the other axial side means the side of the small diameter cylindrical portion 13c of the preliminary intermediate material 13.

First, in a first step (cutting step), a long wire drawn from an uncoiler is cut to a predetermined length to obtain the columnar material 10 as shown in FIG. 4(A).

In a second step (upsetting step), the outer diameter dimension of the columnar material 10 is expanded while the columnar material is crushed in the axial direction to obtain the thick disc-shaped or beer barrel-shaped preliminary material 14 shown in FIG. 4(B) in which the outer diameter dimension of the axial intermediate portion is larger than the outer diameter dimensions of both axial portions.

In a third step (front-rear extruding step), the preliminary material 14 is subjected to a front-rear extruding process of axially extruding a thick portion (metal material) existing on both axial sides and the radial outside while the center portions of both axial end surfaces of the preliminary material 14 are crushed to approach each other in the axial direction to obtain the preliminary intermediate material 13 shown in FIG. 4(C). The preliminary intermediate material 13 (first piece) includes a disc-shaped side plate portion 13a, a large diameter cylindrical portion (first ring portion) 13b which protrudes from the radially outer portion of one axial surface (the upper surface of FIG. 4(C)) of the side plate portion 13a toward one axial side, and a small diameter cylindrical portion (second ring portion) 13c which protrudes from the radial intermediate portion of the other axial surface (the lower surface of FIG. 4(C)) of the side plate portion 13a toward the other axial side.

The large diameter cylindrical portion 13b has an outer diameter dimension equal to the outer diameter dimension of the large diameter cylindrical member 11 to be obtained. Additionally, the inner diameter dimension of the large diameter cylindrical portion 13b does not need to be equal to the inner diameter dimension of the large diameter cylindrical member 11 to he obtained and is preferably smaller than the inner diameter dimension of the large diameter cylindrical member 11.

The small diameter cylindrical portion 13c has an outer diameter dimension equal to the outer diameter dimension of the small diameter cylindrical member 12 to be obtained. Additionally, the inner diameter dimension of the small diameter cylindrical portion 13c does not need to be equal to the inner diameter dimension of the small diameter cylindrical member 12 to be obtained and is preferably smaller than the inner diameter dimension of the small diameter cylindrical member 12.

The third step is performed by using a press working device 15 shown in FIG. 5. The press working device 15 includes a die 15a, a mandrel 15b, and a punch 15c.

The die 15a includes an inner peripheral surface having a shape along the outer peripheral surface shape of the preliminary intermediate material 13 to be obtained. That is, the die 15a includes a stepped cylindrical inner peripheral surface formed by connecting a large diameter portion 15a1 on one axial side (the upper side of FIG. 5) to a small diameter portion 15a2 on the other axial side (the lower side of FIG. 5) with a stepped surface 15a3 facing one axial side.

The mandrel 15b is disposed at the center portion of the small diameter portion 15a2 of the die 15a.

The punch 15c is supported by the support table (not shown) of the press working device 15 to be axially displaceable.

In order to obtain the preliminary intermediate material 13 by performing a front-rear extruding process on the preliminary material 14 using the press working device 15, first, the preliminary material 14 is placed on the stepped surface 15a3 of the die 15a and the tip surface (one axial end surface) of the mandrel 15b. Next, the punch 15c is displaced toward the other axial side so that the tip surface (the other axial end surface) of the punch 15c presses the center portion of the preliminary material 14. Accordingly, the thick portion on the radially outer portion of the preliminary material 14 is moved to a portion between the outer peripheral surface of the mandrel 15b and the small diameter portion 15a2 and the thick portion at the radial intermediate portion of the preliminary material 14 is moved to a portion between the outer peripheral surface of the punch 15c and the large diameter portion 15a1 to obtain the preliminary intermediate material 13 while the center portion of the preliminary material 14 is crushed between the tip surface of the punch 15c and the tip surface of the mandrel 15b.

In a next fourth step, the preliminary intermediate material 13 is subjected to a small diameter side dimension regulating process of regulating the axial dimension of the small diameter cylindrical portion 13c to a predetermined dimension Ls (see FIG. 6) and forming the radially inner chamfered portions 3b1 and 3b2 at the connection portion between the inner peripheral surface and both axial end surfaces of the small diameter cylindrical portion 13c to obtain a first intermediate material 16 shown in FIG. 4(D). The first intermediate material (second piece) 16 includes a large diameter cylindrical portion (third ring portion) 16a on one axial side, a small diameter cylindrical portion (fourth ring portion) 16b on the other axial side, a connection plate portion 16c connecting the other axial end portion of the large diameter cylindrical portion 16a and the other axial end portion of the small diameter cylindrical portion 16b, and a partition wall portion 16d dividing one axial portion on the radial inside of the small diameter cylindrical portion 16b. The small diameter cylindrical portion 16b includes the radially inner chamfered portions 3b1 and 3b2 which are formed at the connection portion between the inner peripheral surface and both axial end surfaces.

Additionally, in this example, in the fourth step, the large diameter cylindrical portion 13b of the preliminary intermediate material 13 is not subjected to plastic working. However, in the example shown in the drawings, for convenience of description, the large diameter cylindrical portion 13b of the preliminary intermediate material 13 and the large diameter cylindrical portion 16a of the first intermediate material 16 are indicated by different reference numerals.

The fourth step is performed by using a press working device 17 shown in FIG. 6. The press working device 17 includes a die 17a, an inner pressing punch (second member) 17b, an outer pressing punch (first member) 17c, a presser punch 17d, an inner counter punch (fourth member) 17e, and an outer counter punch (third member) 17f.

The die 17a includes an inner peripheral surface having a shape along the outer peripheral surface shape of the first intermediate material 16 to be obtained. In this example, the inner peripheral surface shape of the die 17a is the same as the inner peripheral surface shape of the die 15a used in the front-rear extruding process (third step). That is, the die 17a includes a stepped cylindrical inner peripheral surface formed by connecting a large diameter portion 17a1 on one axial side to a small diameter portion 17a2 on the other axial side with a stepped surface 17a3 facing one axial side. However, the inner peripheral surface shape of the die used in the small diameter side dimension regulating process can be different from the inner peripheral surface shape of the die used in the front-rear extruding process.

The inner pressing punch 17b has a columnar shape and is supported at the center portion of the large diameter portion 17a1 of the die 17a to be axially displaceable with respect to the support table (not shown) of the press working device 17. The inner pressing punch 17b includes a chamfer forming portion (inclined surface) 17b1 formed at the tip portion (the other axial end portion, the lower end portion of FIG. 6) to have a shape along one axial radially inner chamfered portion 3b1 of the pair of radially inner chamfered portions 3b1 and 3b2 formed at the small diameter cylindrical portion 16b of the first intermediate material 16. That is, in this example, the chamfer forming portion 17b1 has a linear generatrix shape.

The outer pressing punch 17c has a cylindrical shape and is supported around the inner pressing punch 17b to be axially displaceable with respect to the support table.

The presser punch 17d has a cylindrical shape and is supported around the outer pressing punch 17c to be axially displaceable with respect to the support table.

The inner counter punch 17e has a columnar shape and is supported at the center portion of the small diameter portion 17a2 of the die 17a to be axially displaceable with respect to the support table (not shown) of the press working device 17. The inner counter punch 17e includes a chamfer forming portion (inclined surface) 17e1 formed at the tip portion (one axial end portion, the upper end portion of FIG. 6) to have a shape along the other axial radially inner chamfered portion 3b2 of the pair of radially inner chamfered portions 3b1 and 3b2 formed at the small diameter cylindrical portion 16l) of the first intermediate material 16. That is, in this example, the chamfer forming portion 17e1 has a linear generatrix shape.

The outer counter punch 17f has a cylindrical shape and is supported to be axially displaceable with respect to the support table. The outer counter punch 17f is inserted between the small diameter portion 17a2 of the die 17a and the outer peripheral surface of the inner counter punch 17e substantially without a gap (without a gap into which a thick portion forming the preliminary intermediate material 13 intrudes when the preliminary intermediate material 13 is processed into the first intermediate material 16).

In order to obtain the first intermediate material 16 by performing a small diameter side dimension regulating process on the preliminary intermediate material 13 using the press working device 17, first, the radially outer portion of the other axial surface of the side plate portion 13a of the preliminary intermediate material 13 is placed on the stepped surface 17a3 of the die 17a. Then, the presser punch 17d is displaced toward the other axial side so that the presser punch 17d presses one axial end surface of the large diameter cylindrical portion 13b of the preliminary intermediate material 13 (the large diameter cylindrical portion 13b is sandwiched between the stepped surface 17a3 of the die 17a and the presser punch 17d in the axial direction).

In this state, the inner pressing punch 17b and the outer pressing punch 17c are displaced toward the other axial side and the inner counter punch 17e and the outer counter punch 17f are displaced toward one axial side. Then, the small diameter cylindrical portion 13c of the preliminary intermediate material 13 is axially crushed between the group of the inner pressing punch 17b and the outer pressing punch 17c and the group of the inner counter punch 17e and the outer counter punch 17f. Accordingly, the axial dimension of the small diameter cylindrical portion 13c is regulated to a predetermined dimension Ls and the radially inner chamfered portions 3b1 and 3b2 are formed at the same time at the connection portion between the inner peripheral surface and both axial end surfaces of the small diameter cylindrical portion 13c by the chamfer forming portion 17e1 of the inner counter punch 17e and the chamfer forming portion 17b1 of the inner pressing punch 17b.

Additionally, at this time, the tip surface of the inner pressing punch 17b presses a portion located on the radial inside in relation to the small diameter cylindrical portion 13c in the side plate portion 13a of the preliminary intermediate material 13 so to be offset toward the other axial side with respect to the radially outer portion of the side plate portion 13a. Accordingly, the radially inner portion of the side plate portion 13a is the partition wall portion 16d and the radially outer portion of the side plate portion 13a is the connection plate portion 16c. In other words, in this example, the partition wall portion 16d corresponds to a portion which is punched out and removed by a punching process to be described later and is located on the radial inside in relation to the inner peripheral surface of the small diameter cylindrical portion 13c in the side plate portion 13a. As described above, the first intermediate material 16 is obtained.

In a next fifth step, the first intermediate material 16 is subjected to a large diameter side dimension regulating process of regulating the axial dimension of the large diameter cylindrical portion 16a to a predetermined dimension Lb (see FIG. 7) and a first large diameter side chamfering process of forming the other axial radially outer chamfered portion 2b2 at the connection portion between the outer peripheral surface and the other axial end surface of the large diameter cylindrical portion 16a to obtain a second intermediate material 18 shown in FIG. 4(E). The second intermediate material 18 includes one axial large diameter cylindrical portion 18a, the other axial small diameter cylindrical portion 18b, a connection plate portion 18c connecting the other axial end portion of the large diameter cylindrical portion 18a to one axial end portion of the small diameter cylindrical portion 18b, and a partition wall portion 18d dividing one axial portion on the radial inside of the small diameter cylindrical portion 18b. The small diameter cylindrical portion 18b includes the radially inner chamfered portions 3b1 and 3b2 which are formed at the connection portion between the inner peripheral surface and both axial end surfaces and the large diameter cylindrical portion 18a includes the other axial radially outer chamfered portion 2b2 which is formed at the connection portion between the outer peripheral surface and the other axial end surface.

Additionally, in this example, in the fifth step, a portion other than the large diameter cylindrical portion 16a, that is, the small diameter cylindrical portion 16b, the connection plate portion 16c, and the partition wall portion 16d of the first intermediate material 16 are not subjected to plastic working. However, in the example shown in the drawings, for convenience of description, the small diameter cylindrical portion 16b, the connection plate portion 16c, and the partition wall portion 16d of the first intermediate material 16 and the small diameter cylindrical portion 18b, the connection plate portion 18c, and the partition wall portion 18d of the second intermediate material 18 are indicated by different reference numerals.

The fifth step is performed by using a press working device 19 shown in FIG. 7. The press working device 19 includes a die 19a, a pressing punch 19b, a mandrel 19c, and a sleeve 19d.

The die 19a includes a stepped cylindrical inner peripheral surface which includes one axial large diameter portion 19a1, the other axial small diameter portion 19a2, and a stepped surface 19a3 bent from one axial end portion of the small diameter portion 19a2 toward the radial outside to face one axial side. The stepped surface 19a3 includes a flat surface portion 19a3a which is disposed on the radial inside and is orthogonal to the center axis of the die 19a and a conical chamfer forming portion 19a3b which is disposed on the radial outside and is inclined toward one axial side as it goes toward the radial outside.

The pressing punch 19b has a cylindrical shape and is supported to be axially displaceable with respect to the support table (not shown) of the press working device 19. The pressing punch 19b is fitted into the large diameter portion 19a1 of the die 19a substantially without a gap.

The mandrel 19c has a columnar shape and is supported inside the large diameter portion 19a1 of the die 19a to be axially displaceable with respect to the support table.

The sleeve 19d has a cylindrical shape and is supported inside the small diameter portion 19a2 of the die 19a to be axially displaceable with respect to the support table.

In order to obtain the second intermediate material 18 by performing a large diameter side dimension regulating process and a first large diameter chamfering process on the first intermediate material 16 using the press working device 19, first, the connection plate portion 16c of the first intermediate material 16 is placed on the stepped surface 19a3 of the die 19a. Then, the mandrel 19c is displaced toward the other axial side (the lower side of FIG. 7) so that the tip surface (the other axial end surface) of the mandrel 19c presses the end surface on one axial side (the upper side of FIG. 7) of the small diameter cylindrical portion 16b of the first intermediate material 16. Further, the sleeve 19d is displaced toward one axial side so that the tip surface (one axial end surface) of the sleeve 19d is allowed to contact or closely face the other axial end surface of the small diameter cylindrical portion 16b of the first intermediate material 16.

In this state, the pressing punch 19b is displaced toward the other axial side so that the large diameter cylindrical portion 16a of the first intermediate material 16 is axially crushed between the stepped surface 19a3 of the die 19a and the tip surface (the other axial end surface) of the pressing punch 19b. Accordingly, the axial dimension of the large diameter cylindrical portion 16a is regulated to a predetermined dimension Lb and the radially outer chamfered portion 2b2 is formed at the connection portion between the outer peripheral surface and the other axial end surface of the large diameter cylindrical portion 16a by the chamfer forming portion 19a3b. As described above, the second intermediate material 18 is obtained.

In the next sixth step, the second intermediate material 18 is subjected to a punching process of punching out and removing the partition wall portion 18d and a small diameter side shaving process of shaving the small diameter cylindrical portion 18b to obtain a third intermediate material 20 shown in FIG. 4(F). The third intermediate material 20 includes one axial large diameter cylindrical portion 20a, the other axial small diameter cylindrical portion 20b, and a connection plate portion 20c connecting the other axial end portion of the large diameter cylindrical portion 20a to one axial end portion of the small diameter cylindrical portion 20b. The small diameter cylindrical portion 20b includes the radially inner chamfered portions 3b1 and 3b2 formed at the connection portion between the inner peripheral surface and both axial end surfaces and the large diameter cylindrical portion 20a includes the other axial radially outer chamfered portion 2b2 formed at the connection portion between the outer peripheral surface and the other axial end surface.

Additionally, in this example, in a sixth step, the outer peripheral surfaces of the large diameter cylindrical portion 18a, the connection plate portion 18c, and the small diameter cylindrical portion 18b of the second intermediate material 18 are not subjected to plastic working. However, in the example shown in the drawings, for convenience of description, the large diameter cylindrical portion 18a and the connection plate portion 18c of the second intermediate material 18 and the large diameter cylindrical portion 20a and the connection plate portion 20c of the third intermediate material 20 are indicated by different reference numerals.

The sixth step is performed by using a press working device 21 shown in FIG. 8. The press working device 21 includes a die 21a, a shaving cutter 21b, and a presser punch 21c.

The die 21a includes a cylindrical inner peripheral surface.

The shaving cutter 21b has a columnar shape and is supported at the center portion of the axially outer portion (the lower portion of FIG. 8) of the die 21a to be axially displaceable with respect to the support table (not shown) of the press working device 21. The shaving cutter 21b has an outer diameter dimension which is substantially equal to the inner diameter dimension of the small diameter cylindrical portion 20b of the third intermediate material 20 to be obtained and includes a blade portion 21b1 which is formed at the radially outer edge of the tip portion (one axial end portion, the upper end portion of FIG. 8) to perform a shaving process of slightly scraping the surface of the inner peripheral surface of the small diameter cylindrical portion 18b of the second intermediate material 18 to be smooth on the inner peripheral surface and to punch out the partition wall portion 18d.

The presser punch 21c has a substantially cylindrical shape and is supported at the center portion of one axial portion (the upper portion of FIG. 8) of the die 21a to be axially displaceable with respect to the support table.

In order to obtain the third intermediate material 20 by performing a punching process and a small diameter side shaving process on the second intermediate material 18 using the press working device 21, the second intermediate material 18 is disposed inside the die 21a to regulate the displacement toward one axial side by the presser punch 21c. In this state, the shaving cutter 21b is displaced toward one axial side so that the blade portion 21b1 slightly scrapes (shaves) the inner peripheral surface of the small diameter cylindrical portion 18b to be smooth and punches out the partition wall portion 18d and the partition wall portion 18d is simultaneously removed (taken out) from one axial opening of the small diameter cylindrical portion 18b. More specifically, the shaving cutter 21b is inserted from the other axial opening of the small diameter cylindrical portion 18b and is displaced toward one axial side so that the surface of the inner peripheral surface of the axially outer portion of the small diameter cylindrical portion 18b is slightly scraped to be smooth. Then, the tip portion of the shaving cutter 21b is brought into contact with the other axial surface of the partition wall portion 18d. When the shaving cutter 21b is further displaced toward one axial side from this state, the partition wall portion 18d is punched out and the surface of the portion provided with the partition wall portion 18d (the portion connected to the radially outer end portion of the partition wall portion 18d) in the inner peripheral surface of the small diameter cylindrical portion 18b is slightly scraped to be smooth. As described above, the third intermediate material 20 is obtained.

In a next seventh step, the third intermediate material 20 is subjected to a separating process of separating the large diameter cylindrical portion 20a (and the connection plate portion 20c) and the small diameter cylindrical portion 20b from each other to obtain a preliminary large diameter cylindrical member 22 and a small diameter cylindrical member 12 shown in FIG. 4(6). The preliminary large diameter cylindrical member 22 includes a large diameter cylindrical portion 22a and an inward flange portion 22b bent from the other axial end portion of the large diameter cylindrical portion 22a toward the radial inside. The small diameter cylindrical member 12 has an outer diameter dimension smaller than the inner diameter dimension of the large diameter cylindrical portion 22a of the preliminary large diameter cylindrical member 22 and includes the radially inner chamfered portions 3b1 and 3b2 formed at the connection portion between both axial end surfaces and the inner peripheral surface by the fourth step.

Additionally, in this example, in the seventh step, the third intermediate material 20 is just divided into the large diameter cylindrical portion 20a, the connection plate portion 20c, and the small diameter cylindrical portion 20b, but is not subjected to plastic working that changes each shape. However, in the example shown in the drawings, for convenience of description, the large diameter cylindrical portion 20a of the third intermediate material 20 and the large diameter cylindrical portion 22a of the preliminary large diameter cylindrical member 22 are indicated by different reference numerals.

Further, in the example shown in the drawings, the seventh step is performed while the direction with respect to the axial direction of the third intermediate material 20 to be processed in the seventh step is inverted (to rotate by 180°) from the direction with respect to the axial direction of the third intermediate material 20 processed in the sixth step. However, the seventh step can be also performed while the direction with respect to the axial direction of the third intermediate material 20 to be processed in the seventh step is the same as the direction with respect to the axial direction of the third intermediate material 20 in the sixth step.

The seventh step is performed by using a press working device 23 shown in FIG. 9. The press working device 23 includes a die 23a, a sleeve 23b, a presser punch 23c, and a punching punch 23d.

The die 23a includes a cylindrical inner peripheral surface.

The sleeve 23b is supported by one axial portion (the lower portion of FIG. 9) of the die 23a.

The presser punch 23c has a cylindrical shape and is supported at the center portion of the axially outer portion (the upper portion of FIG. 9) of the die 23a to be axially displaceable with respect to the support table (not shown) of the press working device 23.

The punching punch 23d has a columnar shape and is supported at the center portion of the die 23a to be axially displaceable with respect to the support table.

In order to obtain the preliminary large diameter cylindrical member 22 and the small diameter cylindrical member 12 by performing a separating process on the third intermediate material 20 using the press working device 23, first, one axial end surface of the large diameter cylindrical portion 20a of the third intermediate material 20 is disposed on the other axial end surface of the sleeve 23b disposed inside the die 23a. Then, the presser punch 23c is displaced (moved downward) toward one axial side so that the tip surface (one axial end surface) of the presser punch 23c presses the other axial end surface of the large diameter cylindrical portion 20a of the third intermediate material 20 and the other axial surface of the connection plate portion 20c. In this state, the punching punch 23d is displaced toward the other axial side so that the small diameter cylindrical portion 20b of the third intermediate material 20 is punched out and is separated from the large diameter cylindrical portion 20a and the connection plate portion 20c. Accordingly, the preliminary large diameter cylindrical member 22 and the small diameter cylindrical member 12 are obtained. Additionally, the small diameter cylindrical member 12 of them is taken out from the press working device 23 and is set to the post-treatment step.

In a next eighth step (final press step), a large diameter side shaving process of shaving the inner peripheral surface of the preliminary large diameter cylindrical member 22 and a second large diameter side chamfering process of forming one axial radially outer chamfered portion 2b1 at the connection portion between one axial end surface and the inner peripheral surface of the large diameter cylindrical portion 22a are performed to obtain the large diameter cylindrical member 11 shown in FIG. 4(H). The large diameter cylindrical member 11 has a cylindrical shape and includes the radially outer chamfered portions 2b1 and 2b2 formed at the connection portion between both axial end surfaces and the outer peripheral surface.

Additionally, in the eighth step, the outer peripheral surface of the preliminary large diameter cylindrical member 22 is not subjected to plastic working.

The eighth step is performed by using a press working device 24 shown in FIG. 10. The press working device 24 includes a die 24a, a sleeve 24b, and a shaving cutter 24c.

The die 24a includes a cylindrical inner peripheral surface.

The sleeve 24b includes a conical chamfer forming portion 24b1 which is formed at the radially outer portion of the other axial end surface to be inclined toward the other axial side as it goes toward the radial outside and is supported by one axial portion (the lower portion of FIG. 10) of the die 24a.

The shaving cutter 24c has a columnar shape and is supported at the center portion of the axially outer portion (the upper portion of FIG. 10) of the die 21a to be axially displaceable with respect to the support table (not shown) of the press working device 24. The shaving cutter 24c has an outer diameter dimension substantially equal to the inner diameter dimension of the large diameter cylindrical member 11 to be obtained and includes a blade portion 24c1 which is formed at the radially outer edge of the tip portion (one axial end portion) to perform a shaving process of slightly scraping the surface of the inner peripheral surface to be smooth on the inner peripheral surface of the large diameter cylindrical portion 22a of the preliminary large diameter cylindrical member 22.

In order to obtain the large diameter cylindrical member 11 by performing a large diameter side shaving process on the preliminary large diameter cylindrical member 22 using the press working device 24, first, one axial end surface of the preliminary large diameter cylindrical member 22 is placed on the other axial end surface of the sleeve 24b disposed inside the die 24a. Next, the shaving cutter 24c is displaced toward one axial side. Accordingly, the inner peripheral surface of the large diameter cylindrical portion 22a of the preliminary large diameter cylindrical member 22 is slightly scraped to be smooth, the inward flange portion 22b is punched out to be removed, and the connection portion between the outer peripheral surface and one axial end surface of the large diameter cylindrical portion 22a is simultaneously pressed against the chamfer forming portion 24b1 of the sleeve 24b to form one axial radially outer chamfered portion 2b1. As described above, the large diameter cylindrical member 11 is obtained.

In the post-treatment step, the inner peripheral surface of the large diameter cylindrical member 11 is subjected to a cold rolling process or a cutting process to form the outer race track 2a. If necessary, a locking groove for locking a seal member is formed. If necessary, a heat treatment such as quenching is performed to obtain the outer race 2. However, in this example, the outer peripheral surface of the large diameter cylindrical member 11 is not subjected to a machining process such as a cutting process or a grinding process in the post-treatment step. Thus, the entire outer peripheral surface of the outer race 2 including the radially outer chamfered portions 2b1 and 2b2 is formed as a forged surface that has not been finished by a grinding process or the like.

In the post-treatment step, the outer peripheral surface of the small diameter cylindrical member 12 is subjected to a cold rolling process or a cutting process to form the inner race track 3a. If necessary, a groove to contact the tip portion of the seal member is formed. If necessary, a heat treatment such as quenching is performed to obtain the inner race 3. However, in this example, at least the radially inner chamfered portions 3b1 and 3b2 formed at end portion at both axial sides in the inner peripheral surface of the small diameter cylindrical member 12 are not machined by a cutting process or a grinding process in the post-treatment step. Thus, at least a portion provided with the radially inner chamfered portions 3b1 and 3b2 in the inner peripheral surface of the inner race 3 is formed as a forged surface that has not been finished by a grinding process or the like.

In the manufacturing method of this example, in the process in which one columnar material 10 is subjected to press working into the large diameter cylindrical member 11 and the small diameter cylindrical member 12, the axial dimension of the large diameter cylindrical portion 16a is regulated to a predetermined dimension Lb so that the axial dimension of the completed large diameter cylindrical member 11 is regulated and the axial dimension of the small diameter cylindrical portion 13c is regulated to a predetermined dimension Ls so that the axial dimension of the completed small diameter cylindrical member 12 is regulated. Therefore, it is not necessary to cut or grind the axial surface of the large diameter cylindrical member 11 or it is possible to suppress the amount of cutting or grinding to a small amount in order to regulate the axial dimension of the large diameter cylindrical member 11 to a desired dimension when processing the large diameter cylindrical member 11 into the outer race 2. Further, it is not necessary to cut or grind the axial surface of the small diameter cylindrical member 12 or it is possible to suppress the amount of cutting or grinding to a small amount in order to regulate the axial dimension of the small diameter cylindrical member 12 to a desired dimension when processing the small diameter cylindrical member 12 into the inner race 3. Thus, it is possible to reduce the manufacturing cost of the outer race 2 and the inner race 3.

In the manufacturing method of this example, in the process of processing the columnar material 10 into the large diameter cylindrical member 11 and the small diameter cylindrical member 12, the pair of radially outer chamfered portions 2b1 and 2b2 is formed in the large diameter cylindrical member 11 by press working and the pair of radially inner chamfered portions 3b1 and 3b2 are formed in the small diameter cylindrical member 12 by press working. Thus, it is not necessary to form the chamfered portion at the connection portion between the outer peripheral surface and both axial end surfaces of the large diameter cylindrical member and the connection portion between the inner peripheral surface and both axial end surfaces of the small diameter cylindrical member by a cutting process or the like after obtaining the large diameter cylindrical member and the small diameter cylindrical member which are the materials of the outer race and the inner race. From this aspect as well, it is possible to reduce the manufacturing cost of the outer race 2 and the inner race 3.

In the manufacturing method of this example, in the sixth step, a punching process of punching out and removing the partition wall portion 18d and a small diameter side shaving process of shaving the small diameter cylindrical portion 18b are performed. Accordingly, a portion provided with the partition wall portion 18d in the inner peripheral surface of the small diameter cylindrical portion 18b is also subjected to a shaving process after the partition wall portion 18d is punched out. In short, the shear and fracture surfaces formed on the inner peripheral surface of the small diameter cylindrical portion 18b by punching out the partition wall portion 18d can be shaved to be smooth. Therefore, it is possible to satisfactorily ensure the dimension accuracy of the inner peripheral surface of the small diameter cylindrical portion 20b of the third intermediate material 20 (the inner peripheral surface of the small diameter cylindrical member 12).

In the manufacturing method of this example, a separating process of separating the large diameter cylindrical portion 20a (and the connection plate portion 20c) and the small diameter cylindrical portion 20b from each other is performed in the seventh step and then a large diameter side shaving process of shaving the inner peripheral surface of the preliminary large diameter cylindrical member 22 is performed in the eighth step. Thus, the shear and fracture surfaces formed on the inner peripheral surface of the connection plate portion 20c can be shaved to be smooth by separating the small diameter cylindrical portion 20b from the large diameter cylindrical portion 20a (and the connection plate portion 20c). Therefore, it is possible to satisfactorily ensure the dimension accuracy of the inner peripheral surface of the large diameter cylindrical member 11.

In the manufacturing method of this example, the axial dimension of the small diameter cylindrical portion 13c is regulated to a predetermined dimension Ls and the radially inner chamfered portions 3b1 and 3b2 are simultaneously formed at the connection portion between the inner peripheral surface and both axial end surfaces of the small diameter cylindrical portion 13c. Therefore, it is possible to reduce the number of steps of manufacturing the large diameter cylindrical member 11 and the small diameter cylindrical member 12 from the columnar material 10. As a result, it is possible to reduce the manufacturing cost of the large diameter cylindrical member 11 and the small diameter cylindrical member 12 and further the manufacturing cost of the outer race 2 and the inner race 3. Specifically, the manufacturing method of this example can be easily performed by, for example, a former (multi-stage forging machine).

Further, in the manufacturing method of this example, in the fifth step, a large diameter side dimension regulating process of regulating the axial dimension of the large diameter cylindrical portion 16a to a predetermined dimension and a first large diameter side chamfering process of forming the other axial radially outer chamfered portion 2b2 in the large diameter cylindrical portion 16a are performed at the same time. Further, in the eighth step, a large diameter side shaving process of shaving the inner peripheral surface of the preliminary large diameter cylindrical member 22 and a second large diameter side chamfering process of forming one axial radially outer chamfered portion 2b1 in the large diameter cylindrical portion 22a of the preliminary large diameter cylindrical member 22 are performed at the same time. From this aspect as well, it is possible to reduce the number of steps of manufacturing the large diameter cylindrical member 11 and the small diameter cylindrical member 12 from the columnar material 10 and to reduce the manufacturing cost of the large diameter cylindrical member 11 and the small diameter cylindrical member 12 and further the manufacturing cost of the outer race 2 and the inner race 3.

In the outer race 2 obtained by performing post-treatment on the large diameter cylindrical member 11 obtained by the manufacturing method of this example, the entire outer peripheral surface of the outer race 2 including the radially outer chamfered portions 2b1 and 2b2 is formed as a forged surface that has not been finished by a grinding process or the like. Thus, as shown in parts (A) and (B) of FIG. 2, a metal flow $F_{out}$ in the outer race 2 is continuous (extends) along the radially outer chamfered portions 2b1 and 2b2 in the vicinity of the surfaces of the radially outer chamfered portions 2b1 and 2b2 (a portion from the surfaces of the radially outer chamfered portions 2b1 and 2b2 to the depth of about 20% to 30% of the outer diameter dimension of the outer race 2).

Further, a portion deviated from the outer race track 2a toward one axial side in the axial direction of the metal flow $F_{out}$ in the outer race 2 is provided with a curved portion T which is curved toward the radial outside as it goes from the axial inside toward the axial outside and is changed in the direction of folding back about 180° toward the radial inside. This reason will be described with reference to parts (A) and (B) of FIG. 11.

When a thick disc-shaped or beer barrel-shaped preliminary material 14 is obtained by axially crushing the columnar material 10 obtained by cutting a long wire to a predetermined length, a metal flow $F_{14}$ in the preliminary material 14 is curved so that the axially intermediate portion bulges most toward the radial outside as shown in FIG. 11(A). In other words, the metal flow $F_{14}$ extends toward the radial outside as it goes from one axial end portion toward the axially intermediate portion, folds back about 180° toward the radial inside at the axially intermediate portion, and extends toward the radial inside as it goes from the axially intermediate portion toward the other axial end portion.

Next, when the preliminary material 14 is subjected to a front-rear extruding process to obtain the preliminary intermediate material 13, a metal flow $F_{13}$ in the preliminary intermediate material 13 is a flow shown in FIG. 11(B). That is, the metal flow is substantially parallel to the center axis of the preliminary intermediate material 13 along the large diameter cylindrical portion 13b from one axial end portion to the axially intermediate portion of the large diameter cylindrical portion 13b. At the other axial end portion of the large diameter cylindrical portion 13b, the metal flow is curved toward the radial outside and is changed (curved) in the direction of folding back about 180° (in a substantially U shape or V shape) toward the radial inside. That is, the metal flow $F_{13}$ has the curved portion T at the other axial end portion of the large diameter cylindrical portion 13b.

Additionally, the metal flow $F_{13}$ at the side plate portion 13a (excluding the connection portion between the large diameter cylindrical portion 13b and the small diameter cylindrical portion 13c) is a flow in a direction substantially orthogonal to the center axis of the preliminary intermediate material 13 along the side plate portion 13a and the metal flow at the small diameter cylindrical portion 13c (excluding the connection portion with the side plate portion 13a) is a flow substantially parallel to the center axis of the preliminary intermediate material 13 along the small diameter cylindrical portion 13c.

In the manufacturing method of this example, the metal flow in the large diameter cylindrical member 11 may have the curved portion T in order to separate the large diameter cylindrical portion and the small diameter cylindrical portion from each other by performing a predetermined process on the preliminary intermediate material 13 and use the large diameter cylindrical portion as the large diameter cylindrical member 11. Then, the curved portion T may remain as a trace also on the metal flow in the outer race 2 obtained by performing the post-treatment on the large diameter cylindrical member 11. In other words, when the curved portion T exists in the metal flow in the outer race 2, it can be estimated that the outer race 2 is manufactured from the large diameter cylindrical member obtained by the manufacturing method of this example.

Further, in the inner race 3 obtained by performing post-treatment on the small diameter cylindrical member 12 obtained by the manufacturing method of this example, at least a portion provided with the radially inner chamfered portions 3b1 and 3b2 in the inner peripheral surface is formed as a forged surface that has not been finished by a grinding process or the like. Thus, as shown in FIG. 3, a metal flow $F_{in}$ in the inner race 3 is continuous (extends) along the radially inner chamfered portions 3b1 and 3b2 in the vicinity of the surfaces of the radially inner chamfered portions 3b1 and 3b2 (from the surfaces of the radially inner chamfered portions 3b1 and 3b2 to the depth of about 10% to 20% of the inner diameter dimension of the inner race 3).

Additionally, when the large diameter cylindrical member and the small diameter cylindrical member obtained by the manufacturing method of this example are processed into the outer race and the inner race to form the radial rolling bearing, the outer race and the inner race constituting the radial rolling bearing may not be essentially obtained by processing the large diameter cylindrical member and the small diameter cylindrical member obtained from the same columnar material. That is, the rolling bearing can be obtained by combining the large diameter cylindrical member and the small diameter cylindrical member obtained from different columnar materials. Further, one of the large diameter cylindrical member and the small diameter cylindrical member is obtained by the manufacturing method of this example to be processed into the outer race or the inner race, the other of the large diameter cylindrical member and the small diameter cylindrical member is obtained by a different method to be processed into the inner race or the outer race, and the rolling bearing is obtained by combining them. That is, when there is a difference between the number of the large diameter cylindrical members and the number of the small diameter cylindrical members due to the occurrence of defective products during mass production, the outer race or the inner race manufactured from the large diameter cylindrical member or the small diameter cylindrical member obtained by different methods can be combined with each other.

Further, a pair of sliding bearings having different diameter dimensions can be manufactured from the large diameter cylindrical member and the small diameter cylindrical member obtained by the manufacturing method of this example. Specifically, a pair of sliding bearings is manufactured by performing a finishing process such as a grinding process on the surfaces (at least one of the outer peripheral surface, the inner peripheral surface, and both axial end surfaces) of the large diameter cylindrical member and the small diameter cylindrical member if necessary after the large diameter cylindrical member and the small diameter cylindrical member are obtained.

Additionally, the radial rolling bearings or sliding bearings manufactured from the large diameter cylindrical member and the small diameter cylindrical member obtained by the cylindrical member of this example are used by incorporating them into various rotating mechanical devices and vehicles.

Further, the press working devices 15, 17, 19, 21, 23, and 24 used in the respective steps are not limited to the above-described configurations and may have any configuration as long as the workings in the respective steps can be performed.

Second Example

A second example of the present invention will be described with reference to FIGS. 12 to 15. A first step to a third step, a seventh step, and an eighth step in a manufacturing method of this example are the same as the first step to the third step, the seventh step, and the eighth step of the first example. Hereinafter, a fourth step to a sixth step in the manufacturing method of this example will be described.

In the fourth step, the preliminary intermediate material 13 shown in FIG. 12(C) is simultaneously subjected to three processes of a large diameter side dimension regulating process of regulating the axial dimension of the large diameter cylindrical portion 13b to a predetermined dimension Lb (see FIG. 13), a first large diameter side chamfering process of forming the other axial radially outer chamfered portion 2b2 at the connection portion between the outer peripheral surface and the other axial end surface of the large diameter cylindrical portion 13b, and a punching process of punching out and removing a portion located on the radial inside in relation to the small diameter cylindrical portion 13c in the side plate portion 13a. Accordingly, a first intermediate material 25 shown in FIG. 12(D) is obtained.

The first intermediate material (first piece) 25 includes a large diameter cylindrical portion (first ring portion) 25a on one axial side (the upper side of FIG. 12(D)), a small diameter cylindrical portion (second ring portion) 25b on the other axial side (the lower side of FIG. 12(D)), and a connection plate portion 25c connecting the other axial end portion of the large diameter cylindrical portion 25a to one axial end portion of the small diameter cylindrical portion 25b. The large diameter cylindrical portion 25a includes the other axial radially outer chamfered portion 2b2 formed at the connection portion between the outer peripheral surface and the other axial end surface.

The fourth step is performed by using a press working device 26 shown in FIG. 13. The press working device 26 includes a die 26a, a pressing punch 26b, and a punching punch 26c.

The die 26a includes a stepped cylindrical inner peripheral surface which includes a large diameter portion 26a1 on one axial side (the upper side of FIG. 13), a small diameter portion 26a2 on the other axial side (the lower side of FIG. 13), and a stepped surface 26a3 bent from one axial end portion of the small diameter portion 26a2 toward the radial outside and facing one axial side. The stepped surface 26a3 includes a flat surface portion 26a3a disposed on the radial inside and orthogonal to the center axis of the die 26a and a conical chamfer forming portion 26a3b disposed on the radial outside and inclined toward one axial side as it goes toward the radial outside.

The pressing punch 26b has a cylindrical shape and is supported on the inside of the large diameter portion 26a1 of the die 26a to be axially displaceable with respect to the support table (not shown) of the press working device 26.

The punching punch 26c has a columnar shape and is supported at the center portion of the die 26a to be axially displaceable with respect to the support table.

In order to obtain the first intermediate material 25 by performing a large diameter side dimension regulating process, a first large diameter side chamfering process, and a punching process on the preliminary intermediate material 13 using the press working device 26, first, the other axial surface of the side plate portion 13a of the preliminary intermediate material 13 is placed on the stepped surface 26a3 of the die 26a.

In this state, the pressing punch 26b is displaced toward the other axial side so that the large diameter cylindrical portion 13b of the preliminary intermediate material 13 is axially crushed between the stepped surface 26a3 of the die 26a and the tip surface of the pressing punch 261). Accordingly, the axial dimension of the large diameter cylindrical portion 13b is regulated to a predetermined dimension Lb and the other axial radially outer chamfered portion 2b2 is simultaneously formed at the connection portion between the outer peripheral surface and the other axial end surface of the large diameter cylindrical portion 13b by the chamfer forming portion 26a3b. Further, the punching punch 26c is displaced toward one axial side so that a portion located on the radial inside in relation to the inner peripheral surface of the small diameter cylindrical portion 13c in the side plate portion 13a is punched out and removed. Accordingly, the first intermediate material 25 is obtained.

In the next fifth step, the first intermediate material 25 is subjected to a small diameter side dimension regulating process of regulating the axial dimension of the small diameter cylindrical portion 25b to a predetermined dimension Ls (see FIG. 14) and forming the radially inner chamfered portions 3b1 and 3b2 at the connection portion between the inner peripheral surface and both axial end surfaces of the small diameter cylindrical portion 25b to obtain a second intermediate material 27 shown in FIG. 12(E). The second intermediate material (second piece) 27 includes a large diameter cylindrical portion (third ring portion) 27a on one axial side, a small diameter cylindrical portion (fourth ring portion) 27b on the other axial side, and a connection plate portion 27c connecting the other axial end portion of the large diameter cylindrical portion 27a to the other axial end portion of the small diameter cylindrical portion 27b. The small diameter cylindrical portion 27b includes the radially inner chamfered portions 3b1 and 3b2 formed at the connection portion between the inner peripheral surface and both axial end surfaces and the large diameter cylindrical portion 27a includes the other axial radially outer chamfered portion 2b2 formed at the connection portion between the outer peripheral surface and the other axial end surface.

Additionally, in this example, in the fifth step, the large diameter cylindrical portion 25a and the connection plate portion 25c of the first intermediate material 25 are not subjected to plastic working.

The fifth step is performed by using a press working device 28 shown in FIG. 14. The press working device 28 includes a die 28a, an inner pressing punch (second member) 28b, an outer pressing punch (first member) 28c, a presser punch 28d, an inner counter punch (fourth member) 28e, and an outer counter punch (third member) 28f.

The die 28a has a stepped cylindrical inner peripheral surface formed by connecting a large diameter portion 28a1 on one axial side (the upper side of FIG. 14) to a small diameter portion 28a2 on the other axial side (the lower side of FIG. 14) with a stepped surface 28a3 facing one axial side.

The inner pressing punch 28b has a cylindrical shape and is supported at the center portion of the large diameter portion 28a1 of the die 28a to be axially displaceable with respect to the support table (not shown) of the press working device 28. The inner pressing punch 28b includes a chamfer forming portion (inclined surface) 28b1 formed at the tip portion (the other axial end portion) to have a linear generatrix shape.

The outer pressing punch 28c has a cylindrical shape and is supported around the inner pressing punch 28b to be axially displaceable with respect to the support table.

The presser punch 28d has a cylindrical shape and is supported around the outer pressing punch 28c to be axially displaceable with respect to the support table.

The inner counter punch 28e has a columnar shape and is supported at the center portion of the small diameter portion 28a2 of the die 28a to be axially displaceable with respect to the support table (not shown) of the press working device 28. The inner counter punch 28e includes a chamfer forming portion (inclined surface) 28e1 formed on the outer peripheral surface of the tip portion (one axial end portion). The chamfer forming portion 28e1 is formed as a conical surface which is inclined toward the other axial side as it goes toward the radial outside.

The outer counter punch 28f has a cylindrical shape and is supported to be axially displaceable with respect to the support table. The outer counter punch 28f is inserted between the small diameter portion 28a2 of the die 28a and the outer peripheral surface of the inner counter punch 28e substantially without a gap.

In order to obtain the second intermediate material 27 by performing a small diameter side dimension regulating process on the first intermediate material 25 using the press working device 28, first, the other axial surface of the connection plate portion 25c of the first intermediate material 25 is placed on the stepped surface 28a3 of the die 28a. Then, the presser punch 28d is displaced toward the other axial side so that the presser punch 28d presses one axial end surface of the large diameter cylindrical portion 25a of the first intermediate material 25 (the large diameter cylindrical portion 25a is sandwiched between the stepped surface 28a3 of the die 28a and the presser punch 28d in the axial direction).

In this state, the inner pressing punch 28b and the outer pressing punch 28c are displaced toward the other axial side and the inner counter punch 28e and the outer counter punch 28f are displaced toward one axial side. Then, the small diameter cylindrical portion 25b of the first intermediate material 25 is axially crushed between the group of the inner pressing punch 28b and the outer pressing punch 28c and the group of the inner counter punch 28e and the outer counter punch 28f. Accordingly, the axial dimension of the small diameter cylindrical portion 25b is regulated to a predetermined dimension Ls and the radially inner chamfered portions 3b1 and 3b2 are simultaneously formed at the connection portion between the inner peripheral surface and both axial end surfaces of the small diameter cylindrical portion 25b by the chamfer forming portion 28e1 of the inner counter punch 28e and the chamfer forming portion 28b1 of the inner pressing punch 28b. As described above, the second intermediate material 27 is obtained.

In the next sixth step, the second intermediate material 27 is subjected to a small diameter side shaving process of shaving the inner peripheral surface of the small diameter cylindrical portion 27b to obtain the third intermediate material 20 shown in FIG. 12(F). The third intermediate material 20 has the same shape as the shape of the third intermediate material 20 after the sixth step of the first example is completed.

Additionally, in this example, in the sixth step, a portion other than the inner peripheral surface of the small diameter cylindrical portion 27*b*, that is, the outer peripheral surfaces of the large diameter cylindrical portion 27*a*, the connection plate portion 27*c*, and the small diameter cylindrical portion 27*b* of the second intermediate material 27 are not subjected to plastic working.

The sixth step is performed by using a press working device 29 shown in FIG. 15. The press working device 29 includes a die 29*a*, a sleeve 29*b*, and a shaving cutter 29*c*.

The die 29*a* includes a cylindrical inner peripheral surface.

The sleeve 29*b* is fitted into the axially outer portion (the lower portion of FIG. 15) of the die 29*a* substantially without a gap.

The shaving cutter 29*c* has a columnar shape and is supported at the center portion of the die 29*a* to be axially displaceable with respect to the support table (not shown) of the press working device 29. The shaving cutter 29*c* includes a blade portion 29*c*1 which is formed at the radially outer edge of the tip portion (the other axial end portion) to perform a shaving process of slightly scraping the surface of the inner peripheral surface of the small diameter cylindrical portion 27*b* of the second intermediate material 27 to be smooth on the inner peripheral surface.

In order to obtain the third intermediate material 20 by performing a punching process on the second intermediate material 27 using the press working device 29, the other axial end surface of the large diameter cylindrical portion 27*a* of the second intermediate material 27 and the other axial surface of the connection plate portion 27*c* are first placed on the end surface of the sleeve 29*b* on one axial side (the upper side of FIG. 15). In this state, the shaving cutter 29*c* is displaced toward the other axial side so that the blade portion 29*c* 1 slightly scrapes (shaves) the inner peripheral surface of the small diameter cylindrical portion 27*b* to be smooth. Accordingly, the third intermediate material 20 is obtained.

In the seventh step, the third intermediate material 20 obtained as described above is subjected to a separating process of separating the large diameter cylindrical portion 20*a* (and the connection plate portion 20*c*) and the small diameter cylindrical portion 20*b* from each other to obtain the preliminary large diameter cylindrical member 22 and the small diameter cylindrical member (second ring element) 12 shown in FIG. 12(G). Further, in the eighth step, a large diameter side shaving process of shaving the inner peripheral surface of the preliminary large diameter cylindrical member 22 to remove an extra thickness and a second large diameter side chamfering process of forming one axial radially outer chamfered portion 2*b*1 at the connection portion between the inner peripheral surface and one axial end surface of the large diameter cylindrical portion 22*a* are performed to obtain the large diameter cylindrical member (first ring element) 11 shown in FIG. 12(H). The configurations, operations, and effects of the other parts are the same as those of the first example.

Third Example

A third example of the present invention will be described with reference to FIGS. 16 to 19. A first step to a third step and an eighth step in a manufacturing method of this example are the same as the first step to the third step and the eighth step of the first example. Hereinafter, a fourth step to a seventh step in the manufacturing method of this example will be described.

In the fourth step, the preliminary intermediate material 13 shown in FIG. 16(C) is subjected to a punching process of punching out and removing a portion located on the radial inside in relation to the inner peripheral surface of the small diameter cylindrical portion 13*c* in the side plate portion 13*a* to obtain a first intermediate material 30 shown in FIG. 16(D). The first intermediate material (first piece) 30 includes a large diameter cylindrical portion (first ring portion) 30*a* on one axial side (the upper side of FIG. 16(D)), a small diameter cylindrical portion (second ring portion) 30*b* on the other axial side (the lower side of FIG. 16(D)), and a connection plate portion 30*c* connecting the other axial end portion of the large diameter cylindrical portion 30*a* to one axial end portion of the small diameter cylindrical portion 30*b*.

The fourth step is performed by using a press working device 31 shown in FIG. 17. The press working device 31 includes a die 31*a*, a presser punch 31*b*, and a punching punch 31*c*.

The die 31*a* includes a cylindrical inner peripheral surface.

The presser punch 31*b* has a stepped cylindrical shape. That is, the presser punch 31*b* includes a stepped cylindrical outer peripheral surface formed by connecting a small diameter portion 31*b*1 on the other axial side (the lower side of FIG. 17) and a large diameter portion 31*b*2 on one axial side (the upper side of FIG. 17) with a stepped surface 31*b*3 facing the other axial side.

The punching punch 31*c* has a columnar shape.

In order to obtain the first intermediate material 30 by performing a punching process on the preliminary intermediate material 13 using the press working device 31, first, the large diameter cylindrical portion 13*b* of the preliminary intermediate material 13 is fitted and held in the die 31*a* without rattling and the other axial end surface of the small diameter portion 31*b*1 of the presser punch 31*b* is allowed to contact or face one axial surface of the side plate portion 13*a* to regulate the displacement of the preliminary intermediate material 13 toward one axial side. In this state, the punching punch 31*c* is displaced toward one axial side so that a portion located on the radial inside in relation to the inner peripheral surface of the small diameter cylindrical portion 13*c* in the side plate portion 13*a* is punched out and removed. Accordingly, the first intermediate material 30 is obtained.

The next fifth step is the same as the fifth step of the second example. That is, in the fifth step, the first intermediate material 30 is subjected to a small diameter side dimension regulating process of regulating the axial dimension of the small diameter cylindrical portion 30*b* to a predetermined dimension Ls and forming the radially inner chamfered portions 3*b*1 and 3*b*2 at the connection portion between the inner peripheral surface and both axial end surfaces of the small diameter cylindrical portion 30*b* to obtain a second intermediate material 32 shown in FIG. 16(E). The second intermediate material (first piece, second piece) 32 includes a large diameter cylindrical portion (first ring portion, third ring portion) 32*a* on one axial side, a small diameter cylindrical portion (second ring portion, fourth ring portion) 32*b* on the other axial side, and a connection plate portion 32*c* connecting the other axial end portion of the large diameter cylindrical portion 32*a* to the other axial end portion of the small diameter cylindrical portion 32*b*. The small diameter cylindrical portion 32*b* includes the radially inner chamfered portions 3*b*1 and 3*b*2 formed at the connection portion between the inner peripheral surface and both axial end surfaces and includes an extra thick portion 32b1 protruding from the radially intermediate portion toward the radial inside.

The press working device used in the fifth step of this example has substantially the same structure as that of the press working device 28 (see FIG. 14) used in the fifth step of the second example. Further, since the procedure of processing the first intermediate material 30 into the second intermediate material 32 by the press working device is basically the same as the procedure of processing the first intermediate material 25 into the second intermediate material 27 in the fifth step of the second example, the detailed description will be omitted.

In the next sixth step, the second intermediate material 32 is subjected to a large diameter side dimension regulating process of regulating the axial dimension of the large diameter cylindrical portion 32a to a predetermined dimension Lb (see FIG. 18) and a first large diameter side chamfering process of forming the other axial radially outer chamfered portion 2b2 at the connection portion between the outer peripheral surface and the other axial end surface of the large diameter cylindrical portion 32a. Further, in this example, an ironing process of gathering an extra thickness by ironing the inner peripheral surface of the small diameter cylindrical portion 32b is performed at the same time. Accordingly, a third intermediate material 33 shown in FIG. 16(F) is obtained.

The third intermediate material (second piece) 33 includes a large diameter cylindrical portion (third ring portion) 33a on one axial side (the upper side of FIG. 16(F)), a small diameter cylindrical portion (fourth ring portion) 33b on the other axial side (the lower side of FIG. 16(F)), a connection plate portion 33c connecting the other axial end portion of the large diameter cylindrical portion 33a to the other axial end portion of the small diameter cylindrical portion 33b, and an inward flange-shaped extra thick portion 33d protruding radially inward from the axially intermediate portion of the small diameter cylindrical portion 33b. The large diameter cylindrical portion 33a includes the other axial radially outer chamfered portion 2b2 formed at the connection portion between the outer peripheral surface and the other axial end surface and the small diameter cylindrical portion 33b includes the radially inner chamfered portions 3b1 and 3b2 formed at the connection portion between the inner peripheral surface and both axial end surfaces.

The sixth step is performed by using a press working device 34 shown in FIG. 18. The press working device 34 includes a die 34a, a mandrel (fourth member) 34b, a sleeve (third member) 34c, a pressing punch (first member) 34d, and an ironing punch (second member) 34e.

The die 34a includes a stepped cylindrical inner peripheral surface which includes a large diameter portion 34a1 on one axial side (the upper side of FIG. 18), a small diameter portion 34a2 on the other axial side (the lower side of FIG. 18), and a conical chamfer forming portion (inclined surface) 34a3 connecting the other axial end portion of the large diameter portion 34a1 to one axial end portion of the small diameter portion 34a2.

The mandrel 34b includes a stepped cylindrical outer peripheral surface which includes a small diameter portion 34b1 on one axial side, a large diameter portion 34b2 on the other axial side, and a stepped surface (inclined surface) 34b3 connecting the other axial end portion of the small diameter portion 34b1 to one axial end portion of the large diameter portion 34b2. The stepped surface 34b3 is formed as a conical surface inclined toward the other axial side as it goes toward the radial outside.

The sleeve 34c is inserted between the small diameter portion 34a2 of the die 34a and the large diameter portion 34b2 of the mandrel 34b substantially without a gap.

The pressing punch 34d has a cylindrical shape and is supported to be axially displaceable with respect to the support table (not shown) of the press working device 34.

The ironing punch 34e has an outer diameter dimension substantially equal to the inner diameter dimension of the small diameter cylindrical portion 33b of the third intermediate material 33 to be obtained and is disposed inside the pressing punch 34d to be axially displaceable with respect to the pressing punch 34d.

In order to obtain the third intermediate material 33 by performing a large diameter side dimension regulating process, a first large diameter side chamfering process, and an ironing process on the second intermediate material 32 using the press working device 34, first, the radially outer portion of the other axial surface of the connection plate portion 32c of the second intermediate material 32 is placed on the chamfer forming portion 34a3 of the die 34a and one axial end surface of the sleeve 34c and the small diameter cylindrical portion 32b is inserted between the inner peripheral surface of the sleeve 34c and the small diameter portion 34b1 of the mandrel 34b.

In this state, the pressing punch 34d and the ironing punch 34e are displaced toward the other axial side. Accordingly, the tip portion of the ironing punch 34e is pressed from one axial side toward the radial inside of the one axial portion of the small diameter cylindrical portion 32b of the second intermediate material 32 so that the one axial portion of the inner peripheral surface of the small diameter cylindrical portion 32b is ironed by the ironing punch 34e. At the same time, the small diameter portion 34b1 of the mandrel 34b is pressed from the other axial side toward the radial inside of the axially outer portion of the small diameter cylindrical portion 32b (the axially outer portion of the small diameter cylindrical portion 32b is pressed between the inner peripheral surface of the sleeve 34c and the small diameter portion 34b1 of the mandrel 34b) so that the axially outer portion of the inner peripheral surface of the small diameter cylindrical portion 32b is ironed by the mandrel 34b. Accordingly, the inward flange-shaped extra thick portion 33d is formed to protrude from the axially intermediate portion of the small diameter cylindrical portion 33b toward the radial inside.

Further, the large diameter cylindrical portion 32a of the second intermediate material 32 is axially crushed between the tip surface of the pressing punch 34d and the group of the chamfer forming portion 34a3 of the die 34a and one axial end surface of the sleeve 34c. Accordingly, the axial dimension of the large diameter cylindrical portion 32a is regulated to a predetermined dimension Lb and the radially outer chamfered portion 2b2 is simultaneously formed at the connection portion between the outer peripheral surface and the other axial end surface of the large diameter cylindrical portion 32a by the chamfer forming portion 34a3. As described above, a third intermediate material 33 is obtained.

In the next seventh step, the third intermediate material 33 is subjected to a separating process of separating the large diameter cylindrical portion 33a (and the connection plate portion 33c) and the small diameter cylindrical portion 33b from each other and a small diameter side shaving process of removing the extra thick portion 33d existing on the radial inside of the small diameter cylindrical portion 33b to obtain the preliminary large diameter cylindrical member 22 and the small diameter cylindrical member 12 shown in FIG. 16(G). Additionally, in the example shown in the drawings, the seventh step is performed while the direction with respect to the axial direction of the third intermediate material 33 before processing in the seventh step is reversed (rotated by 180°) from the direction with respect to the axial direction of the third intermediate material 33 after processing in the sixth step.

The seventh step is performed by using a press working device 35 shown in FIG. 19. The press working device 35 includes a die 35a, a cylindrical presser punch 35b, a cylindrical punching punch 35c, and a columnar shaving cutter 35d. The die 35a includes a stepped cylindrical inner peripheral surface formed by connecting a small diameter portion 35a1 on one axial side (the lower side of FIG. 19) to a large diameter portion 35a2 on the other axial side (the upper side of FIG. 19) with a stepped surface 35a3 facing the other axial side.

In order to obtain the preliminary large diameter cylindrical member 22 and the small diameter cylindrical member 12 by performing a separating process and a small diameter side shaving process on the third intermediate material 33 using the press working device 35, first, one axial end surface of the large diameter cylindrical portion 33a of the third intermediate material 33 is placed on the stepped surface 35a3 of the die 35a. Next, the presser punch 35b is displaced toward one axial side so that the tip surface (one axial end surface) of the presser punch 35b presses the other axial surface of the connection plate portion 33c of the third intermediate material 33.

In this state, the punching punch 35c is displaced toward the other axial side so that the small diameter cylindrical portion 33b of the third intermediate material 33 is punched out and is separated from the large diameter cylindrical portion 33a and the connection plate portion 33c. The shaving cutter 35d is displaced toward one axial side at the same time when the small diameter cylindrical portion 33b is punched by the punching punch 35c or before and after the small diameter cylindrical portion 33b is punched, the shaving cutter 35d scrapes and removes the inward flange-shaped extra thick portion 33d protruding from the axially intermediate portion of the small diameter cylindrical portion 33b toward the radial inside. As described above, the preliminary large diameter cylindrical member 22 and the small diameter cylindrical member (second ring element) 12 are obtained and the small diameter cylindrical member 12 among them is sent to the post-treatment step. On the other hand, in the subsequent eighth step, the preliminary large diameter cylindrical member 22 is subjected to a large diameter side shaving process and a second large diameter side chamfering process to obtain the large diameter cylindrical member (first ring element) 11 shown in FIG. 16(H). The configurations, operations, and effects of the other parts are the same as those of the first example.

Fourth Example

A fourth example of the present invention will be described with reference to FIGS. 20 and 21. A first step to a fifth step in a manufacturing method of this example are the same as the first step to the fifth step of the third example. Further, a seventh step and an eighth step in the manufacturing method of this example are the same as the seventh step and the eighth step of the first example. Here, a sixth step in the manufacturing method of this example will be described below.

In the sixth step of this example, the second intermediate material 32 shown in FIG. 20(E) is simultaneously subjected to three processes of a large diameter side dimension regulating process of regulating the axial dimension of the large diameter cylindrical portion 32a to a predetermined dimension Lb (see FIG. 21), a first large diameter side chamfering process of forming the other axial radially outer chamfered portion 2b2 at the connection portion between the outer peripheral surface and the other axial end surface of the large diameter cylindrical portion 32a, and a small diameter side shaving process of removing an extra thickness existing on the radial inside of the small diameter cylindrical portion 33b. Accordingly, the third intermediate material 20 shown in FIG. 20(F) is obtained.

The sixth step is performed by using a press working device 36 shown in FIG. 21. The press working device 36 includes a die 36a, a cylindrical presser punch 36b, a cylindrical pressing punch 36c disposed around the presser punch 36b, a columnar shaving cutter 36d disposed in the presser punch 36b, and a cylindrical counter punch 36e.

The die 36a includes a stepped cylindrical inner peripheral surface formed by connecting a large diameter portion 36a1 on one axial side (the upper side of FIG. 21) to a small diameter portion 36a2 on the other axial side (the lower side of FIG. 21) with a stepped surface 36a3 facing one axial side. The stepped surface 36a3 includes a conical chamfer forming portion 36a3a formed at the radially outer portion to be inclined toward one axial side as it goes toward the radial outside.

In order to obtain the third intermediate material 20 by performing a large diameter side dimension regulating process, a first large diameter side chamfering process, and a small diameter side shaving process on the second intermediate material 32 using the press working device 36, first, the other axial surface of the connection plate portion 32c of the second intermediate material 32 is placed on the stepped surface 36a3 of the die 36a. Next, the presser punch 36b is displaced toward the other axial side so that the tip surface (the other axial end surface) of the presser punch 36b presses the other axial surface of the connection plate portion 32c of the second intermediate material 32.

In this state, one axial end surface of the large diameter cylindrical portion 32a of the second intermediate material 32 is pressed toward the other axial side by the pressing punch 36c so that the large diameter cylindrical portion 32a is axially crushed between the tip surface of the pressing punch 36c and the stepped surface 36a3 of the die 36a. Accordingly, the axial dimension of the large diameter cylindrical portion 32a is regulated to a predetermined dimension Lb and the radially outer chamfered portion 2b2 is formed at the connection portion between the outer peripheral surface and the other axial end surface of the large diameter cylindrical portion 32a by the chamfer forming portion 36a3a.

The inner peripheral surface of the small diameter cylindrical portion 32b of the second intermediate material 32 is shaved by the shaving cutter 36d at the same time as pressing one axial end surface of the large diameter cylindrical portion 32a or before and after pressing one axial end surface of the large diameter cylindrical portion 32a by the pressing punch 36c. As described above, the third intermediate material 20 is obtained. The configurations, operations, and effects of the other parts are the same as those of the first example and the third example.

Fifth Example

A fifth example of the present invention will be described with reference to parts (A) to (H) of FIG. 22. A first step to a fourth step, a seventh step, and an eighth step in a manufacturing method of this example are the same as the first step to the fourth step, the seventh step, and the eighth step of the first example. In other words, a fifth step and a sixth step of the manufacturing method of this example are different from those of the manufacturing method of the first example.

In the fifth step of this example, the first intermediate material 16 is subjected to a punching process of punching out and removing the partition wall portion 16d and a small diameter side shaving process of shaving the inner peripheral surface of the small diameter cylindrical portion 16b. Accordingly, a second intermediate material 37 shown in FIG. 22(E) is obtained. The second intermediate material 37 includes a large diameter cylindrical portion 37a on one axial side, a small diameter cylindrical portion 37b on the other axial side, and a connection plate portion 37c connecting the other axial end portion of the large diameter cylindrical portion 37a to one axial end portion of the small diameter cylindrical portion 37b.

In the next sixth step, the second intermediate material 37 is simultaneously subjected to a large diameter side dimension regulating process of regulating the axial dimension of the large diameter cylindrical portion 37a to a predetermined dimension Lb and a first large diameter side chamfering process of forming the radially outer chamfered portion 2b2 at the connection portion between the outer peripheral surface and the other axial end surface of the large diameter cylindrical portion 37a. Accordingly, the third intermediate material 20 shown in FIG. 22(F) is obtained. The configurations, operations, and effects of the other parts are the same as those of the first example.

Sixth Example

A sixth example of the present invention will be described with reference to parts (A) to (G) of FIG. 23. In this example, the total number of steps of manufacturing the single columnar material 10 into the large diameter cylindrical member (first ring element) 11 and the small diameter cylindrical member (second ring element) 12 are seven steps. A first step to a fifth step and a seventh step in a manufacturing method of this example are the same as the first step to the fifth step and the eighth step of the first example. That is, in the manufacturing method of this example, the sixth step and the seventh step of the first example are performed as one step in the sixth step.

Specifically, in the sixth step of this example, the second intermediate material 18 is simultaneously subjected to three processes of a separating process of separating the large diameter cylindrical portion 18a and the small diameter cylindrical portion 18b from each other, a punching process of punching out and removing the partition wall portion 18d, and a small diameter side shaving process of shaving the inner peripheral surface of the small diameter cylindrical portion 18b to remove an extra thickness to obtain the preliminary large diameter cylindrical member 22 and the small diameter cylindrical member 12 shown in FIG. 23(F). The configurations, operations, and effects of the other parts are the same as those of the first example.

Seventh Example

A seventh example of the present invention will be described with reference to parts (A) to (H) of FIG. 24. A first step to a third step, a seventh step, and an eighth step in a manufacturing method of this example are the same as the first step to the third step, the seventh step, and the eighth step of the first example. Further, a sixth step in the manufacturing method of this example is the same as the sixth step of the fifth example.

In the fourth step of this example, the preliminary intermediate material 13 is subjected to a punching process of punching out and removing a portion located on the radial inside in relation to the inner peripheral surface of the small diameter cylindrical portion 13c of the side plate portion 13a and a small diameter side dimension regulating process of regulating the axial dimension of the small diameter cylindrical portion 13c to a predetermined dimension Ls and forming the radially inner chamfered portions 3b1 and 3b2 at the connection portion between the inner peripheral surface and both axial end surfaces of the small diameter cylindrical portion 13c. Accordingly, a first intermediate material 38 shown in FIG. 24(D) is obtained.

The first intermediate material (second piece) 38 includes a large diameter cylindrical portion (third ring portion) 38a on one axial side, a small diameter cylindrical portion (fourth ring portion) 38b on the other axial side, and a connection plate portion 38c connecting the other axial end portion of the large diameter cylindrical portion 38a to one axial end portion of the small diameter cylindrical portion 38b. The small diameter cylindrical portion 38b includes the radially inner chamfered portions 3b1 and 3b2 formed at the connection portion between the inner peripheral surface and both axial end surfaces.

In the next fifth step, the first intermediate material 38 is subjected to a small diameter side shaving process of shaving the inner peripheral surface of the small diameter cylindrical portion 38b to obtain the second intermediate material 37 shown in FIG. 24(E). The configurations, operations, and effects of the other parts are the same as those of the first example and the fifth example.

Eighth Example

An eighth example of the present invention will be described with reference to parts (A) to (H) of FIG. 25. A first step to a third step, a seventh step, and an eighth step in a manufacturing method of this example are the same as the first step to the third step, the seventh step, and the eighth step of the first example.

In the fourth step of this example, the preliminary intermediate material 13 is subjected to a large diameter side dimension regulating process of regulating the axial dimension of the large diameter cylindrical portion 13b to a predetermined dimension Lb and a first large diameter side chamfering process of forming the radially outer chamfered portion 2b2 at the connection portion between the outer peripheral surface and the other axial end surface of the large diameter cylindrical portion 13b. Accordingly, a first intermediate material 39 shown in FIG. 25(D) is obtained.

The first intermediate material (first piece) 39 includes a disc-shaped side plate portion 39a, a large diameter cylindrical portion (first ring portion) 39b protruding from the radially outer portion of one axial surface (the upper surface of FIG. 25(D)) of the side plate portion 39a toward one axial side, and a small diameter cylindrical portion (second ring portion) 39c protruding from the radially intermediate portion of the other axial surface (the lower surface of FIG. 25(D)) of the side plate portion 39a toward the other axial side. The large diameter cylindrical portion 39b includes the radially outer chamfered portion 2b2 formed at the connection portion between the outer peripheral surface and the other axial end surface.

In the next fifth step, the first intermediate material 39 is subjected to a small diameter side dimension regulating process of regulating the axial dimension of the small diameter cylindrical portion 39c to a predetermined dimension Ls and forming the radially inner chamfered portions 3b1 and 3b2 at the connection portion between the inner peripheral surface and both axial end surfaces of the small diameter cylindrical portion 39c to obtain a second intermediate material 40 shown in FIG. 25(E).

The second intermediate material (second piece) 40 includes a large diameter cylindrical portion (third ring portion) 40a on one axial side, a small diameter cylindrical portion (fourth ring portion) 40b on the other axial side, a connection plate portion 40c connecting the other axial end portion of the large diameter cylindrical portion 40a to the other axial end portion of the small diameter cylindrical portion 40b, and a partition wall portion 40d formed at a portion located on one axial side and the radial inside of the small diameter cylindrical portion 40b. The small diameter cylindrical portion 40b includes the radially inner chamfered portions 3b1 and 3b2 formed at the connection portion between the inner peripheral surface and both axial end surfaces.

In the next sixth step, the second intermediate material 40 is subjected to a punching process of punching out and removing the partition wall portion 40d and a small diameter side shaving process of shaving the inner peripheral surface of the small diameter cylindrical portion 40b. Accordingly, the third intermediate material 20 shown in FIG. 25(F) is obtained. The configurations, operations, and effects of the other parts are the same as those of the first example.

Ninth Example

A ninth example of the present invention will be described with reference to parts (A) to (G) of FIG. 26. In this example, the total number of steps of manufacturing the large diameter cylindrical member (first ring element) 11 and the small diameter cylindrical member (second ring element) 12 from the single columnar material 10 are seven steps. A first step to a fifth step and a seventh step in a manufacturing method of this example are the same as the first step to the fifth step and the eighth step of the eighth example. That is, in the manufacturing method of this example, the sixth step and the seventh step of the eighth example are performed as one step in the sixth step.

Specifically, in the sixth step of this example, the second intermediate material 40 is simultaneously subjected to three processes of a separating process of separating the large diameter cylindrical portion 40a and the small diameter cylindrical portion 40b from each other, a punching process of punching out and removing the partition wall portion 40d, and a small diameter side shaving process of shaving the inner peripheral surface of the small diameter cylindrical portion 40b to remove an extra thickness. Accordingly, the preliminary large diameter cylindrical member 22 and the small diameter cylindrical member 12 shown in FIG. 26(F) are obtained. The configurations, operations, and effects of the other parts are the same as those of the first example and the eighth example.

Tenth Example

A tenth example of the present invention will be described with reference to parts (A) to (I) of FIG. 27. In this example, the total number of steps of manufacturing the large diameter cylindrical member (first ring element) 11 and the small diameter cylindrical member (second ring element) 12 from the single columnar material 10 are nine steps. A first step to a fifth step, an eighth step, and a ninth step in a manufacturing method of this example are the same as the first step to the fifth step, the seventh step, and the eighth step of the first example. That is, in this example, the punching process and the small diameter side shaving process which are performed at the same time in the sixth step of the first example are respectively performed in different steps.

Specifically, in the sixth step of this example, the second intermediate material 18 is subjected to a punching process of punching out and removing the partition wall portion 18d to obtain a third preliminary intermediate material 41 shown in FIG. 27(F). The third preliminary intermediate material 41 includes a large diameter cylindrical portion 41a on one axial side, a small diameter cylindrical portion 41b on the other axial side, and a connection plate portion 41c connecting the other axial end portion of the large diameter cylindrical portion 41a to one axial end portion of the small diameter cylindrical portion 41b.

In the next seventh step, the third preliminary intermediate material 41 is subjected to a small diameter side shaving process of shaving the inner peripheral surface of the small diameter cylindrical portion 41b to remove an extra thickness. Accordingly, the third intermediate material 20 shown in FIG. 27(G) is obtained. The configurations, operations, and effects of the other parts are the same as those of the first example.

Eleventh Example

An eleventh example of the present invention will be described with reference to parts (A) to (J) of FIG. 28. In this example, the total number of steps of manufacturing the large diameter cylindrical member (first ring element) 11 and the small diameter cylindrical member (second ring element) 12 from the single columnar material 10 are ten steps. A first step to a fourth step in a manufacturing method of this example are the same as the first step to the fourth step of the first example.

In the fifth step of this example, the first intermediate material 16 is subjected to a punching process of punching out and removing the partition wall portion 16d to obtain a second intermediate material 42 shown in FIG. 28(E). The second intermediate material 42 includes a large diameter cylindrical portion 42a on one axial side, a small diameter cylindrical portion 42b on the other axial side, and a connection plate portion 42c connecting the other axial end portion of the large diameter cylindrical portion 42a to one axial end portion of the small diameter cylindrical portion 42b.

In the next sixth step, the second intermediate material 42 is subjected to a small diameter side shaving process of shaving the inner peripheral surface of the small diameter cylindrical portion 42b to obtain a third intermediate material 43 shown in FIG. 28(F). The third intermediate material 43 includes a large diameter cylindrical portion 43a on one axial side, a small diameter cylindrical portion 43b on the other axial side, and a connection plate portion 43c connecting the other axial end portion of the large diameter cylindrical portion 43a to one axial end portion of the small diameter cylindrical portion 42b.

In the next seventh step, the third intermediate material 43 is subjected to a separating process of separating the large diameter cylindrical portion 43a (and the connection plate portion 43c) and the small diameter cylindrical portion 43b from each other to obtain a first preliminary large diameter cylindrical member 44 and the small diameter cylindrical member 12 shown in FIG. 28(G). The first preliminary large diameter cylindrical member 44 includes a large diameter cylindrical portion 44a and an inward flange portion 44b bent from the other axial end portion of the large diameter cylindrical portion 44a toward the radial inside.

In the next eighth step, the first preliminary large diameter cylindrical member 44 is simultaneously subjected to a large diameter side dimension regulating process of regulating the axial dimension to a predetermined dimension Lb, a first large diameter side chamfering process of forming the radially outer chamfered portion at the connection portion between the outer peripheral surface and the other axial end surface, and a second large diameter side chamfering process of forming the radially outer chamfered portion at the connection portion between the outer peripheral surface and one axial end surface. Accordingly, as shown in FIG. 28(H), a second preliminary large diameter cylindrical member 45 including a large diameter cylindrical portion 45a and an inward flange portion 45b bent from the other axial end portion of the large diameter cylindrical portion 45a toward the radial inside is obtained. The large diameter cylindrical portion 45a includes the radially outer chamfered portions 2b1 and 2b2 which are formed at the connection portion between the outer peripheral surface and both axial end surfaces.

In the next ninth step, the second preliminary large diameter cylindrical member 45 is subjected to a punching process to remove the inward flange portion 45b from the second preliminary large diameter cylindrical member 45. Accordingly, a cylindrical third preliminary large diameter cylindrical member 46 shown in FIG. 28(I) is obtained.

Finally, in the tenth step, the third preliminary large diameter cylindrical member 46 is subjected to a large diameter side shaving process to obtain a large diameter cylindrical member (first ring element) 11 shown in FIG. 28(J). The configurations, operations, and effects of the other parts are the same as those of the first example.

Here, in the conventional method described in Japanese Patent Application, Publication No. 2009-269082, since the end portion on one axial side (the upper side of parts (A) and (B) of FIG. 31) of the cavity 8d of the second press working device 8 is opened, it is difficult to regulate the axial dimension of the large diameter cylindrical portion 9b of the second intermediate material 9 with high accuracy. Thus, since the axial dimension of the large diameter cylindrical member having a large diameter dimension in the pair of cylindrical members becomes largely uneven, the amount of cutting or grinding in the post-treatment increases. As a result, there is a possibility that the cost increases.

In the cylindrical member manufacturing method, it is possible to reduce the amount of cutting and/or grinding in the post-treatment by providing the step of regulating the axial dimensions of the large diameter cylindrical member and the small diameter cylindrical member in the process of manufacturing the large diameter cylindrical member and the small diameter cylindrical member from the columnar material (billet) by press working. Further, it is possible to reduce the amount of cutting and/or grinding in the post-treatment step while suppressing an increase in press load or the number of steps by regulating the axial dimension of the small diameter cylindrical member and simultaneously forming the chamfered portion at the connection portion between the inner peripheral surface and both axial end surfaces of the small diameter cylindrical member by press working.

In an embodiment, a cylindrical member manufacturing method manufactures a large diameter cylindrical member including a pair of radially outer chamfered portions formed at a connection portion between an outer peripheral surface and both axial end surfaces and a small diameter cylindrical member including a pair of radially inner chamfered portions at a connection portion between an inner peripheral surface and both axial end surfaces from a single columnar material (billet) by press working.

First, the columnar material is sequentially subjected to an upsetting process and a front-rear extruding process to form a circular flat side plate portion, a large diameter cylindrical portion protruding from a radially outer portion of one axial surface of the side plate portion toward one axial side, and a small diameter cylindrical portion protruding from a radially intermediate portion of the other axial surface of the side plate portion toward the other axial side.

Then, the large diameter cylindrical member and the small diameter cylindrical member are obtained by performing a punching process of punching out and removing a portion located on the radial inside in relation to an inner peripheral surface of the small diameter cylindrical portion in the side plate portion, a small diameter side dimension regulating process of regulating an axial dimension of the small diameter cylindrical portion to a predetermined dimension and forming a pair of radially inner chamfered portions at a connection portion between the inner peripheral surface and both axial end surfaces of the small diameter cylindrical portion, a small diameter side shaving process of shaving the inner peripheral surface of the small diameter cylindrical portion, a separating process of separating the large diameter cylindrical portion and the small diameter cylindrical portion from each other to obtain a preliminary large diameter cylindrical member including the large diameter cylindrical portion and an inward flange portion bent from the other axial end portion of the large diameter cylindrical portion toward the radial inside and the small diameter cylindrical member, a large diameter side dimension regulating process of regulating an axial dimension of the large diameter cylindrical portion or the preliminary large diameter cylindrical member to a predetermined dimension, a first large diameter side chamfering process of forming the other axial radially outer chamfered portion of the pair of radially outer chamfered portions at a connection portion between an outer peripheral surface and the other axial end surface of the large diameter cylindrical portion or the preliminary large diameter cylindrical member, a second large diameter side chamfering process of forming one axial radially outer chamfered portion of the pair of radially outer chamfered portions at a connection portion between the outer peripheral surface and one axial end surface of the large diameter cylindrical portion or the preliminary large diameter cylindrical member, and a large diameter side shaving process of shaving an inner peripheral surface of the preliminary large diameter cylindrical member.

The punching process, the small diameter side dimension regulating process, the small diameter side shaving process, the separating process, the large diameter side dimension regulating process, the first large diameter side chamfering process, the second large diameter side chamfering process, and the large diameter side shaving process can be performed in any order or in the same step as long as there is no contradiction. These processes can be performed in any order or in combination of two or more processes at the same time as long as there is no contradiction.

Specifically, the appropriate order and combination are determined by experiments and simulations depending on the material of the columnar material, the shape and size of the large diameter cylindrical member and the small diameter cylindrical member, the pressurizing capacity of the press working device to be used, the durability of the die and the tool, and the like.

However, the punching process needs to be performed at the same time as the separating process or before the separating process. Further, the small diameter side dimension regulating process needs to be performed before the separating process and needs to be performed at the same time as the punching process or before the punching process.

Further, the small diameter side shaving process is preferably performed at the same time as the punching process or after the punching process.

However, when the small diameter side shaving process and the punching process are performed at the same time, a portion located on the radial inside in relation to the inner peripheral surface of the small diameter cylindrical portion in the side plate portion is punched out by the punching process and the inner peripheral surface of the punched portion is subjected to the shaving process.

The large diameter side shaving process can be performed after the separating process.

The small diameter side shaving process can be performed at the same time as the punching process or after the punching process.

The large diameter side dimension regulating process and the first large diameter side chamfering process can be performed in the same step.

The second large diameter side chamfering process and the large diameter side shaving process can be performed in the same step.

The punching process and the small diameter side shaving process can be performed in the same step.

The small diameter side shaving process and the large diameter side dimension regulating process can be performed in the same step.

The punching process and the separating process can be performed in the same step.

The punching process and the small diameter side dimension regulating process can be performed in the same step.

The punching process and the large diameter side dimension regulating process can be performed in the same step.

Before the small diameter side shaving process, the inner peripheral surface of the small diameter cylindrical portion is subjected to an ironing process to gather an extra thickness.

Additionally, in the present specification, performing a plurality of processes at the same time means that a plurality of processes do not have to be performed completely at the same time in terms of time and a plurality of processes are performed in the same step (so-called one chuck) without separating a workpiece from the press working device.

In the cylindrical member manufacturing method of an embodiment, the total number of steps including a step of cutting a long wire to a predetermined length to obtain the columnar material, a step of performing an upsetting process on the columnar material to obtain a thick disc-shaped or beer barrel-shaped preliminary material, and a step of performing the front-rear extruding process on the preliminary material to obtain the preliminary intermediate material is preferably 10 steps or less and more preferably 8 steps or less.

In an embodiment, a radial rolling bearing manufacturing method is used for a radial rolling bearing including an outer race which has an outer race track formed on an inner peripheral surface and includes a pair of radially outer chamfered portions formed at a connection portion between an outer peripheral surface and both axial end surfaces, an inner race which has an inner race track formed on an outer peripheral surface and includes a pair of radially inner chamfered portions formed at a connection portion between an inner peripheral surface and both axial end surfaces, and a plurality of rolling elements which are arranged between the outer race track and the inner race track in a rollable manner.

In the manufacturing method, after the large diameter cylindrical member and the small diameter cylindrical member are manufactured by the cylindrical member manufacturing method, the outer race track is formed on the inner peripheral surface of the large diameter cylindrical member to obtain the outer race and the inner race track is formed on the outer peripheral surface of the small diameter cylindrical member to obtain the inner race.

In an embodiment, a sliding bearing manufacturing method manufactures a pair of sliding bearings having different diameter dimensions from a single columnar material.

The manufacturing method includes a step of obtaining the large diameter cylindrical member and the small diameter cylindrical member by the cylindrical member manufacturing method. Additionally, in the manufacturing method, a pair of sliding bearings having different diameter dimensions is manufactured by performing a finishing process such as a grinding process on the surfaces of the large diameter cylindrical members and the small diameter cylindrical member if necessary after the large diameter cylindrical member and the small diameter cylindrical member are obtained.

In an embodiment, an outer race has an outer race track formed on an inner peripheral surface and includes a pair of radially outer chamfered portions formed at a connection portion between an outer peripheral surface and both axial end surfaces.

In this outer race, the entire outer peripheral surface including the pair of radially outer chamfered portions is formed as a forged surface that has not been finished by a grinding process or the like. In this case, the metal flow (fiber flow, forging streamline) is continuous along each of the pair of radially outer chamfered portions in the vicinity of each surface of the pair of radially outer chamfered portions.

In an embodiment, an outer race can include a radially outer chamfered portion formed at a connection portion between an outer peripheral surface and both axial end surfaces. In this case, the metal flow inside the outer race is continuous along the radially outer chamfered portion in the vicinity of the surface of the radially outer chamfered portion.

The metal flow can have a curved portion which is formed at a portion axially deviated from the outer race track in the axial direction to be curved toward the radial outside and to be changed (curved) in the direction of folding back toward the radial inside.

In an embodiment, the inner race has an inner race track formed on an outer peripheral surface and includes a radially inner chamfered portion formed at a connection portion between an inner peripheral surface and both axial end surfaces.

In the inner race, the metal flow inside the inner race is continuous along the radially inner chamfered portion in the vicinity of the surface of the radially inner chamfered portion.

In an embodiment, a radial rolling bearing includes: an outer race which has an outer race track formed on an inner peripheral surface and includes a pair of radially outer chamfered portions formed at a connection portion between an outer peripheral surface and both axial end surfaces; an inner race which has an inner race track formed on an outer peripheral surface and includes a pair of radially inner chamfered portions formed at a connection portion between an inner peripheral surface and both axial end surfaces; and a plurality of rolling elements which are arranged between the outer race track and the inner race track in a rollable manner.

Particularly, in the radial rolling bearing of the present invention, the outer race is composed of the outer race of the present invention and the inner race is composed of the inner race of the present invention.

In an embodiment, a sliding bearing includes a pair of chamfered portions formed at a connection portion between an outer peripheral surface and both axial end surfaces or a connection portion between an inner peripheral surface and both axial end surfaces.

In the sliding bearing, the metal flow is continuous along each chamfered portion in the vicinity of the surface of each of the pair of chamfered portions.

In an embodiment, the rotating mechanical device includes a bearing.

In the rotating mechanical device, the bearing is composed of the radial rolling bearing or the sliding bearing.

In an embodiment, the vehicle includes a bearing.

Particularly, in the vehicle, the bearing is composed of the radial rolling bearing or the sliding bearing.

REFERENCE SIGNS LIST

1 Radial rolling bearing
2 Outer race
2a Outer race track
2b1, 2b2 Radially outer chamfered portion
3 Inner race
3a Inner race track
3b1, 3b2 Radially inner chamfered portion
4 Rolling element
5 Billet
6 First press working device
6a Punch
6b Counter punch
6c Floating die
6d Elastic member
7 First intermediate material
7a Disc-shaped portion
7b Small diameter cylindrical portion
8 Second press working device
8a Die
8a1 Large diameter portion
8a2 Small diameter portion
8a3 Stepped surface
8b Punch
8c Mandrel
8d Cavity
9 Second intermediate material
9a Side plate portion
9b Large diameter cylindrical portion
9c Small diameter cylindrical portion
9d Bottom portion
10 Columnar material (billet)
11 Large diameter cylindrical member (first ring element)
12 Small diameter cylindrical member (second ring element)
13 Preliminary intermediate material (first piece)
13a Side plate portion
13b Large diameter cylindrical portion (first ring portion)
13c Small diameter cylindrical portion (second ring portion)
14 Preliminary material (first piece)
15 Press working device
15a Die
15a1 Large diameter portion
15a2 Small diameter portion
15a3 Stepped surface
15b Mandrel
15c Punch
16 First intermediate material (second piece)
16a Large diameter cylindrical portion (third ring portion)
16b Small diameter cylindrical portion (fourth ring portion)
16c Connection plate portion
16d Partition wall portion
17 Press working device
17a Die
17a1 Large diameter portion
17a2 Small diameter portion
17a3 Stepped surface
17b Inner pressing punch (second member)
17b1 Chamfer forming portion
17c Outer pressing punch (first member)
17d Presser punch
17e Inner counter punch (fourth member)
17e1 Chamfer forming portion
17f Outer counter punch (third member)
18 Second intermediate material
18a Large diameter cylindrical portion
18b Small diameter cylindrical portion
18c Connection plate portion
18d Partition wall portion
19 Press working device
19a Die
19a1 Large diameter portion
19a2 Small diameter portion
19a3 Stepped surface
19a3a Flat surface portion
19a3b Chamfer forming portion
19b Pressing punch
19c Mandrel
19d Sleeve
20 Third intermediate material
20a Large diameter cylindrical portion
20b Small diameter cylindrical portion
20c Connection plate portion
21 Press working device
21a Die
21b Shaving cutter
21b1 Blade portion
21c Presser punch
22 Preliminary large diameter cylindrical member
22a Large diameter cylindrical portion
22b Inward flange portion
23 Press working device
23a Die
23b Sleeve
23c Presser punch
23c1 Punching punch
24 Press working device
24a Die 24*b* Sleeve
24*b*1 Chamfer forming portion
24*c* Shaving cutter
24*c*1 Blade portion
25 First intermediate material (first piece)
25*a* Large diameter cylindrical portion (first ring portion)
25*b* Small diameter cylindrical portion (second ring portion)
25*c* Connection plate portion
26 Press working device
26*a* Die
26*a*1 Large diameter portion
26*a*2 Small diameter portion
26*a*3 Stepped surface
26*a*3*a* Flat surface portion
26*a*3*b* Chamfer forming portion
26*b* Pressing punch
26*c* Punching punch
27 Second intermediate material (second piece)
27*a* Large diameter cylindrical portion (third ring portion)
27*b* Small diameter cylindrical portion (fourth ring portion)
27*c* Connection plate portion
28 Press working device
28*a* Die
28*a*1 Large diameter portion
28*a*2 Small diameter portion
28*a*3 Stepped surface
28*b* Inner pressing punch (second member)
28*b*1 Chamfer forming portion
28*c* Outer pressing punch (first member)
28*d* Presser punch
28*e* Inner counter punch (fourth member)
28*e*1 Chamfer forming portion
28*f* Outer counter punch (third member)
29 Press working device
29*a* Die
29*h* Sleeve
29*c* Shaving cutter
29*c*1 Blade portion
30 First intermediate material (first piece)
30*a* Large diameter cylindrical portion (first ring portion)
30*b* Small diameter cylindrical portion (second ring portion)
30*c* Connection plate portion
31 Press working device
31*a* Die
31*b* Presser punch
31*b*1 Small diameter portion
31*b*2 Large diameter portion
31*b*3 Stepped surface
31*c* Punching punch
32 Second intermediate material (first piece, second piece)
32*a* Large diameter cylindrical portion (first ring portion, third ring portion)
32*b* Small diameter cylindrical portion (second ring portion, fourth ring portion)
32*b*1 Extra thick portion
32*c* Connection plate portion
33 Third intermediate material (second piece)
33*a* Large diameter cylindrical portion (third ring portion)
33*b* Small diameter cylindrical portion (fourth ring portion)
33*c* Connection plate portion
33*d* Extra thick portion
34 Press-working device
34*a* Die
34*a*1 Large diameter portion
34*a*2 Small diameter portion
34*a*3 Chamfer forming portion
34*b* Mandrel (fourth member)
34*b*1 Small diameter portion
34*b*2 Large diameter portion
34*b*3 Stepped surface
34*c* Sleeve (third member)
34*d* Pressing punch (first member)
34*e* Ironing punch (second member)
35 Press working device
35*a* Die
35*a*1 Small diameter portion
35*a*2 Large diameter portion
35*a*3 Stepped surface
35*b* Presser punch
35*c* Punching punch
35*d* Shaving cutter
36 Press working device
36*a* Die
36*a*1 Large diameter portion
36*a*2 Small diameter portion
36*a*3 Stepped surface
36*a*3*a* Chamfer forming portion
36*b* Presser punch
36*c* Pressing punch
36*d* Shaving cutter
36*e* Counter punch
37 Second intermediate material
37*a* Large diameter cylindrical portion
37*b* Small diameter cylindrical portion
37*c* Connection plate portion
38 First intermediate material (second piece)
38*a* Large diameter cylindrical portion (third ring portion)
38*b* Small diameter cylindrical portion (fourth ring portion)
38*c* Connection plate portion
39 First intermediate material (first piece)
39*a* Side plate portion
39*b* Large diameter cylindrical portion (first ring portion)
39*c* Small diameter cylindrical portion (second ring portion)
40 Second intermediate material (second piece)
40*a* Large diameter cylindrical portion (third ring portion)
40*b* Small diameter cylindrical portion (fourth ring portion)
40*c* Connection plate portion
40*d* Partition wall portion
41 Third preliminary intermediate material
41*a* Large diameter cylindrical portion
41*b* Small diameter cylindrical portion
41*c* Connection plate portion
42 Second intermediate material
42*a* Large diameter cylindrical portion
42*b* Small diameter cylindrical portion
42*c* Connection plate portion
43 Third intermediate material
43*a* Large diameter cylindrical portion
43*b* Small diameter cylindrical portion
43*c* Connection plate portion
44 First preliminary large diameter cylindrical member
44*a* Large diameter cylindrical portion
44*b* Inward flange portion
45 Second preliminary large diameter cylindrical member
45*a* Large diameter cylindrical portion
45*b* Inward flange portion

The invention claimed is:

1. A bearing element manufacturing method comprising:
a first step of preparing a first piece having a predetermined shape, the predetermined shape including a first ring portion and a second ring portion arranged side by side in an axial direction, an inner diameter and an outer diameter of the first ring portion being respectively larger than an inner diameter and an outer diameter of the second ring portion;
a second step of obtaining a second piece by processing the first piece, the second piece including a third ring portion corresponding to the first ring portion and a fourth ring portion corresponding to the second ring portion; and
a third step of obtaining a first ring element and a second ring element separated from each other, the first ring element corresponding to the third ring portion, the second ring element corresponding to the fourth ring portion,
wherein the second step includes:
preparing a first set including a first member and a second member disposed inside the first member;
preparing a second set including a third member and a fourth member disposed inside the third member;
disposing the first member and the second member at the inside of a die and at a first side of the die in an axial direction;
disposing the third member and the fourth member at the inside of the die and at a second side of the die in the axial direction; and
deforming the first piece by relatively moving the first set in the axial direction with respect to the second set and by bringing the first piece to come into contact with (i) a surface facing the second side in the first member, (ii) a surface facing the second side in the second member, (iii) a surface facing the first side in the third member, (iv) a surface facing the first side in the fourth member, and (v) a surface facing the first side in the die, while the first piece is disposed between the first set and the second set in the axial direction, and
wherein the deformation of the first piece includes forming an axial surface by deforming a part of the first piece in the axial direction using the surface facing the second side in the first member.

2. The bearing element manufacturing method according to claim 1,
wherein at least one of the first member and the second member has an inclined surface which is inclined with respect to the axial direction and is pressed against the first piece.

3. The bearing element manufacturing method according to claim 1,
wherein the surface facing the first side in the die intersects the axial direction or is inclined with respect to the axial direction.

4. The bearing element manufacturing method according to claim 1,
wherein the surface facing the first side in the die is disposed between the first member and the third member in the axial direction.

5. The bearing element manufacturing method according to claim 1,
wherein the deformation of the first piece includes at least one of (a) forming a hole in the first piece, (b) shaving an inner peripheral surface or an outer peripheral surface of the first piece along the axial direction, (c) processing the inner peripheral surface or the outer peripheral surface of the first piece to gather an extra thickness or a simple thick portion in at least one position in the axial direction, and (d) forming a chamfered portion in the first piece.

6. A bearing manufacturing method comprising:
a step of manufacturing a bearing element by the manufacturing method according to claim 1; and
assembling a bearing using the bearing element.

7. A machine manufacturing method comprising:
a step of manufacturing a bearing element by the manufacturing method according to claim 1; and
assembling a machine using the bearing element.

8. A vehicle manufacturing method comprising:
a step of manufacturing a bearing element by the manufacturing method according to claim 1; and
assembling a vehicle using the bearing element.

9. A bearing element manufacturing method comprising:
a first step of preparing a first piece having a predetermined shape, the predetermined shape including a first ring portion and a second ring portion arranged side by side in an axial direction, an inner diameter and an outer diameter of the first ring portion being respectively larger than an inner diameter and an outer diameter of the second ring portion;
a second step of obtaining a second piece by processing the first piece, the second piece including a third ring portion corresponding to the first ring portion and a fourth ring portion corresponding to the second ring portion; and
a third step of obtaining a first ring element and a second ring element separated from each other, the first ring element corresponding to the third ring portion, the second ring element corresponding to the fourth ring portion,
wherein the second step includes:
preparing a first set including a first member and a second member disposed inside the first member;
preparing a second set including a third member and a fourth member disposed inside the third member;
disposing the first member and the second member at the inside of a die and at a first side of the die in an axial direction;
disposing the third member and the fourth member at the inside of the die and at a second side of the die in the axial direction; and
deforming the first piece by relatively moving the first set in the axial direction with respect to the second set and by bringing the first piece to come into contact with (i) a surface facing the second side in the first member, (ii) a surface facing the second side in the second member, (iii) a surface facing the first side in the third member, (iv) a surface facing the first side in the fourth member, and (v) a surface facing the first side in the die, while the first piece is disposed between the first set and the second set in the axial direction, and
wherein, in the deformation of the first piece, the surface facing the second side in the second member is disposed between the surface facing the first side in the third member and the surface facing the first side in the fourth member in the axial direction.

* * * * *